US008027326B2

(12) United States Patent
Shearer, III et al.

(10) Patent No.: US 8,027,326 B2
(45) Date of Patent: Sep. 27, 2011

(54) METHOD AND SYSTEM FOR HIGH DATA RATE MULTI-CHANNEL WLAN ARCHITECTURE

(75) Inventors: Daniel D. Shearer, III, Scottsdale, AZ (US); Mark A. Webster, Indian Harbour, FL (US)

(73) Assignee: Xocyst Transfer AG L.L.C., Wilmington, DE (US)

( * ) Notice: Subject to any disclaimer, the term of this patent is extended or adjusted under 35 U.S.C. 154(b) by 1077 days.

(21) Appl. No.: 11/033,524

(22) Filed: Jan. 12, 2005

(65) Prior Publication Data

US 2005/0180314 A1    Aug. 18, 2005

Related U.S. Application Data

(60) Provisional application No. 60/535,540, filed on Jan. 12, 2004.

(51) Int. Cl.
*H04J 1/00* (2006.01)
(52) U.S. Cl. .......................... 370/343; 370/210; 370/480
(58) Field of Classification Search .................. 370/208, 370/343, 480
See application file for complete search history.

(56) References Cited

U.S. PATENT DOCUMENTS

| | | | |
|---|---|---|---|
| 6,438,115 B1 * | 8/2002 | Mazur et al. ................... | 370/330 |
| 6,526,264 B2 | 2/2003 | Sugar et al. | |
| 6,728,517 B2 | 4/2004 | Sugar et al. | |
| 6,853,894 B1 | 2/2005 | Kolls | |
| 6,895,310 B1 | 5/2005 | Kolls | |
| 6,934,319 B2 | 8/2005 | Subramanian | |
| 6,973,309 B1 | 12/2005 | Rygula et al. | |
| 2001/0050926 A1 * | 12/2001 | Kumar .......................... | 370/529 |
| 2002/0034214 A1 * | 3/2002 | Okada et al. .................. | 375/147 |
| 2002/0080063 A1 * | 6/2002 | Bloebaum et al. .......... | 342/357.1 |
| 2002/0118702 A1 * | 8/2002 | Turner et al. .................. | 370/466 |
| 2004/0116075 A1 * | 6/2004 | Shoemake et al. ........... | 455/41.2 |
| 2004/0228269 A1 * | 11/2004 | Balakrishnan et al. ....... | 370/208 |
| 2005/0039208 A1 * | 2/2005 | Veeck et al. .................... | 725/76 |
| 2005/0073946 A1 * | 4/2005 | Dey et al. ....................... | 370/208 |
| 2005/0094592 A1 * | 5/2005 | Schmidt ......................... | 370/328 |
| 2005/0157682 A1 * | 7/2005 | Sandhu .......................... | 370/334 |
| 2005/0180314 A1 * | 8/2005 | Webster et al. ............... | 370/208 |
| 2006/0128302 A1 * | 6/2006 | van Rooyen et al. ........ | 455/3.06 |

OTHER PUBLICATIONS

Newton, "Newton's Telecom Dictionary", Nineteenth Edition, Mar. 2003, p. 367, CMP Books, San Francisco, CA.
IEEE Standard for Information Technology. ANSI/IEEE Std 802.11, 1999 Edition, Part 11: Wireless LAN Medium Access Control (MAC) and Physical Layer (PHY) Specifications, 528 pages. Adopted by the ISO/IEC and redesignated as ISO/IEC 8802-11:1999(E).

* cited by examiner

*Primary Examiner* — Jianye Wu

(57) ABSTRACT

A method and system provides a way to achieve very high data rate expanded bandwidth (wide band) WLAN operations reusing existing single channel radio designs. The system provides a dual-channel form of operation for greater flexibility and performance across multiple platforms. Further, the system provides adaptive anti-aliasing techniques for eliminating aliasing due to adjacent channel waveform effects. These techniques mesh with existing systems cleanly.

18 Claims, 53 Drawing Sheets

• 3 Spectrums

CASE 1
Two 802.11a

Two 1x chan's

Each Waveform
• 52 OFDM Subcarriers
• = 48 Data Subcarrier
• + 4 Pilot Subcarriers CASE 2
Filled-Gap
OFDM Fill gap between 2 "normal" OFDM channels CASE 3
Alternative Mode
OFDM Use all usable Points in FFT Across 2 channels

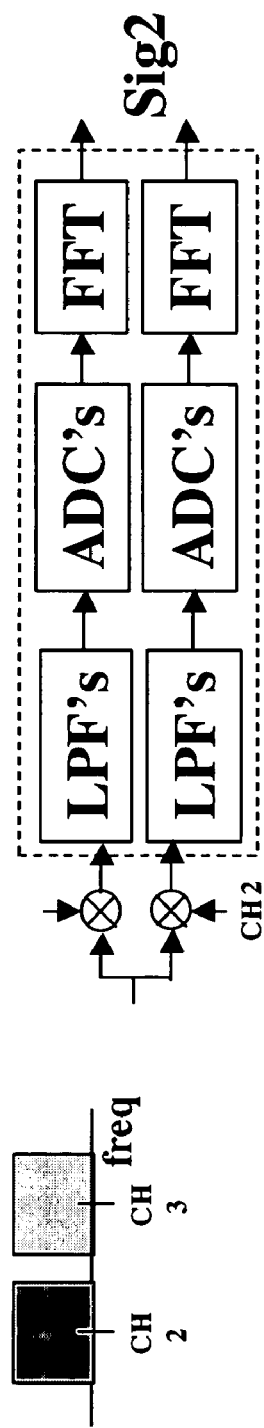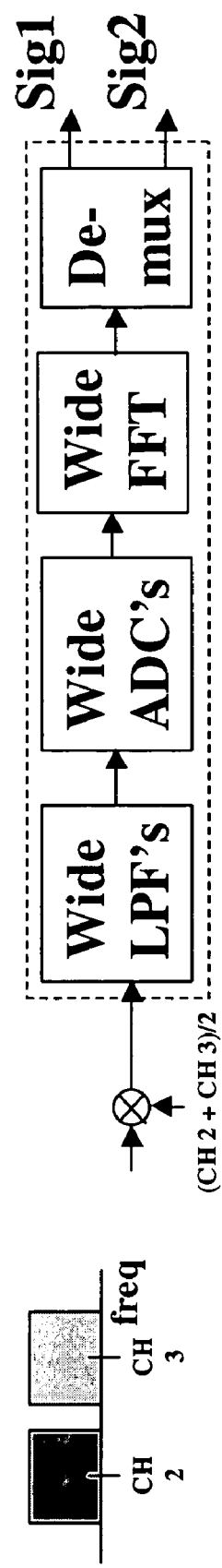

Dual Chain Transmitter Spectrum With 6 dB PA Back-off

Single Chain Transmitter Spectrum With 6 dB PA Back-off

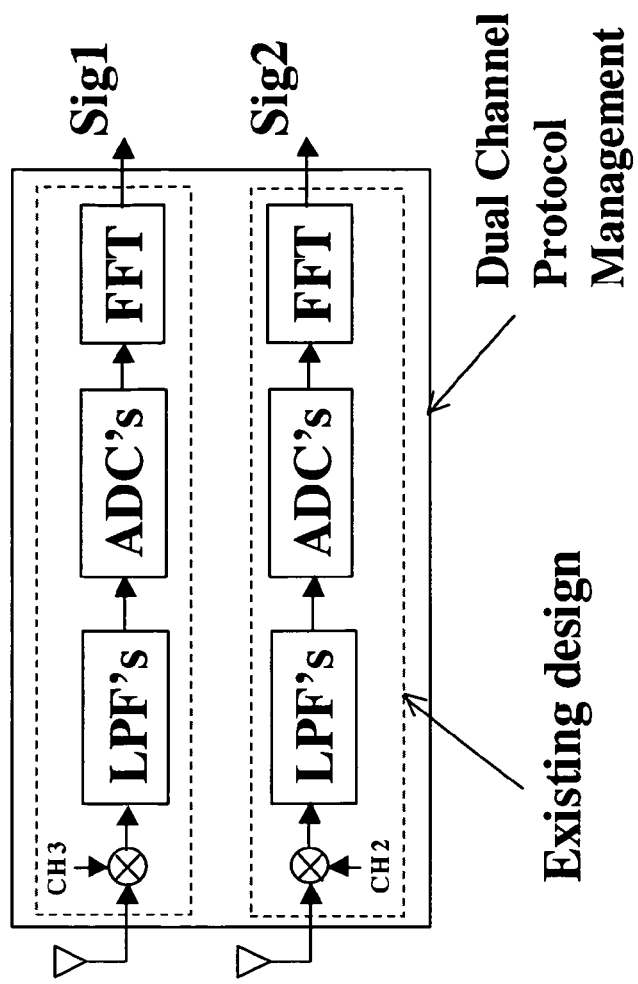
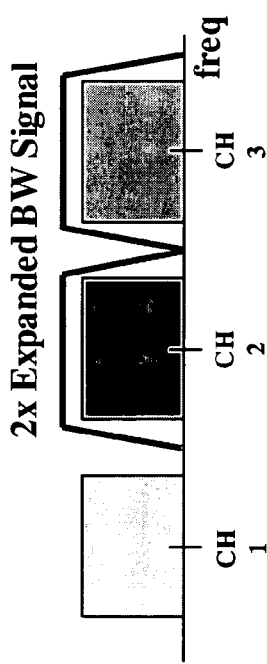
FIGURE 15

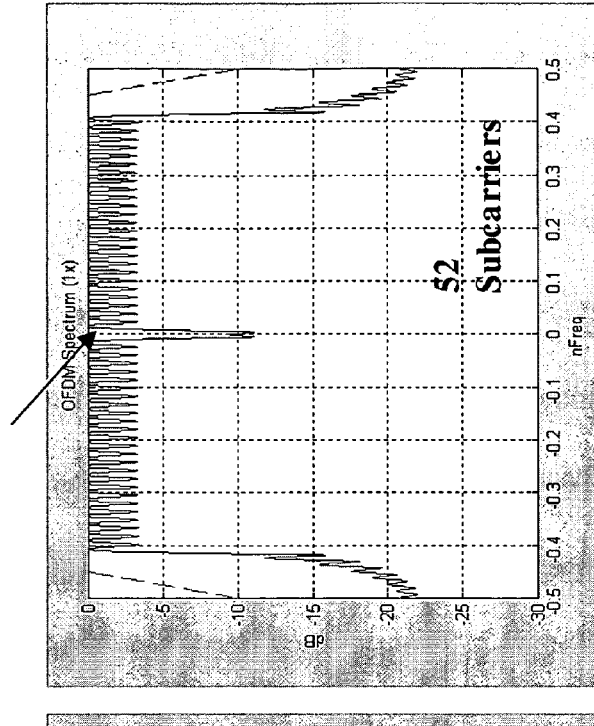
FIGURE 22
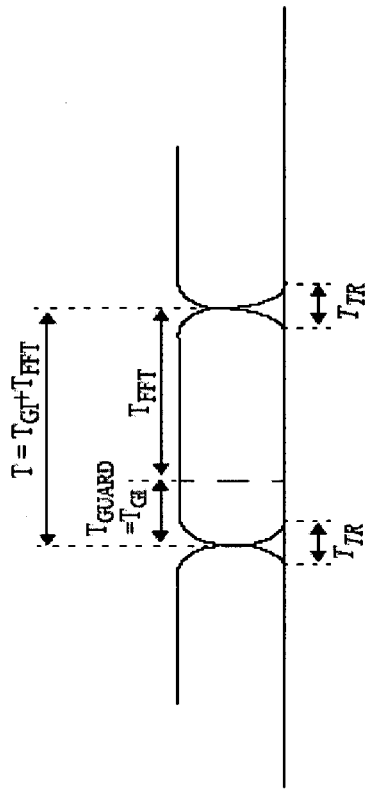
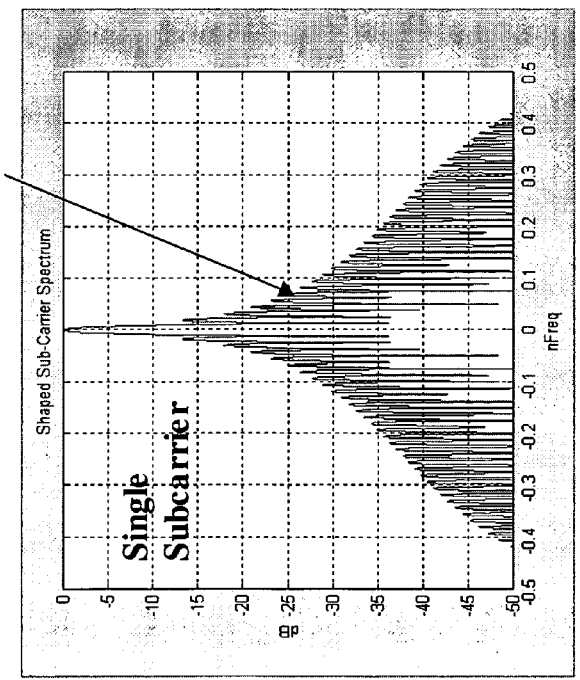
FIGURE 23

EVM = Constellation Point Fuzziness
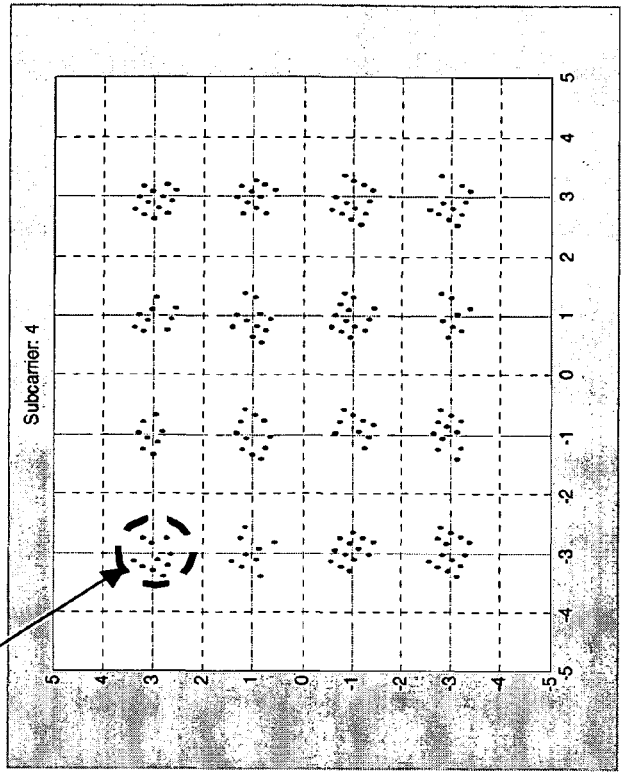
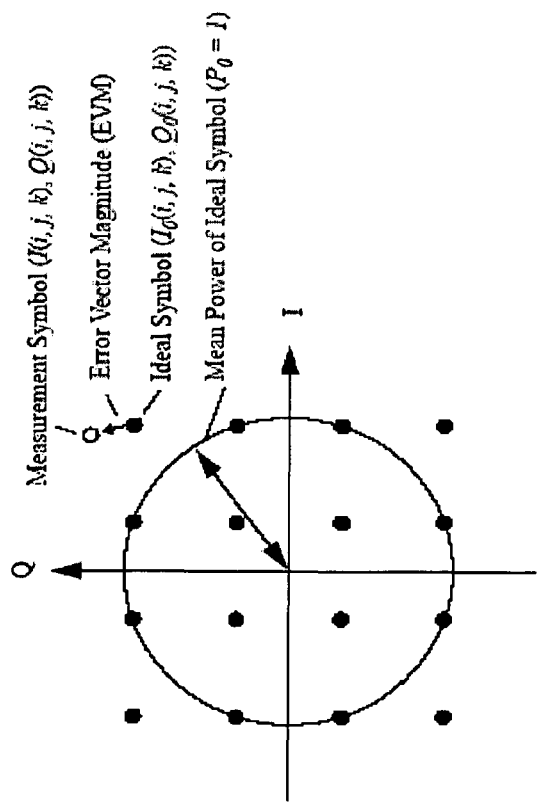
Figure 121 – Constellation error
FIGURE 26

Receive Side

Transmit Side

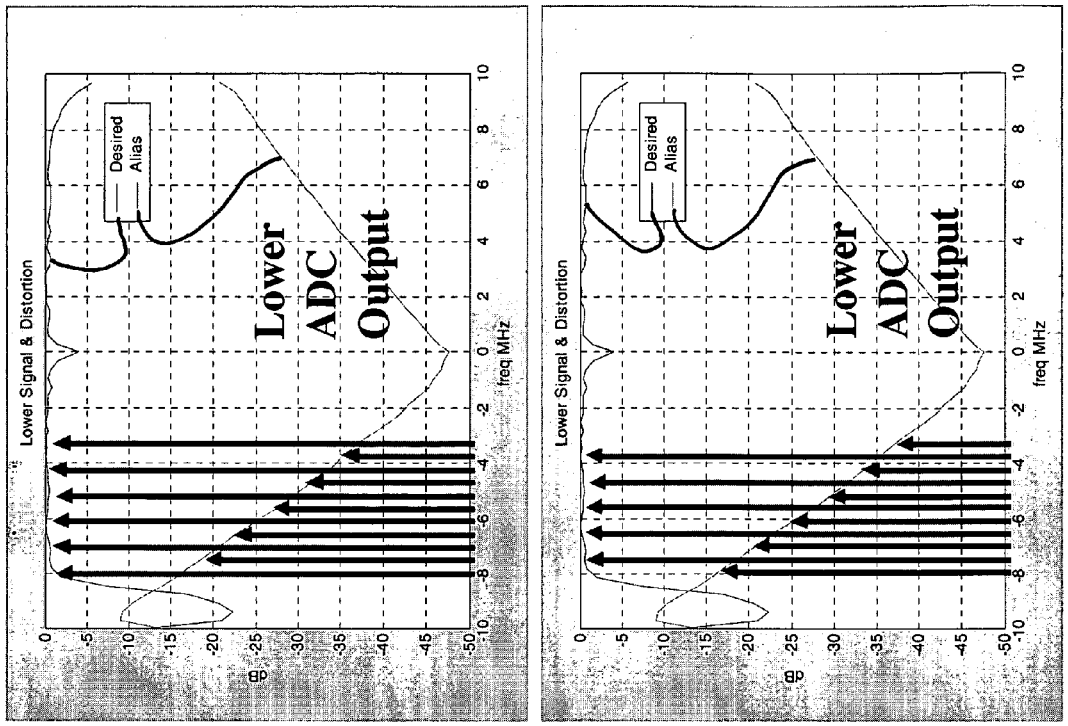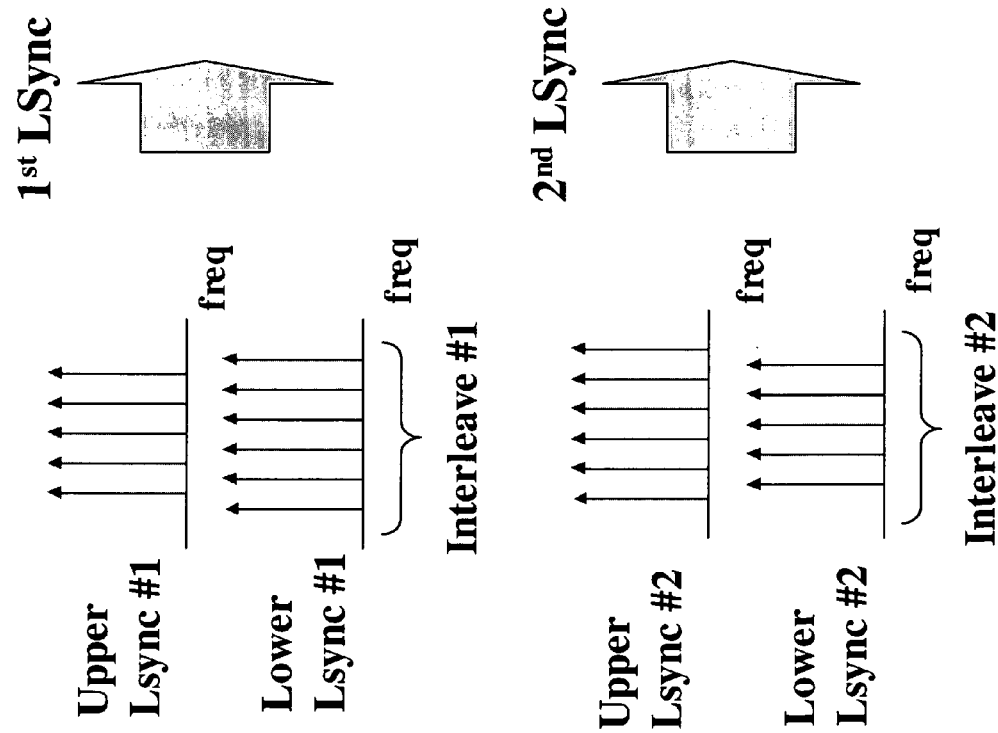
FIGURE 46

METHOD AND SYSTEM FOR HIGH DATA RATE MULTI-CHANNEL WLAN ARCHITECTURE

CROSS-REFERENCE TO RELATED APPLICATIONS

This application claims priority to Provisional Application No. 60/535,540 filed on Jan. 12, 2004, and entitled "HIGH-DATA-RATE MULTI-CHANNEL ARCHITECTURE," which is incorporated herein by reference in its entirety.

FIELD OF THE INVENTION

The present invention relates to wireless communications, and more particularly to a method and system for high data rate multi-channel wireless communications.

BACKGROUND OF THE INVENTION

The invention and its various independent aspects, uses and objects are particularly useful and beneficial in the field of wireless communications, including in Wireless Local Area Networks (WLANs). Wireless devices often are deployed in environments that are electrically noisy and not optimal for wireless communications. For example, most homes and work places include many electronic devices resulting in an electronically noisy environment that may interfere with communications, such as microwave ovens, garage door openers, radios, television sets, computer systems, etc. The communication medium between wireless devices may change constantly. Most environments include multiple reflective surfaces and corners, creating multi-path noise. Also, movement of items or devices or the like, such as hands, bodies, jewelry, mouse pointers, etc. or activation of electronic devices, such as cooling fans or the like, affects the overall wireless communication path and potentially degrades wireless communication performance. Organizations, such as IEEE, have drafted and implemented standards to facilitate deployment of and enhance the efficacy of wireless communications systems and components.

The Institute of Electrical and Electronics Engineers, Inc. (IEEE) 802.11 specification falls under the IEEE 802 family of specifications for Local Area Network (LAN) technologies and is in essence a link layer that uses IEEE 802.2 Logical Link Control (LLC) encapsulation. The IEEE 802.11 specification includes a Media Access Control (MAC) sublayer on top of 802.11a/b/g physical layers (PHY) and represents a family of standards for wireless local area networks (WLAN) in the unlicensed ISM bands of 2.4 and 5 Gigahertz (GHz) bands. The IEEE 802.11b standard specifies a high rate direct sequence spread spectrum (HR/DSSS) with a chip rate of 11 Megahertz (MHz) and defines various data rates in the 2.4 GHz band, including data rates of 1, 2, 5.5 and 11 Megabits per second (Mbps). The IEEE 802.11a standard defines different and higher data rates of 6, 12, 18, 24, 36 and 54 Mbps in the 5 GHz band. It is noted that systems implemented according to the 802.11a and 802.11b standards are incompatible and will not work together. The IEEE 802.11g standard is, in essence, an extension to 802.11b that broadens data rates to 54 Mbps within the 2.4 GHz band using OFDM. Because of backward compatibility, an 802.11b radio card interfaces directly with an 802.11g access point (AP) (and vice versa) at 11 Mbps or lower depending on range.

A radio configured in accordance with IEEE 802.11a or 802.11g standards employs Orthogonal Frequency Division Multiplexing (OFDM) modulation in which a stream of data is transmitted over multiple small frequency sub-channels. In the OFDM configuration, multiple sub-carrier signals are incorporated within each OFDM symbol. Data is incorporated on each data tone using a selected modulation scheme, such as Binary Phase Shift Keying (BPSK), Quadrature PSK (QPSK), 16 Quadrature Amplitude Modulation (QAM), and/or 64 QAM. Each of the modulation schemes employs a corresponding constellation map with variable constellation points corresponding to a corresponding variable number of bits for achieving the various data rates. For example, BPSK is used for 6 or 9 Mbps, QPSK is used for 12 or 18 Mbps, 16 QAM is used for 24 or 36 Mbps, and 64 QAM is used for 48 or 54 Mbps. The encoding process employs a quadrature generation technique and provides in-phase (I) and quadrature (Q) signals on respective I and Q channels.

The IEEE 802.11a standard employs OFDM using 20 megahertz (MHz) wide channels in the 5 gigahertz (GHz) radio frequency (RF) band. Also, by way of example, wireless standards based on using OFDM with 10 MHz channels include the IEEE 802.11j standard for use in Japan and the DSRC standardization (Dedicated Short Range Communications). DSRC is a communications approach to allowing short range communications between vehicles and the roadside for a variety of purposes, such as electronic toll collection, intersection collision avoidance, transit or emergency vehicle signal priority, electronic parking payments, and commercial vehicle clearance and safety inspections. IEEE 802.11j (or, "11j") and DSRC have both described achieving OFDM with 10 MHz channels by using a clock at one-half the rate the 802.11a OFDM clock, or 10 MHz kernel sampling.

IEEE 802.11n standard has been proposed to provide higher throughput and calls for rates of at least 100 Mbits/second. This performance would be measured at the interface between the 802.11 MAC and higher layers, rather than at the PHY layer, to evaluate the net data rate experienced by the user. The net data rate in WLANs is significantly affected by sources of overhead within the 802.11 protocol, e.g., packet preambles, acknowledgements, contention windows and interframe-spacing. As a result, for example, although the 802.11b standard specifies a peak physical-layer rate of 11 Mbits/s, the typical net peak delivered is 5 to 6 Mbits/s. Also, although the 802.11a and 802.11g standards specify a peak PHY data rate of 54 Mbits/s, the typical net peak delivered is 20 to 24 Mbits/s. Accordingly, the 802.11n high throughput standard represents a four- to five-fold increase in actual throughput over that achievable with 802.11a/g. 802.11n specifies backward compatibility with legacy 802.11a/g deployments.

IEEE 802.11 networks typically consist of four physical components, including a distribution system, access points (APs), wireless media, and mobile stations comprising a basic service set (BSS). The mobile stations of a BSS are computing stations, such as notebook computers, PDAs, mobile telephones and other network devices, e.g., printers, facsimile machines, scanners, copiers, hubs, routers, switches, etc, that communicate with each other across one or more APs, which in turn communicate with each other over a distribution system. The communication between the BSS stations and the APs may form a basic service area (BSA) and occurs over a wireless medium. The communication between the APs and each other and the distribution system may be over a plurality of communications media, including wireless and wired media. The APs essentially perform a bridging function. Further, the distribution system may comprise or be in communication with a plurality of communications systems over a plurality of media. Also, within the realm of 802.11 is an independent BSS wherein mobile stations communicate directly with one another. Accordingly, the smallest 802.11 network may consist of two mobile stations communicating with one another. Also, multiple BSSs may be linked together to form extended service sets (ESSs).

In operation, a short training period is typically included at the start of each transmission, including Short Syncs and two Long Syncs (LS) appended at the front end of each transmitted frame. The Long Syncs provide a reference amplitude and phase for each of the active subchannels. The Long Syncs may be averaged together to reduce the noise in the received reference values. After the Long Syncs have been received, each sub-channel received symbol is multiplied by the inverse of the reference amplitude and the conjugate of the reference phase (when expressed as a complex unit vector) for that sub-channel. This removes most of the amplitude and phase distortion that has occurred between the transmitter and the receiver.

Optimum soft-decisions should be Signal-to-Noise Ratio (SNR) weighted. The Long Syncs have been used to generate LLR (log likelihood ratio) weights to correctly weight soft-decisions going into an error-correcting decoder, such as a Viterbi decoder or the like. Given a flat noise floor, the use of LLR weights translates into a signal-power weighting. These LLR weights have been the signal power determined in each sub-channel of the Long Syncs. Using the LLR weights improves soft-decisions and reduces transmission errors.

A first problem is that the received reference values are usually degraded by noise, which is an unavoidable consequence of radio transmission. The reference information provided during the training phase (e.g., in the Long Syncs) is known by the receiver, so that a significant amount of this noise can be determined. A second problem, however, is that the signal amplitude and phase distortion may change over time, from the start of transmission of each frame to the end of the frame, making the initial channel estimate information obsolete and inaccurate towards the end of each frame. Both of these problems increase the probability of error when receiving a frame, due to both signal equalization errors and soft-decision weighting errors.

Legacy radios were designed with several assumptions. The channel was assumed to be relatively stable. The frames were bursty in nature and relatively short, so that it was assumed that the wireless channel did not significantly change over the duration of each frame. The initial channel estimate information determined at the start of each frame was assumed to be sufficiently accurate for that frame. Presently, however, there is a greater emphasis on mobility and/or accuracy. Mobility results in a changing environment that could result in significant changes in the channel during each frame. Even in a stable environment, improved accuracy can improve transmission speed and enable a higher transmission rate with a lower packet error rate (PER). It is desired to improve channel estimation to enable mobile application and/or higher transmission rates.

SUMMARY OF THE INVENTION

The present invention provides a way to achieve very high data rate expanded bandwidth (wide band) WLAN operations reusing existing single channel radio designs. The invention provides a dual-channel form of operation for greater flexibility and performance across multiple platforms. Further, the invention provides adaptive anti-aliasing techniques for eliminating aliasing due to adjacent channel waveform effects. The techniques of the invention mesh with existing systems cleanly.

The invention provides the following benefits, among others. One aspect of the invention minimizes required radio redesign by allowing greater use of legacy devices in 802.11 systems. Another aspect of the invention minimizes radio requirements associated with such systems, for example, for two parallel channels only $6^{th}$ order filters are required as opposed to $10^{th}$ order. Another aspect of the invention provides maximum radio flexibility, for example, Transmit (Tx)/Receive (Rx) in one or more channels to one or more radios. Another aspect of the invention defines a high data rate mode of operation to mesh cleanly with existing and future IEEE 802.11 systems, for example, to allow operation at both 2.4 GHz with 25 MHz channels and 5.8 GHz with 20 MHz channels.

An embodiment of the present invention is directed to concatenation of two (or more) channels using parallel transceivers at the transmit and/or receive end. Another embodiment of the present invention is directed to transmitting and/or receiving two channels to two different radios, or to a single radio thereby increasing data rate to the single radio. Another embodiment of the present invention is directed to being extensible to multiple channels. Another embodiment of the present invention is directed to an adaptive anti-aliasing function in the receiver. An embodiment of the present invention is directed to creating very high WLAN data rates that may not be supported by IEEE 802.11a/g. For example, the highest data rate for 802.11a/g is 54 Mbps. An exemplary technique may include channel concatenation, where multiple 802.11a/g channels are combined thereby expanding bandwidth and data rate. In general for conventional systems, a new radio must be designed that up-converts or down-converts the wide signal as a unit. An embodiment of the present invention decomposes the signal into separate pieces, up-converting and down-converting the pieces, whereby reuse of existing 802.11a/g radio designs by parallelizing the signals in frequency may be possible without implementing a new transceiver. An embodiment of the present invention provides for extensible channel concatenation, (e.g., one, two, three, . . . channels concatenated) and enables concurrent transmissions to two or more devices, such as radios. Further, an embodiment of the present invention meshes cleanly (friendly) with existing networks, such as 802.11a/g networks.

An exemplary embodiment provides a method and system for achieving very high data rate WLAN operations reusing existing single channel radio designs. A novel technique eliminates aliasing due to adjacent channel waveform. Legacy signals (e.g., one-channel) and wide signals (e.g., multiple-channels) may be arbitrarily interleaved in time (dynamic bandwidth switching) during packet transmission. For an exemplary technique of an embodiment of the present invention, no synthesizer frequency-popping exists when bandwidth switching between packets. Synthesizers may stay tuned to legacy channel centers for most or at all times. Further, synthesizer switches that can take 100 microseconds (µs) to settle may be avoided. Also, adaptive techniques are provided to mitigate the undesired impact of analog-to-digital converter (ADC) sample-rate aliasing. ADC sample-rate aliasing may occur when a wide signal is received by multiple, parallel receive chains designed to receive a single narrow signal. As described hereinbelow, for example, operations at 5 GHz are considered (e.g., 20 MHz legacy channel centers). In another example, operations at 2.4 GHz are considered (e.g., 25 MHz legacy channel centers).

The IEEE 802.11a/b/g WLAN standards currently exist. The new IEEE 802.11n standard (or variations thereof) is being discussed, developed and introduced. One goal of the 802.11n standard is to increase data rates and data throughput while being "friendly" to or meshing cleanly with existing 802.11 networks. An embodiment of the present invention increases the data rate using channel bonding with OFDM using two or more channels at once. Another aspect of the invention provides a technique for "filling the gap" between two signals with extra OFDM subcarriers, which is extensible to multiple channels. Yet another aspect of the invention provides a non-802.11n friendly alternative mode that provides higher data rates, but is not friendly to 802.11 because the spectral mask would be violated. As described hereinbelow, for example, 20 MHz channels centers with OFDM is described for 802.11a t 5.8 GHz and 25 MHz channels centers is described for 802.11g at 2.4 GHz.

BRIEF DESCRIPTION OF THE DRAWINGS

The benefits, features, and advantages of the present invention will become better understood with regard to the following description, and accompanying drawings in which:

FIG. 7 is a block diagram illustrating one physical implementation of a dual-chain wideband radio;

FIG. 8 is a block diagram illustrating an alternative single chain wideband radio implementation;

FIG. 15 is a diagram illustrating a dual chain wideband radio receiver with reference to dual channel protocol management;

FIG. 22 is a graphical representation of 802.11a subcarrier function associated with FIG. 19;

FIG. 23 is a graphical illustration, respectively, of shaped subcarrier spectrum response and OFDM spectrum response in 802.11a example of FIG. 22;

FIG. 26 is a chart illustrating the error vector magnitude (EVM) associated with an exemplary 16 QAM 802.11a/g signal;

FIG. 46 illustrates a special training technique utilizing interleaved subcarriers and acquisition with long sync;

DETAILED DESCRIPTION THE INVENTION

The following description is presented to enable one of ordinary skill in the art to make and use the present invention as provided within the context of a particular application and its requirements. Various modifications to the preferred embodiment will, however, be apparent to one of ordinary skill in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention provides a way to achieve very high data rate expanded bandwidth (wide band) WLAN operations reusing existing single channel radio designs. The invention provides a dual-channel form of operation for greater flexibility and performance across multiple platforms. Further, the invention provides adaptive anti-aliasing techniques for eliminating aliasing due to adjacent channel waveform effects. The techniques of the invention mesh with existing systems cleanly.

One embodiment of the invention simplifies WLAN radio redesign and opens network access to new systems by allowing greater use of legacy devices in 802.11 systems. The invention also minimizes radio requirements associated with such systems, for example, for two parallel channels only $6^{th}$ order filters are required as opposed to $10^{th}$ order or higher. The invention also provides for enhances radio flexibility, for example, enables Transmit (Tx)/Receive (Rx) in one or more channels to one or more radios/stations. Another aspect of the invention provides a high data rate mode of operation to mesh cleanly with existing and future IEEE 802.11 systems, for example, to allow operation at both 2.4 GHz with 25 MHz channels and 5.8 GHz with 20 MHz channels.

Figure 1:
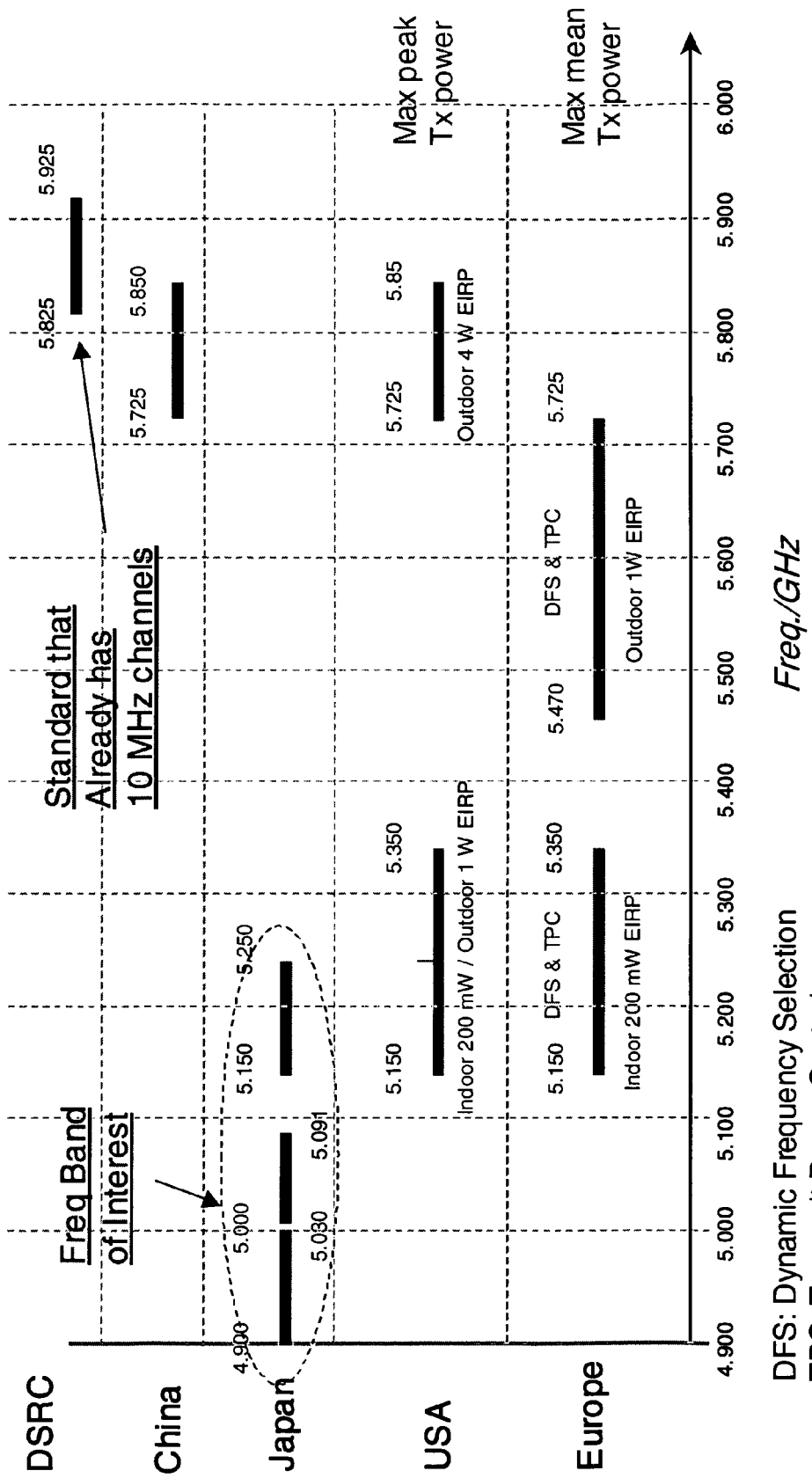
FIG. 1 is a chart illustrating World-Wide 5 GHz frequency allocations.

IEEE 802.11 specification includes 802.11a/b/g physical layer specifications/standards that operate on ISM bands of 2.4 and 5 Gigahertz (GHz) bands. IEEE 802.11a operates in the 5 GHz band using 20 megahertz (MHz) wide channels, and the 802.11g standard operates in the 2.4 GHz band using 25 megahertz (MHz) wide channels. FIG. 1 is a chart illustrating World-Wide 5 GHz frequency allocations, including those for 802.11a as discussed herein. The invention is not limited to these standards, which are referred to herein as examples of applications for the invention and to facilitate describing the inventive aspects. Other wireless standards, for example, based on OFDM include 802.11j standard for use in Japan and the DSRC standardization (Dedicated Short Range Communications), both of which use 10 MHz channels.

A radio configured in accordance with 802.11a or 802.11g standards employs Orthogonal Frequency Division Multiplexing (OFDM) modulation in which a stream of data is transmitted over multiple small frequency sub-channels. In the OFDM configuration, multiple sub-carrier signals are incorporated within each OFDM symbol. Data is incorporated on each data tone using a selected modulation scheme, such as Binary Phase Shift Keying (BPSK), Quadrature PSK (QPSK), 16 Quadrature Amplitude Modulation (QAM), and/or 64 QAM. Each of the modulation schemes employs a corresponding constellation map with variable constellation points corresponding to a corresponding variable number of bits for achieving the various data rates. For example, BPSK is used for 6 or 9 Mbps, QPSK is used for 12 or 18 Mbps, 16 QAM is used for 24 or 36 Mbps, and 64 QAM is used for 48 or 54 Mbps. The encoding process employs a quadrature generation technique and provides in-phase (I) and quadrature (Q) signals on respective I and Q channels.

IEEE 802.11n or any other standard calling for high data rates of 100 Mbits/second or more require more of a system than do the present standards. The net data rate in WLANs is significantly adversely affected by sources of overhead within the 802.11 protocol, e.g., packet preambles, acknowledgements, contention windows and interframe spacing. The 802.11n high throughput standard represents a four- to five-fold increase in actual throughput over that required by 802.11a/g and requires backward compatibility with legacy 802.11a/g deployments.

IEEE 802.11 networks typically consist of four physical components, including a distribution system, access points (APs), wireless media, and mobile stations comprising a basic service set (BSS). The mobile stations of a BSS are computing stations, such as notebook computers, PDAs, mobile telephones and other network devices, e.g., printers, facsimile machines, scanners, copiers, hubs, routers, switches, etc, that communicate with each other across one or more APs, which in turn communicate with each other over a distribution system. The communication between the BSS stations and the APs may form a basic service area (BSA) and occurs over a wireless medium. The communication between the APs and each other and the distribution system may be over a plurality of communications media, including wireless and wired media. The APs essentially perform a bridging function. Further, the distribution system may comprise or be in communication with a plurality of communications systems over a plurality of media. Also, within the realm of 802.11 is an independent BSS wherein mobile stations communicate directly with one another. Accordingly, the smallest 802.11 network may consist of two mobile stations communicating with one another. Also, multiple BSSs may be linked together to form extended service sets (ESSs).

Figure 2:
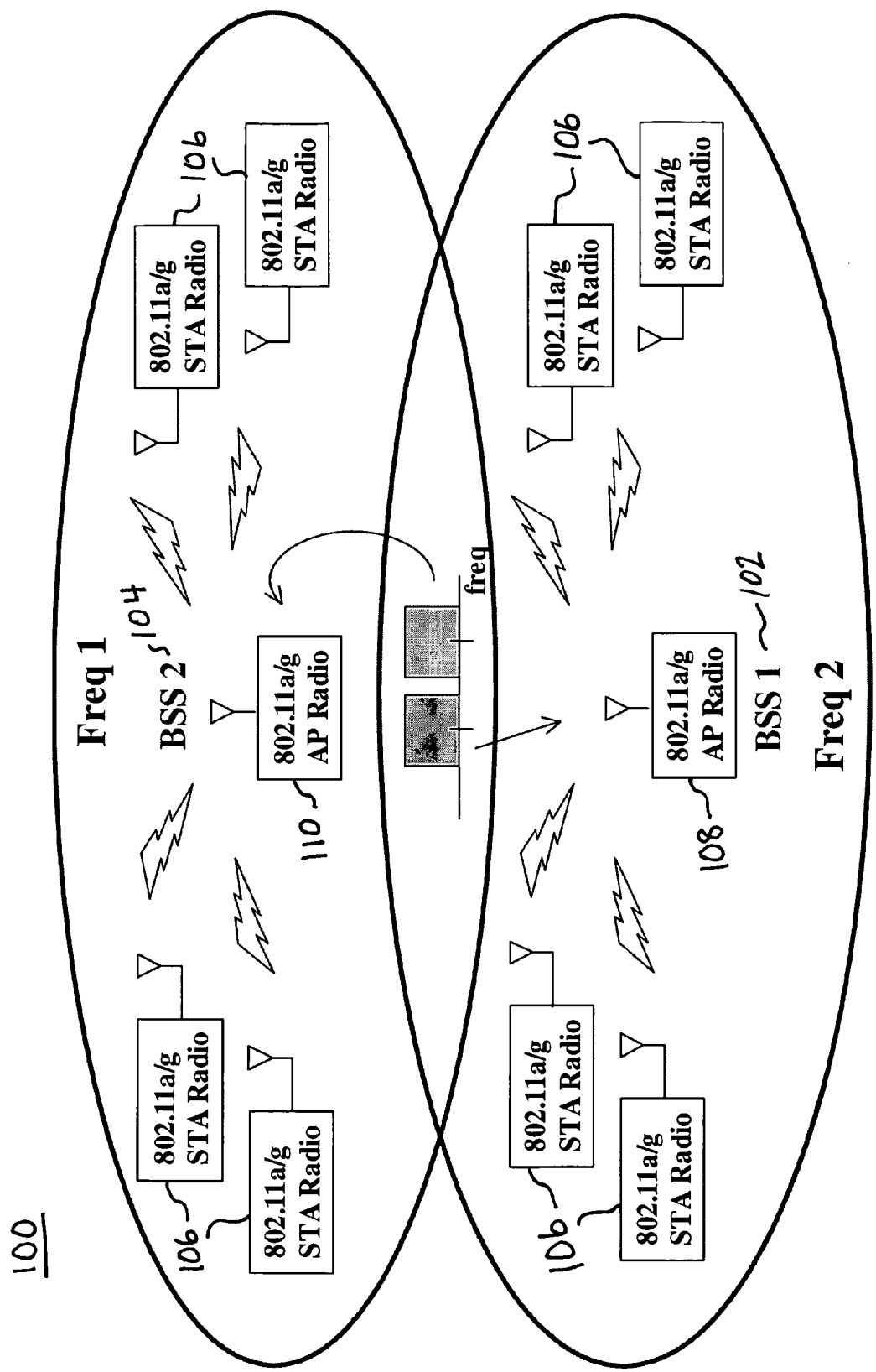
FIG. 2 is a schematic diagram of existing IEEE 802.a/g WLAN with single channel stations.

FIG. 2 is a schematic diagram of an existing IEEE 802.a/g WLAN, referenced generally at 100, having two BSSs, BSS1 102 and BSS2 104, comprised of 802.11a/g type mobile stations or radios 106. As shown in FIG. 1, two separate channels, for instance one each for 802.11a and 802.11g, are involved in the communications system 100. The stations of BSS1 102 communicate via AP 108 and the stations of BSS2 104 communicate via AP 110.

The present invention has many independent aspects, uses and advantages. One embodiment of the invention provides a high data rate multi-channel architecture for WLAN systems. Given the widespread adoption of WLAN technology in home, office, shops, travel, hotel, leisure and so many other areas of life, there has been an increasing effort to meet the demand and squeeze as much efficiency out of the available bandwidth. To this end, organizations such as IEEE have developed and adopted a series of standards to facilitate the adoption and increase the beneficial use of WLAN technologies for the benefit of all. One aspect of this development is the adoption of several competing and complimentary standards, e.g., 802.11a, 802.11b, and 802.11g, with more on the way, e.g., 802.11n. These standards have advantages and disadvantages depending upon particular applications, uses, environments, traffic, etc. As a result, devices associated with the 802.11 family of standards are varied and it has become increasingly critical that newly adopted standards and the use of existing legacy equipment accommodate new and legacy equipment alike. To this end, one aspect of the present invention provides a method and system for achieving the required high data rate of newer standards, e.g., 802.11n, while preserving the utility and access of legacy systems, e.g., 802.11a/g equipment.

Figure 3:
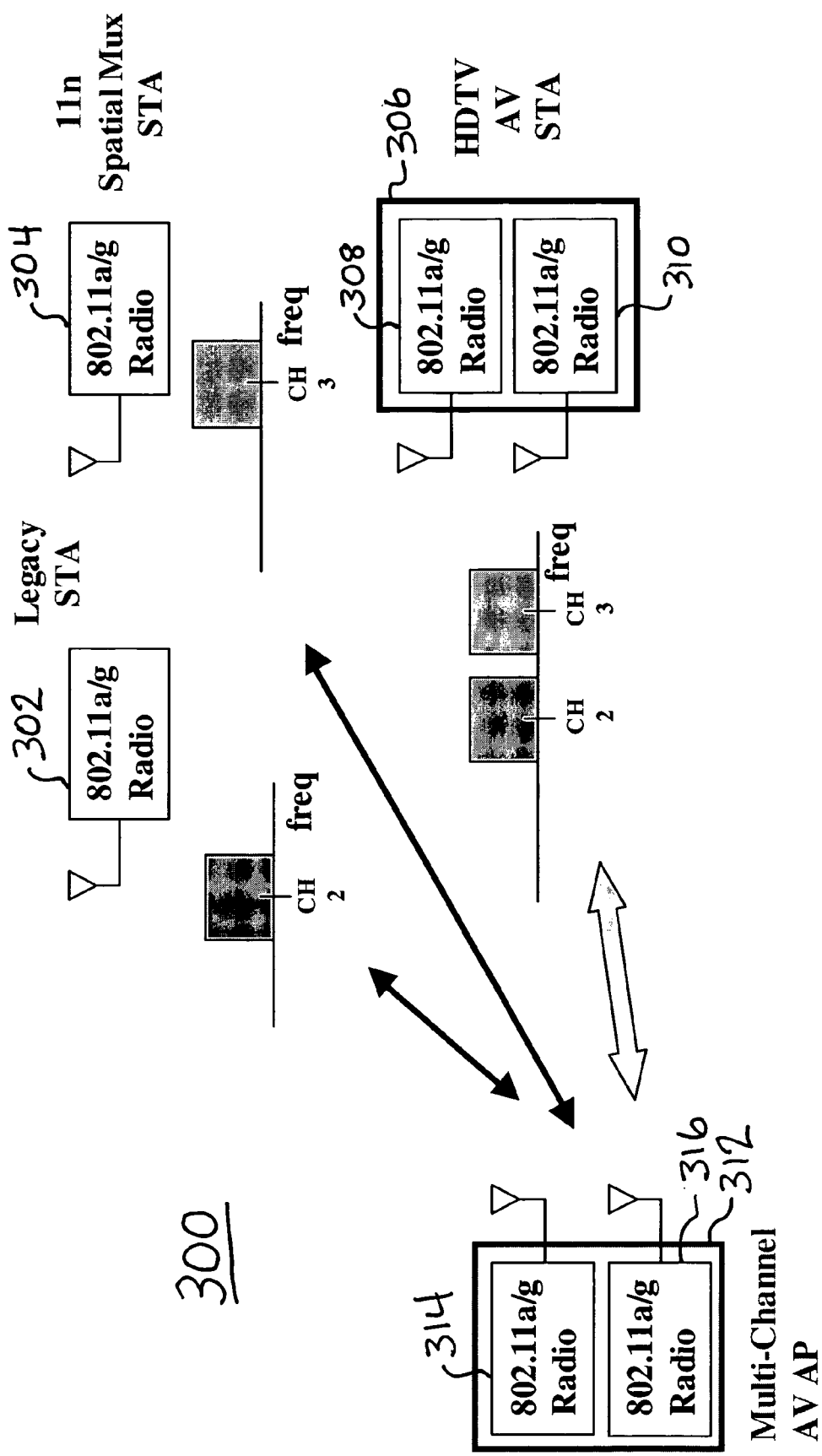
FIG. 3 is a schematic diagram representing a possible IEEE 802.11n WLAN scenario with legacy 802.11a/g stations.

FIG. 3 is a schematic diagram representing one exemplary 802.11n WLAN system 300 having legacy 802.11a/g stations 302 operating at channel 2 and 304 operating at channel 3. In addition, system 300 includes a networked device 306, in this case a HDTV audio/video (AV) station (STA), such as a flat panel display for viewing television shows and the like, which includes a dual-chain wideband receiver comprising a first radio or receiver station 308 and a second radio or receiver station 310, respectively operating on channels 2 and 3. Multi-channel AV access point (AP) 312 is a dual-chain wideband transmitter comprising individual radios/transmitters 314 and 316. The AP 312 manages communications with and between the stations 302, 304 and 310 and may permit single channel or multi-channel communication or a combination thereof and may prioritize access to the WLAN depending upon need and set-up, instructions, etc. Processes for accomplishing this and the particular implementation of the components are described in more detail below.

One goal of the 802.11n standard is to increase data rates and data throughput while being "friendly" to or meshing cleanly with existing 802.11 networks. An embodiment of the present invention increases the data rate using channel bonding with OFDM using two or more channels at once. Another aspect of the invention provides a technique for "filling the gap" between two signals with extra OFDM subcarriers, which is extensible to multiple channels. Yet another aspect of the invention provides a non-802.11n friendly alternative mode that provides higher data rates, but is not friendly to 802.11 because the spectral mask would be violated. As described hereinbelow, for example, 20 MHz channels centers with OFDM is described for 802.11a t 5.8 GHz and 25 MHz channels centers is described for 802.11g at 2.4 GHz.

Figure 4:
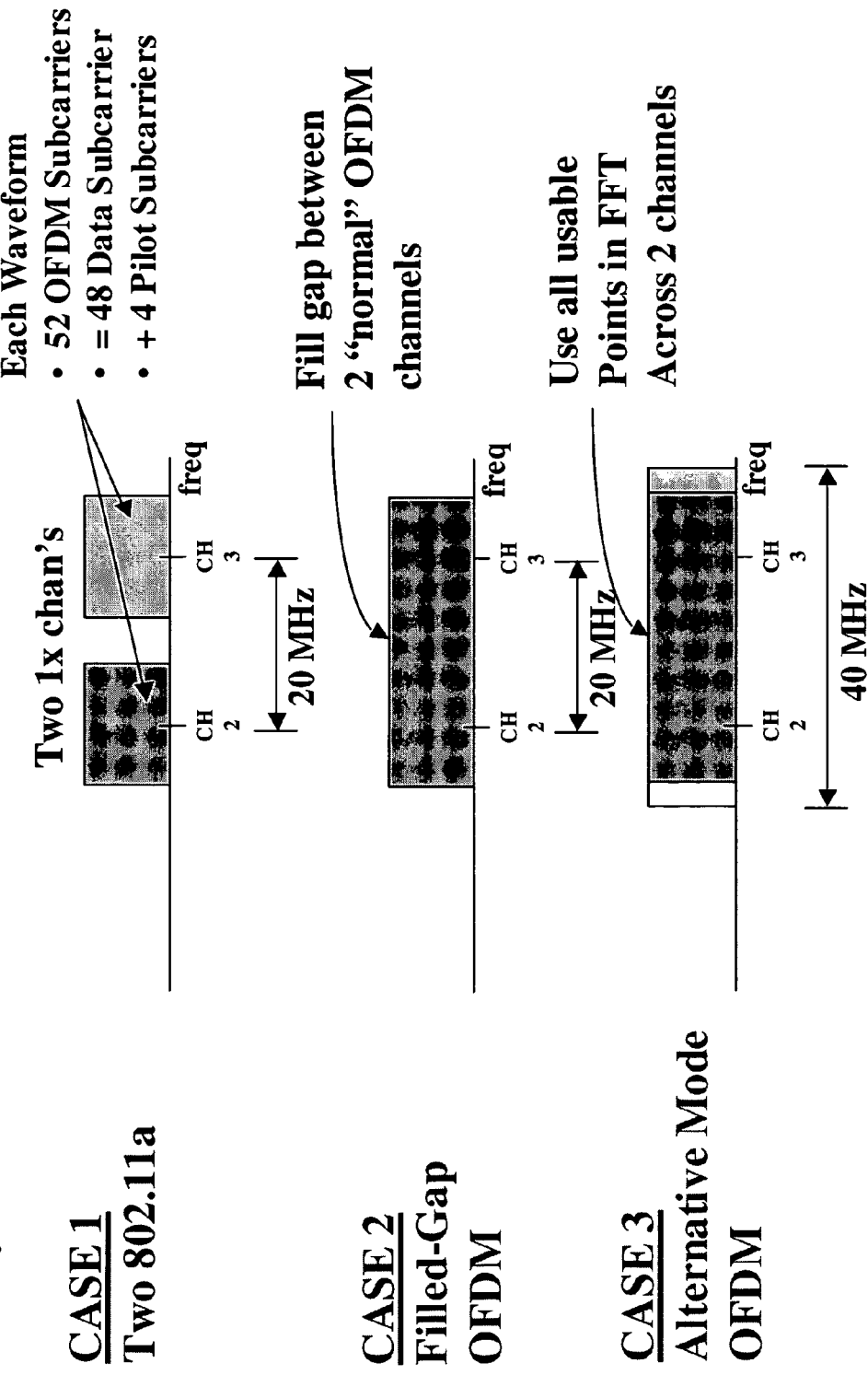
FIG. 4 is a chart illustrating three cases of frequency spectrums.

FIG. 4 is a chart illustrating three exemplary cases of frequency spectrums for discussing the inventive approaches. Case 1 shows two 802.11a channels, CH 2 and CH 3, the center frequencies of which are separated by 20 MHz. Case 2 illustrates the inventive filed-gap OFDM approach and shows the use of additional subcarriers to "fill the gap" between the two single channels 2 and 3 to permit greater information over the bandwidth. Case 3 is an alternative approach whereby additional subcarriers are implemented on the outer boundaries of the channels CH 2 and CH 3.

Figure 5:
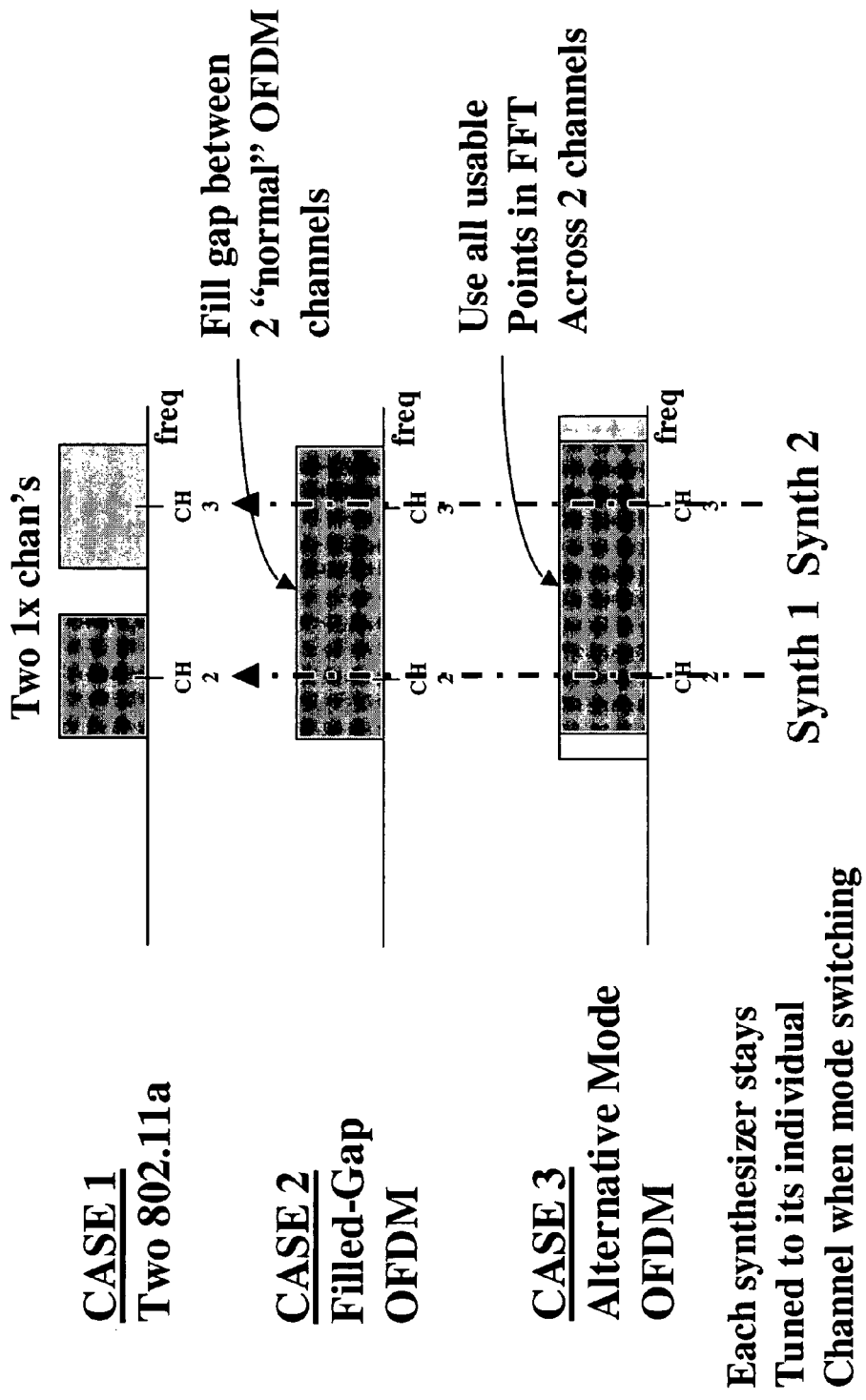
FIG. 5 is a chart illustrating three cases of frequency spectrums involving no synthesizer frequency popping.

FIG. 5 is a chart illustrating three cases, similar to those of FIG. 4, of frequency spectrums involving no synthesizer frequency popping. In this case, the radio may dynamically switch to tune to center frequency in wideband operation or to the upper or lower side frequency in legacy systems. In this manner, the invention allows for dynamic switching between wide and narrow filters. On the transmit side, the device could transmit in wideband at the center frequency or tune the synthesizer to one of the narrower signals for legacy system transmission.

Dual-channel (or dual-chain) without gap fill transmits at a rate of 108 Mbps ((96 sc)/(48 sc)=2× data rate factor; 2 times 48 data subcarriers (sc)=96 data sc). In one example, using the OFDM filled-gap technique yields an increase in data rate to 121.5 Mbps ((108 sc)/(48 sc)=2.25× data rate yielding 121.5 Mbps, where 64(left channel)+64(right channel)−6(left guard)−5(right guard)−4(pilot tones)−5(lost to DC offsets)=108 data subcarriers). This is only one example, for instance the number of slots lost to DC offsets may range from 1 to 5 subcarriers.

The alternative mode is not presently defined in 802.11n, as the interference level will be a little higher than accepted. An advantage to this embodiment is that the alternative mode will still allow fast switching between normal 802.11a and the alternative mode packet using 802.11g-like mechanisms. The use of the additional subcarriers can increase the data rate to 135 Mbps, for example, dual channel with all gaps filled yields a data rate of 135 Mbps ((120 sc)/(48 sc)=2.5× times 54 Mbps=135 Mbps; 64+64−4−4=120 data subcarriers).

An embodiment of the present invention is directed to increasing the data rate even more without increase the analog and mixed signal requirements. This may be accomplished by using a full spectral synthesis capability of the Inverse Fast Fourier Transform/Fast Fourier Transform (IFFT/FFT). All the subcarriers (sc) across two channels for carrying data except four pilot tones and two DC notches at legacy locations may be utilized. This is like the alternative mode filled-gap OFDM presented in the preceding section, where the gaps on the outer edges are also filled. As a result, the guard band on each end is filled with data. This increases Adjacent Channel Interference (ACI) beyond 802.11a levels.

Figure 6:
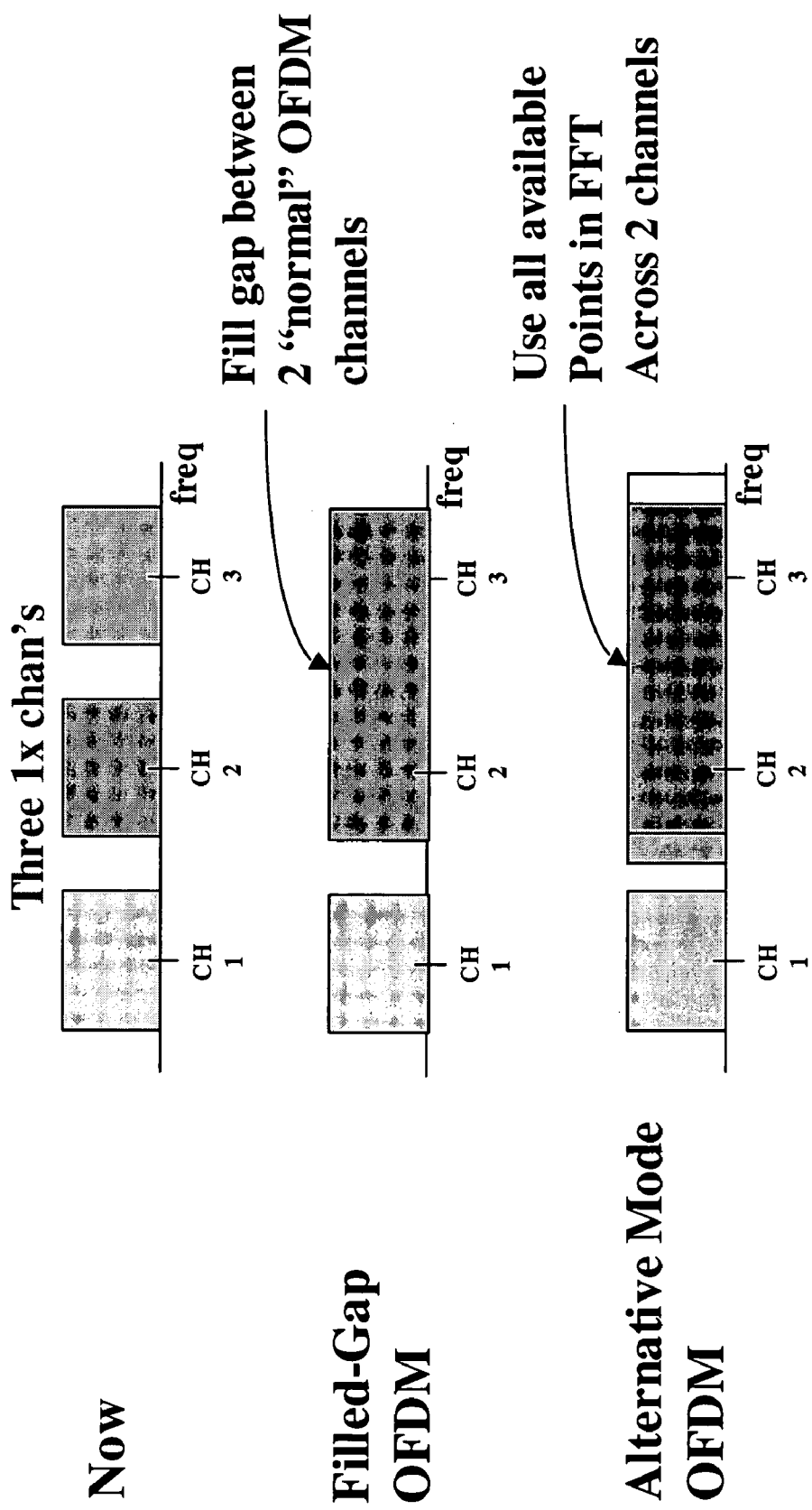
FIG. 6 is a chart illustrating three cases of frequency spectrums involving an alternative mode of operation not defined in 802.11n.

FIG. 6 is a chart illustrating three cases of frequency spectrums involving three channels and includes an alternative mode of operation not presently defined in 802.11n. In this example, channel CH 1 may be reserved for legacy radio stations with legacy AP, e.g., existing 802.11a/g equipment. Channels CH 2 and CH 3 may be reserved for new wideband radio equipment, such as for 802.11n and alternative modes. This arrangement would permit a bi-modal manner of operation. In one manner, the AP could instruct the legacy equipment to go to "sleep mode" for some period, say 100 milliseconds, during which time operation would be reserved for wideband use, and vice-versa. As shown in the filled-gap OFDM of case 2, the gap is filled between the two "normal" OFDM channels thereby "stacking" the channels to allow greater information in the bandwidth. An increase in the number of subcarriers will lead to an increase in computational/chip requirements. For each subcarrier there is an equalization that must occur (correction of distortion of amplitude and/or phase). Accordingly, extra FEQ (Frequency domain equalizer) taps may be needed, extra soft-decisions may need to be generated, and Viterbi (error correction) decoder may run faster. OFDM is comprised of discrete tones, one aspect of the present invention creates a super OFDM with approximately twice the number of tones. The exact number for 802.11n purposes is not set.

Another aspect of the invention involves the implementation of the invention, for example in either wide single channel (wideband) or two legacy (dual channel or chain) channels. This applies to both the transmit and the receive side. More particularly, the high data rate multi-channel arrangement of the invention may be achieved, for example, by 1) using two existing legacy circuits or radios in parallel (2-64 point FFTs that process two halves of the signal (1-upper and 1-lower)) or 2) by using a single circuit that processes the whole signal (1-128 point FFT).

An embodiment of the present invention is directed to concatenation of two (or more) channels using parallel transceivers at the transmit and/or receive end. Another embodiment of the present invention is directed to transmitting and/or receiving two channels to two different radios, or to a single radio thereby increasing data rate to the single radio. Another embodiment of the present invention is directed to being extensible to multiple channels. Another embodiment of the present invention is directed to an adaptive anti-aliasing function in the receiver. An embodiment of the present invention is directed to creating very high WLAN data rates that may not be supported by IEEE 802.11a/g. For example, the highest data rate for 802.11a/g is 54 Mbps. An exemplary technique may include channel concatenation, where multiple 802.11a/g channels are combined thereby expanding bandwidth and data rate. In general for conventional systems, a new radio must be designed that up-converts or down-converts the wide signal as a unit. An embodiment of the present invention decomposes the signal into separate pieces, up-converting and down-converting the pieces, whereby reuse of existing 802.11a/g radio designs by parallelizing the signals in frequency may be possible without implementing a new transceiver. An embodiment of the present invention provides for extensible channel concatenation, (e.g., one, two, three, . . . channels concatenated) and enables concurrent transmissions to two or more devices, such as radios. Further, an embodiment of the present invention meshes cleanly (friendly) with existing networks, such as 802.11a/g networks.

In design, the radio for a wide signal built from two narrower signals is a wide-channel transceiver (wideband radio) with faster Digital-to-Analog Converters (DAC's) and Analog-to-Digital Converters (ADC's) (e.g., 40 MHz wide instead of 20 MHz wide). However, there are problems associated with this implementation. There are cost and power increases for 40 MHz channels. Presently, only 20 MHz channel doubling is practical with current technology. More than two channels becomes very complex. 25 MHz channel doubling at 2.4 GHz is likewise complex, e.g., 50 MHz front-end is more difficult than 40 MHz. More Power Amplifier (PA) back-off is required to meet the spectral mask, especially at 2.4 GHz. ADCs and DACs must run much faster. Receive filter requirements are very difficult. Filter must be wide and have very sharp skirts to reject adjacent channel interference. There may be synthesizer retuning issues. An embodiment of the present invention is directed to avoiding the 40 MHz transceiver (XCVR) by reusing existing legacy 20 MHz XCVRs.

FIG. 7 is a block diagram illustrating one physical implementation of a dual-chain wideband radio having low pass filters (LPFs), ADCs, and Fast Fourier Transforms (FFTs). This is a "multiple radios in a box" implementation. In this implementation multi-chain radios each with a single bandwidth and multiple FFTs, multiple converters, and multiple analog filters are used. This is a form of "channel bonding" and may use common synthesizer and automatic gain control (AGC) with receiving.

In the alternative, FIG. 8 is a block diagram illustrating an alternative single-chain wideband radio implementation. In this implementation a single radio is used to handle multi-channel capability and involves a single chain with programmable bandwidth (BW) expansion, high speed converters, BW switched filters and large FFT (e.g., 128 point) are required. The example of FIG. 8 includes a wide LPF, a wide ADC, a wide FFT and a demultiplexer (De-mux).

Figure 9:
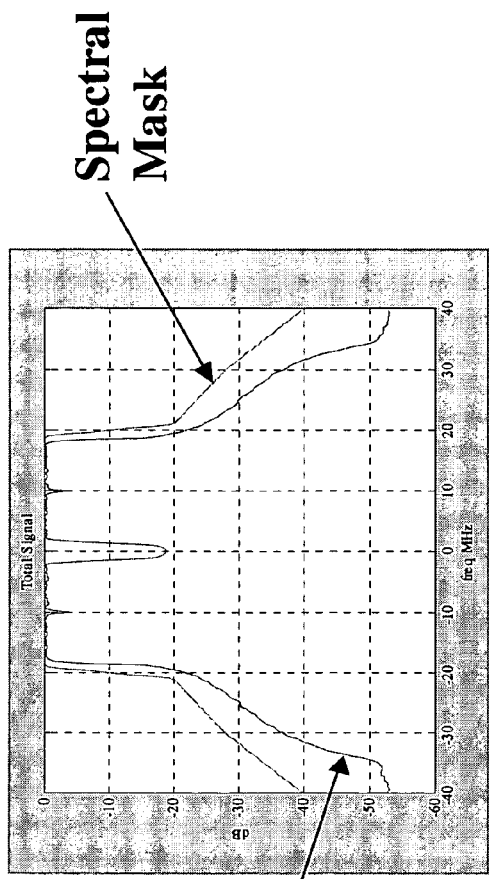
FIG. 9 is a graph representing a dual chain transmitter satisfying a spectral mask.
Figure 10:
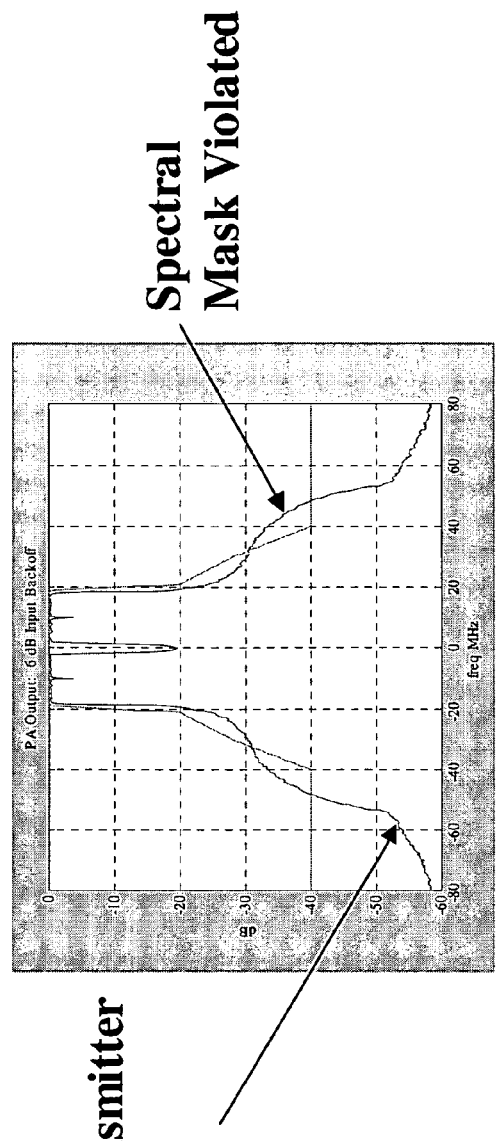
FIG. 10 is a graph representing a single chain transmitter violating a spectral mask.

FIG. 9 is a graph representing a dual chain transmitter satisfying a spectral mask and FIG. 10 is a graph representing a single chain transmitter violating a spectral mask.

Figure 11:
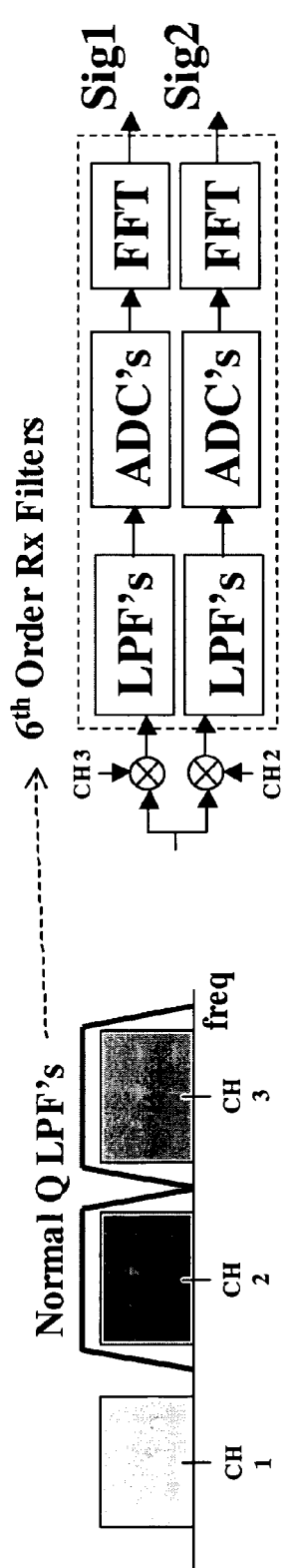
FIG. 11 is a diagram illustrating a $6^{th}$ order low pass filter on the receiver side in a dual chain wideband radio with normal Q factor.
Figure 12:
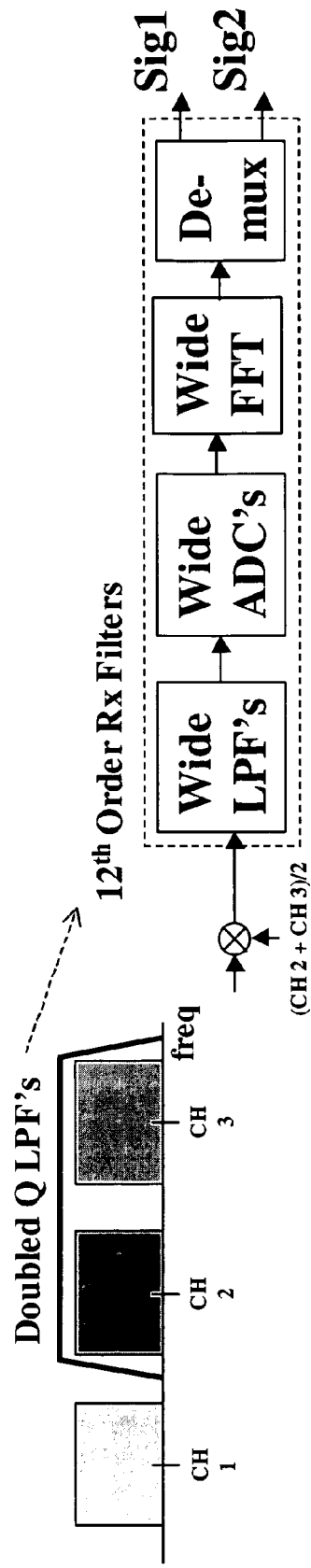
FIG. 12 is a diagram illustrating a $12^{th}$ order low pass filter on the receiver side in a single chain wideband radio with a double Q factor.

FIGS. 11 and 12 illustrate Analog Transmit (Tx)/Receive (Rx) filters. FIG. 11 is a diagram illustrating a $6^{th}$ order low pass filter on the receiver side in a dual-chain wideband radio with normal Q factor. FIG. 12 is a diagram illustrating a $12^{th}$ order low pass filter, for example, on the receiver side in a single chain wideband radio with a double Q factor representing a relatively steep skirt ("brick wall"). Q factor must meet 802.11a/g spectral mask and adjacent channel interference (ACI) requirements. Single channel receiver doubles Tx/Rx filter Q requirements, where Q refers to how narrow a filter is (higher Q is more narrow with steeper skirts). Dual channel receiver uses single channel filters with normal Q factor.

Figure 13:
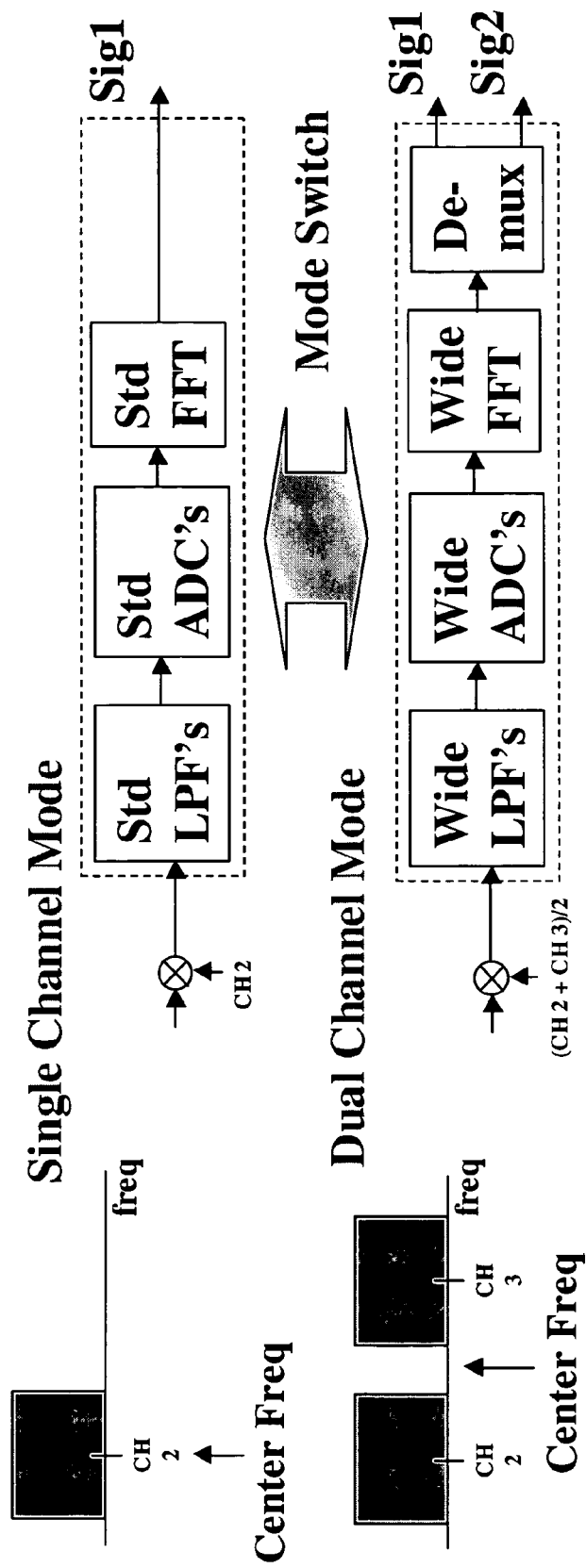
FIG. 13 is a diagram illustrating a switching technique for single and dual chain modes in a bimodal wideband radio receiver.

FIG. 13 is a diagram illustrating a switching technique for single and dual chain modes in a bimodal wideband radio receiver. Synthesizer (and BW) switching issue, it may be desirable to have an 802.11g-like switching operation. Single channel receiver must jump synthesizer frequency when switching between wide and normal packets if tight receive filtering is needed (sensitivity and interference robustness). Dual channel implementation does not jump frequency but requires two synthesizer LO (Local Oscillator) frequencies, though. In this bi-modal implementation, the radio alternates between forms of operation and may assign durations of operation/inoperation allowed for the dual modes.

Figure 14:
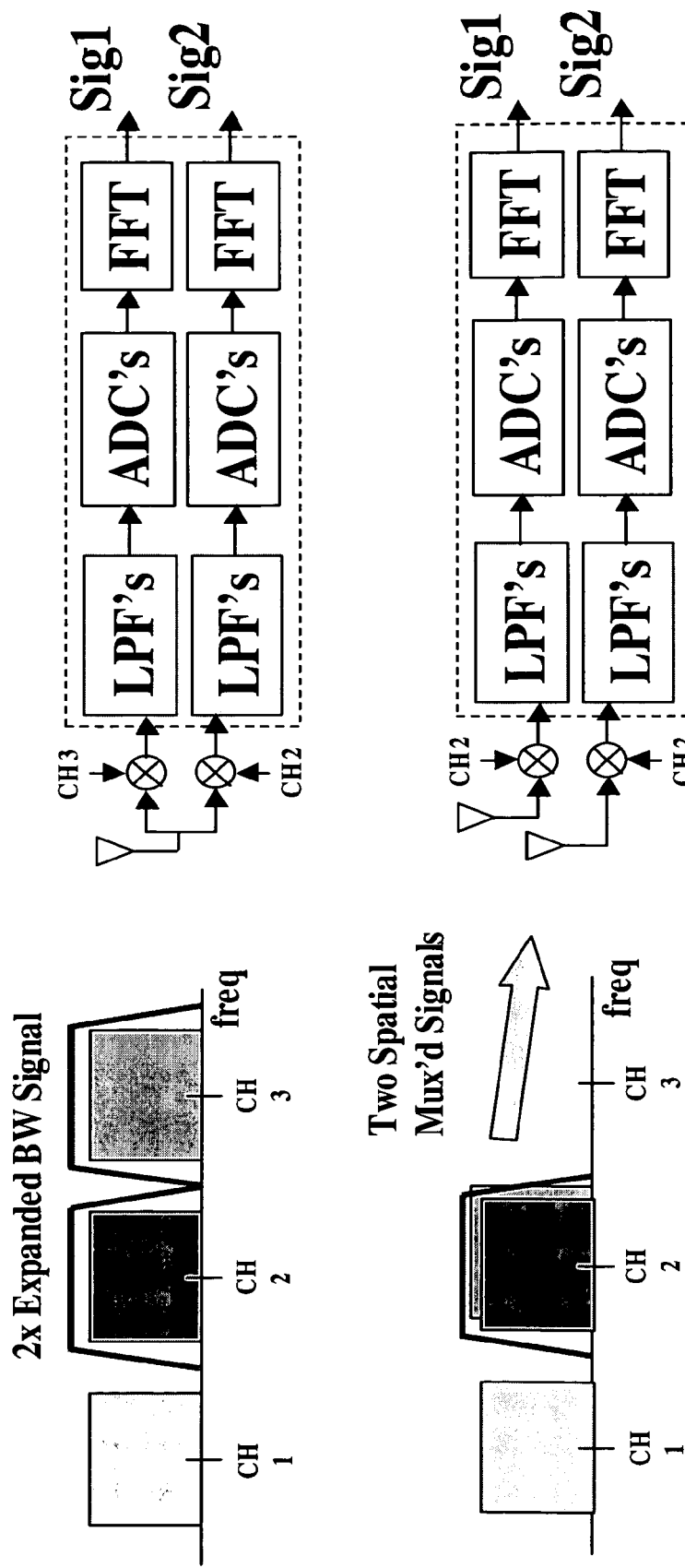
FIG. 14 is a diagram illustrating spatial multiplexing in embodiment using MIMO technique.

FIG. 14 is a diagram illustrating spatial multiplexing in embodiment using multiple input multiple output (MIMO) technique. Multi-channel radio architecture may be implemented for spatial multiplexing. Hence, implementing bandwidth expansion using the multi-channel radio architecture makes a system more 11n ready. With the penalty of added expense and power draw. In the top example shown, the bandwidth is doubled with two signals in parallel. In the second example, bottom, two signals are spatially multiplexed and sit on top of each other. This implementation would require the removal of interference between the two signals.

FIG. 15 is a diagram illustrating a dual chain wideband radio receiver with reference to dual channel protocol management. This relates to PEER related concerns, i.e., the amount of power draw a device requires to operate. This is especially critical in battery powered devices. Using the dual-chain implementation of two radios ganged together in parallel requires greater power that would a single chain custom circuit. In some applications power may not be a prime concern, e.g., where the devices are connected to AC power sources (flat panel displays). The implementation may use a dual channel protocol management function, e.g., cell phone towers that consume two channels in parallel must provide for increased protocol for multiple channels. For instance, a tower may instruct all legacy radios to go to channel 2 and stay off of channel 3 to prevent collision and increase efficiency.

Figure 16:
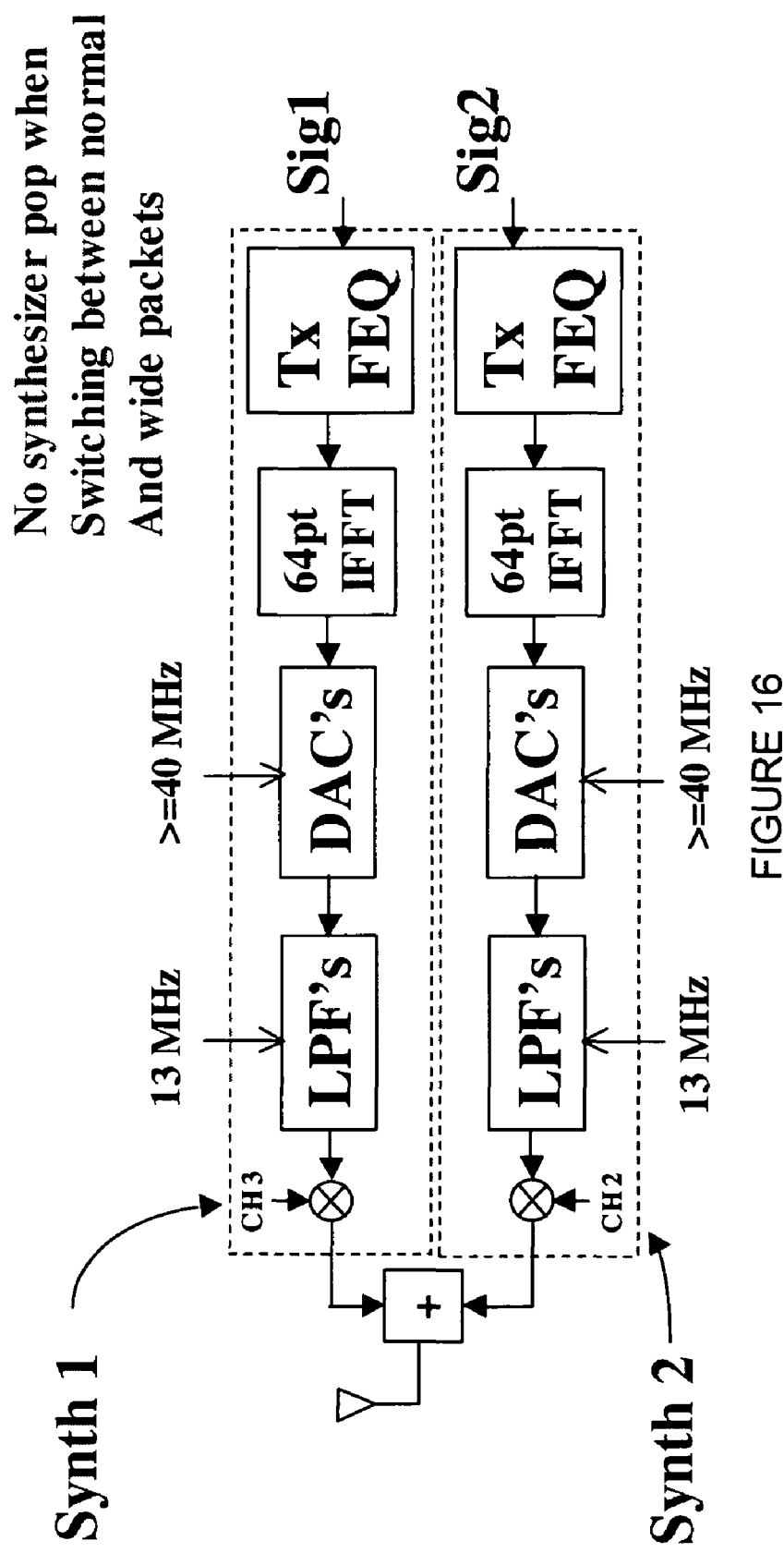
FIG. 16 is a schematic diagram of a dual-chain wideband transmitter.

FIG. 16 is a schematic diagram of a dual-chain wideband transmitter including LPFs, DACs, IFFTs, and Tx FEQs. In this implementation, an expanded Bandwidth (BW) signal may be decomposed into sub-components. The radio frequency-concatenates two Tx signal components at RF (Radio Frequency). A synthesizer may be used to realize the exact two LO offsets needed related to subcarrier spacing (both can have same part per million (PPM) error). Use expanded bandwidth station (XBW STA) (e.g., 40 MHz instead of 20 MHz) to phase-align two chains thru feedback packet, if desirable. This is not viewed as necessary. Use Tx DAC sample rate that allows clean digital synthesis of two Tx signal components with simple reconstruction low pass filter (LPF's).

Figure 17:
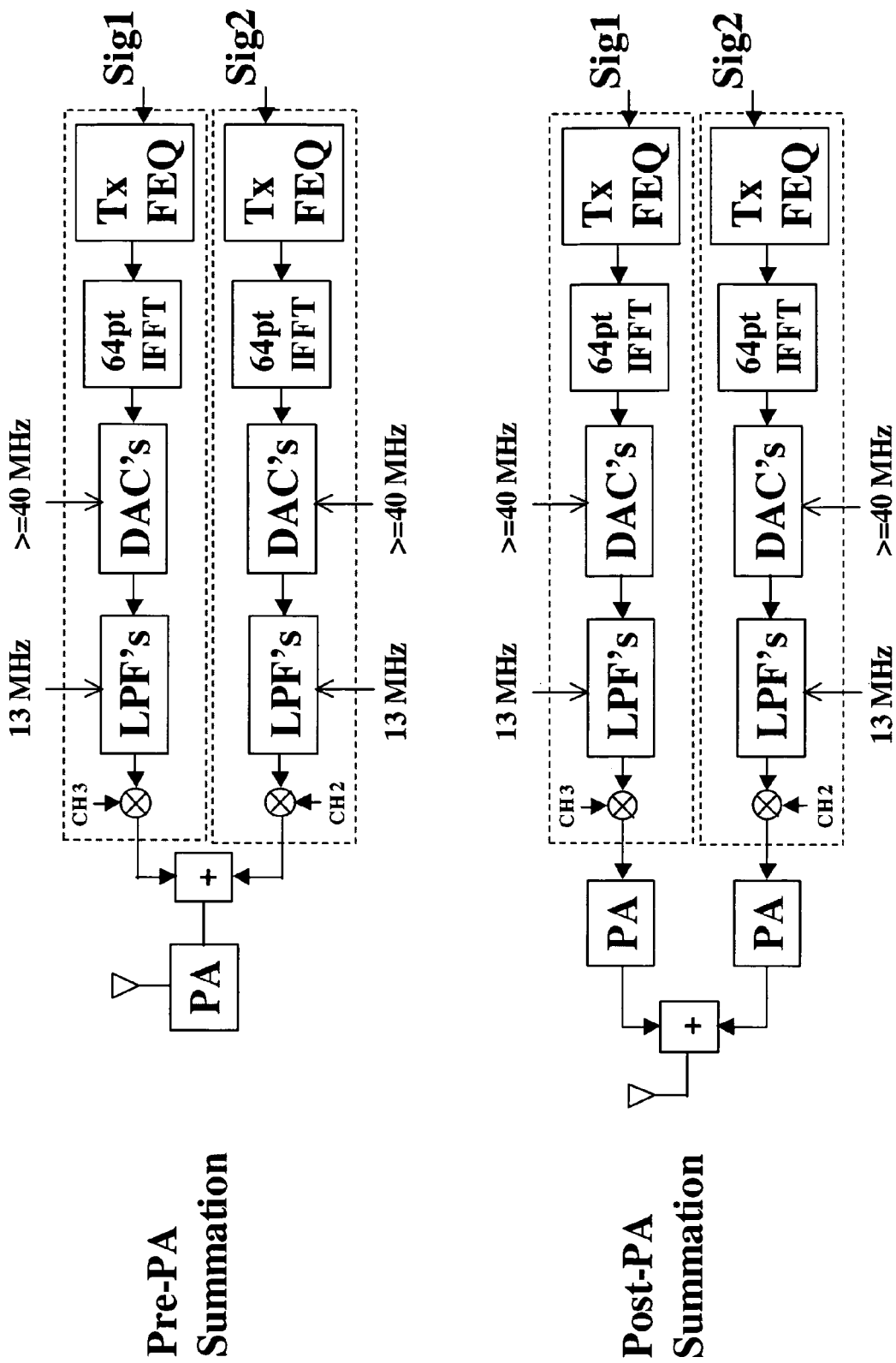
FIG. 17 is a schematic diagram illustrating alternative pre-power amplifier summation and post-power amplifier summation in a dual-chain wideband transmitter.
Figure 18:
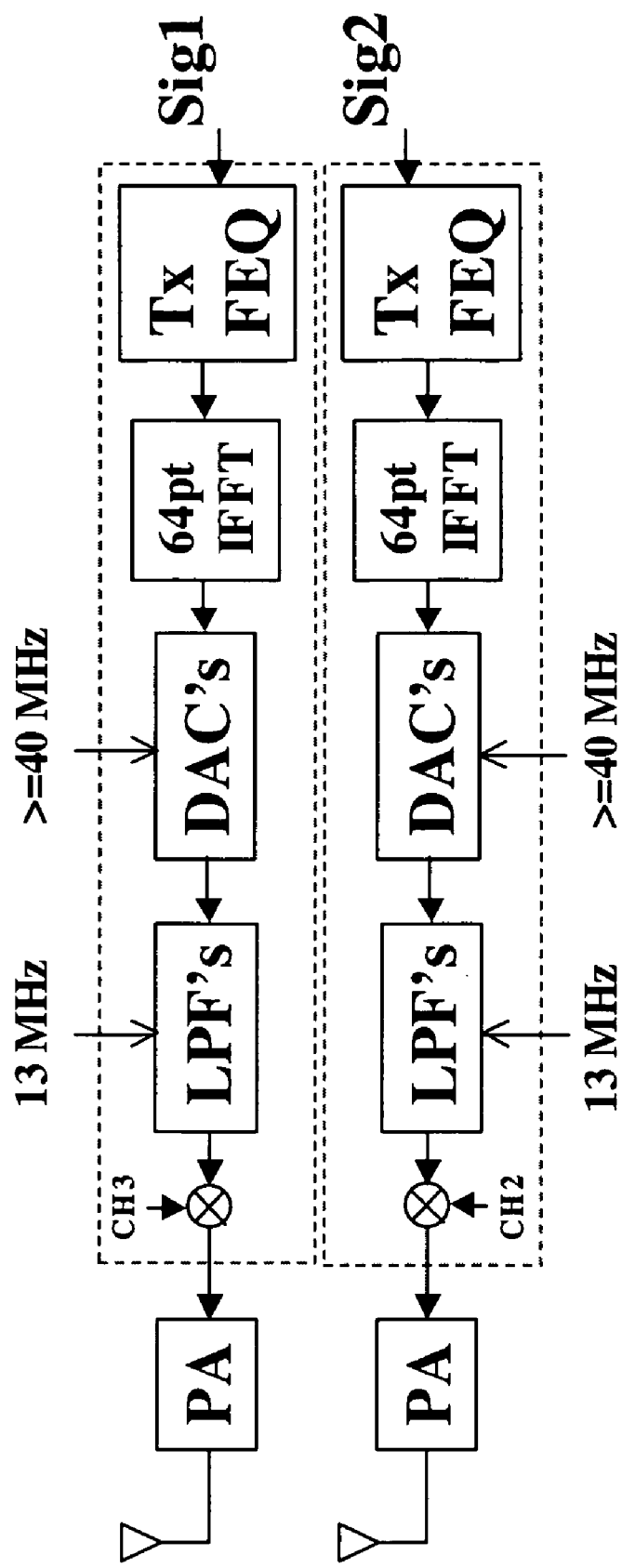
FIG. 18 is a schematic diagram illustrating a post-antenna summation in a dual-chain wideband transmitter.
Figure 19:
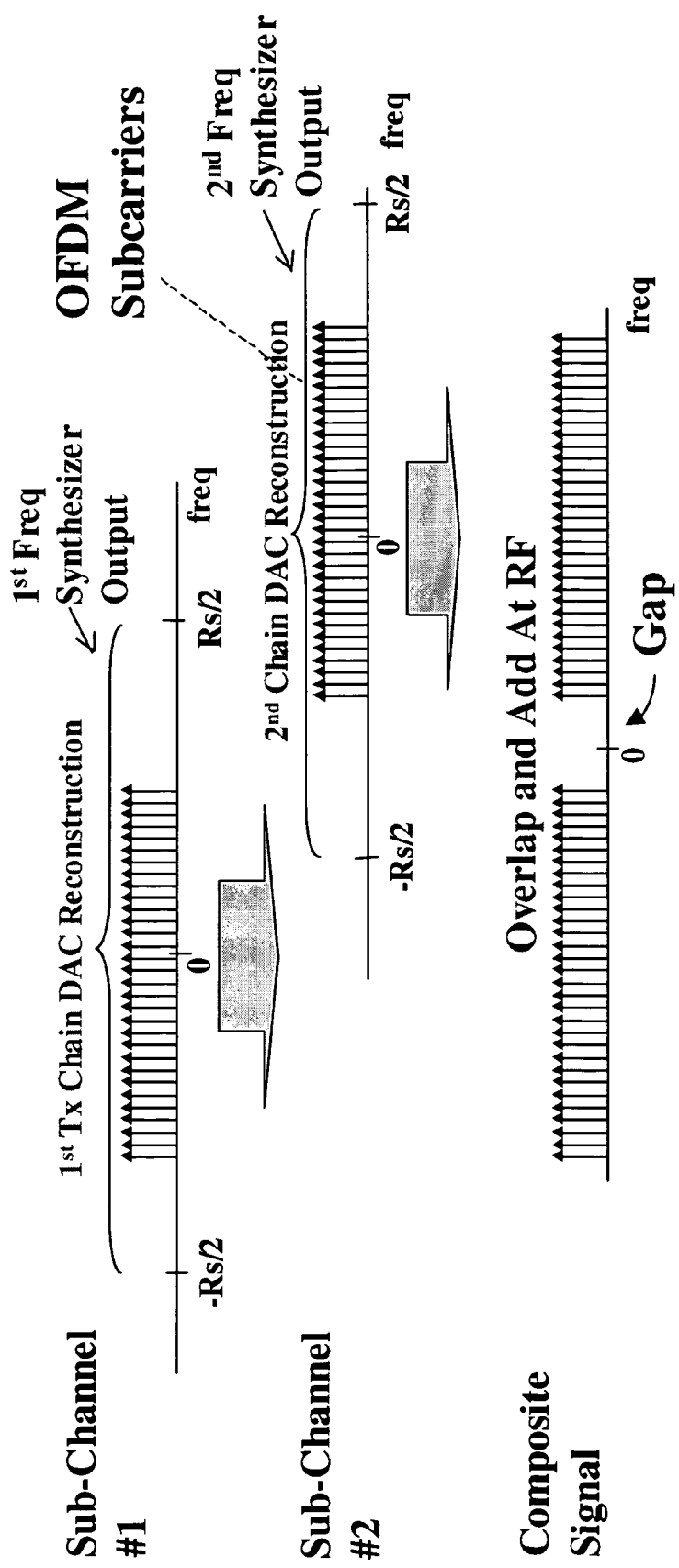
FIG. 19 is a graphical representation of signal components and processing involving two 802.11a signals with a two-channel transmitter.
Figure 20:
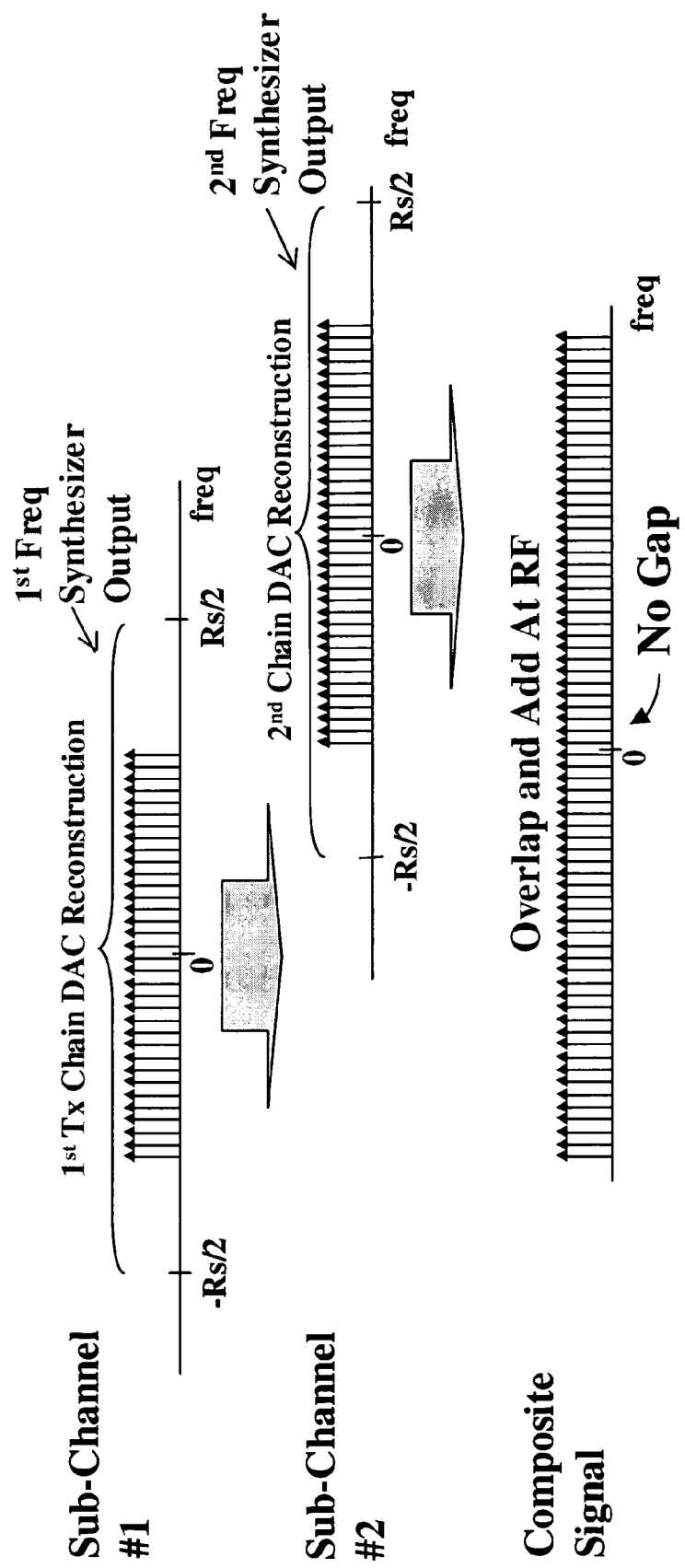
FIG. 20 is a graphical representation of the signal components and processing of FIG. 19 with filled-gap OFDM technique.
Figure 21:
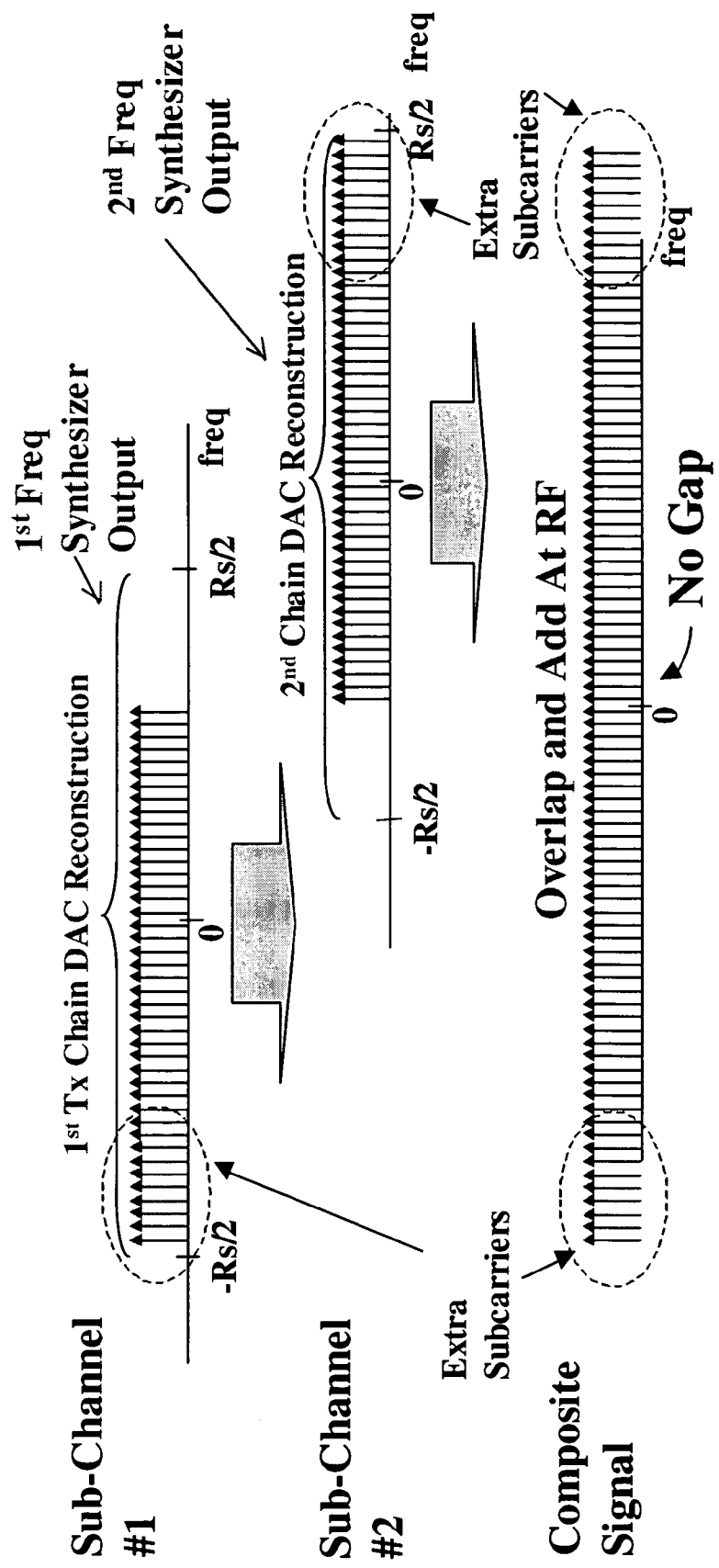
FIG. 21 is a graphical representation of signal components and alternative processing with filled-gap OFDM with extra subcarriers.
Figure 24:
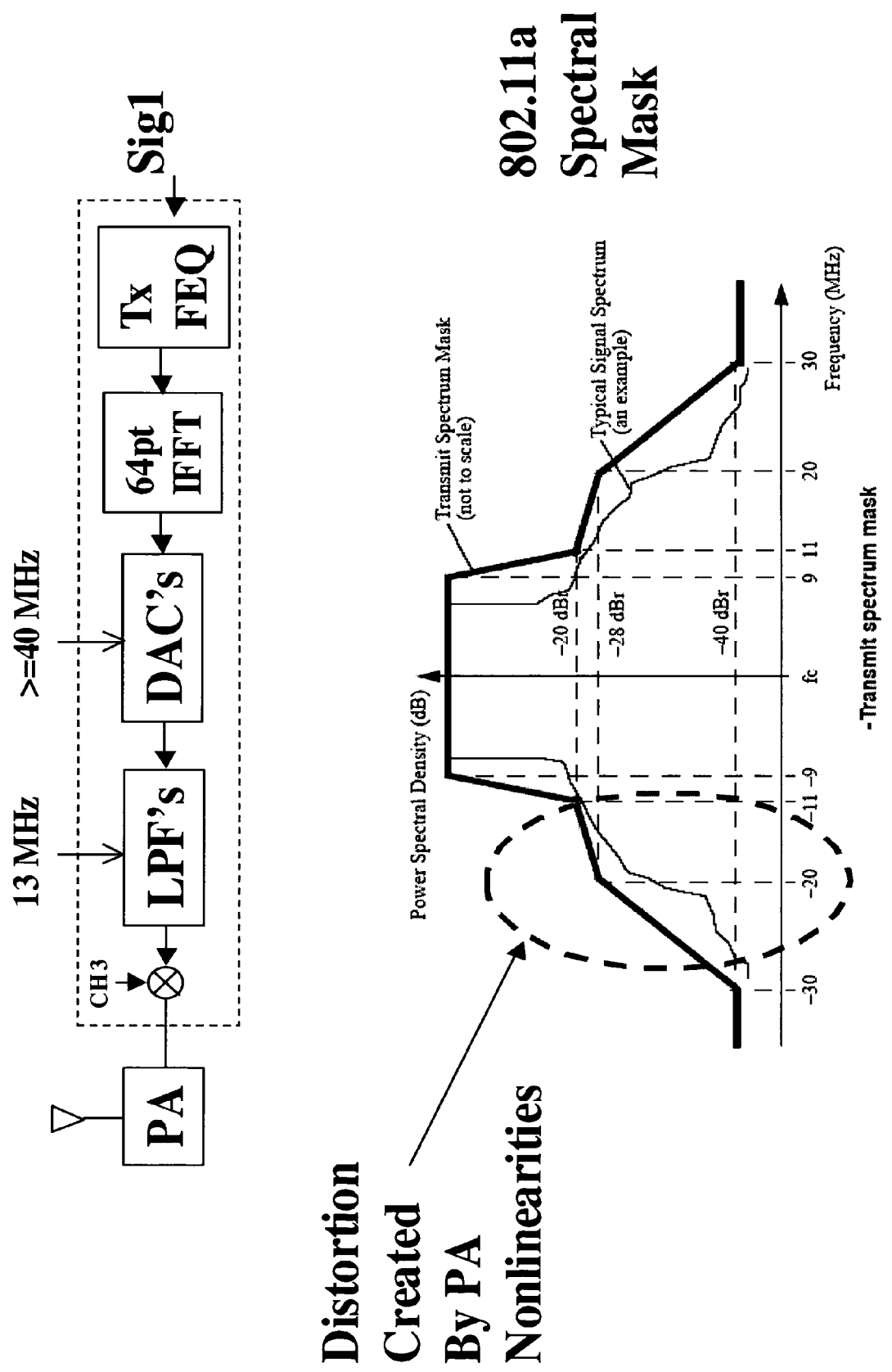
FIG. 24 illustrates power amplifier PSD distortion associated with operation of 802.11a single channel transmitters.
Figure 25:
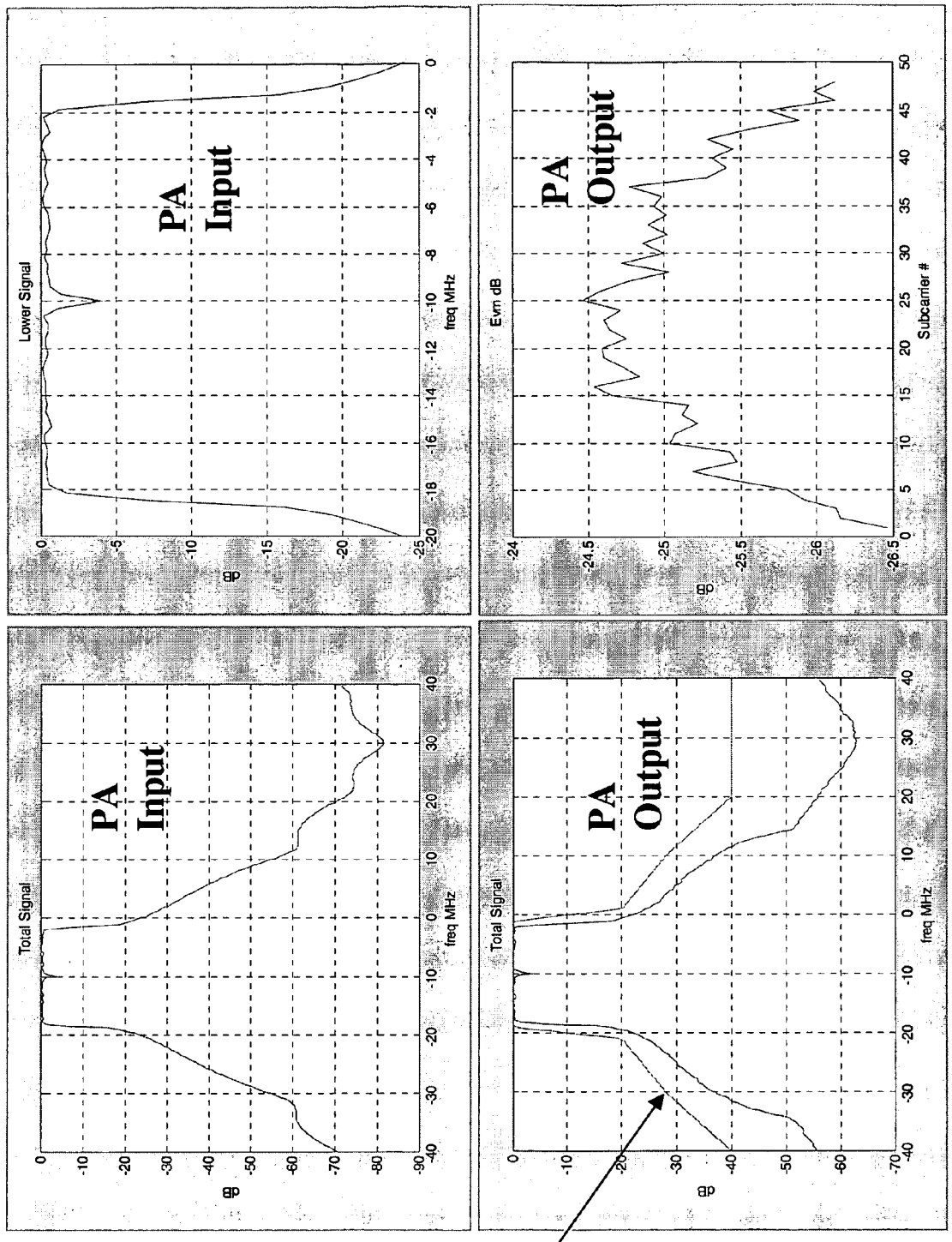
FIG. 25 is a series of graphs representing power amplifier input and output associated with one side of a wideband radio implementation.
Figure 27:
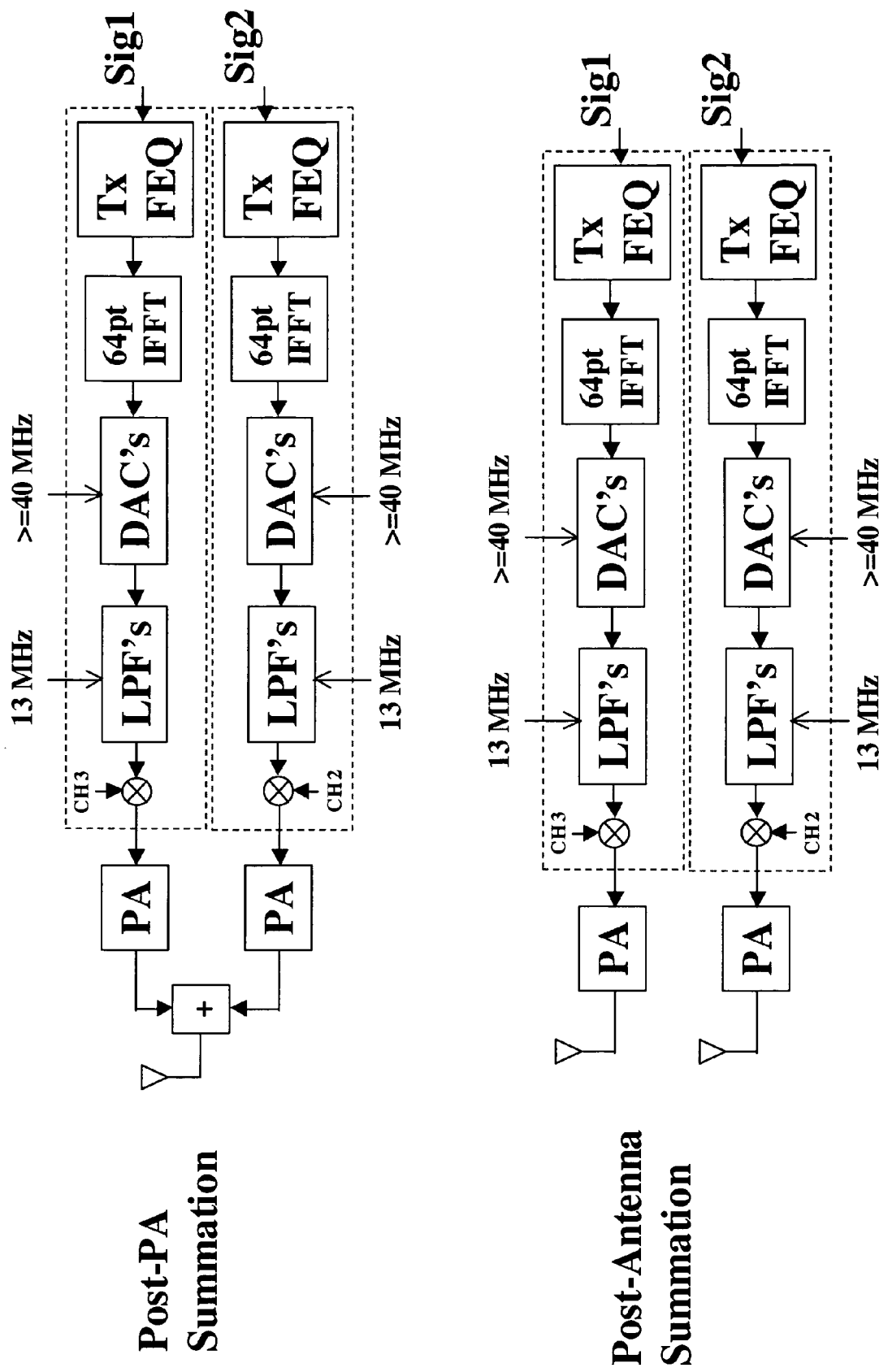
FIG. 27 illustrates both a post-power amplifier summation dual-chain wideband radio implementation and a post-antenna summation dual-chain wideband radio implementation.
Figure 28:
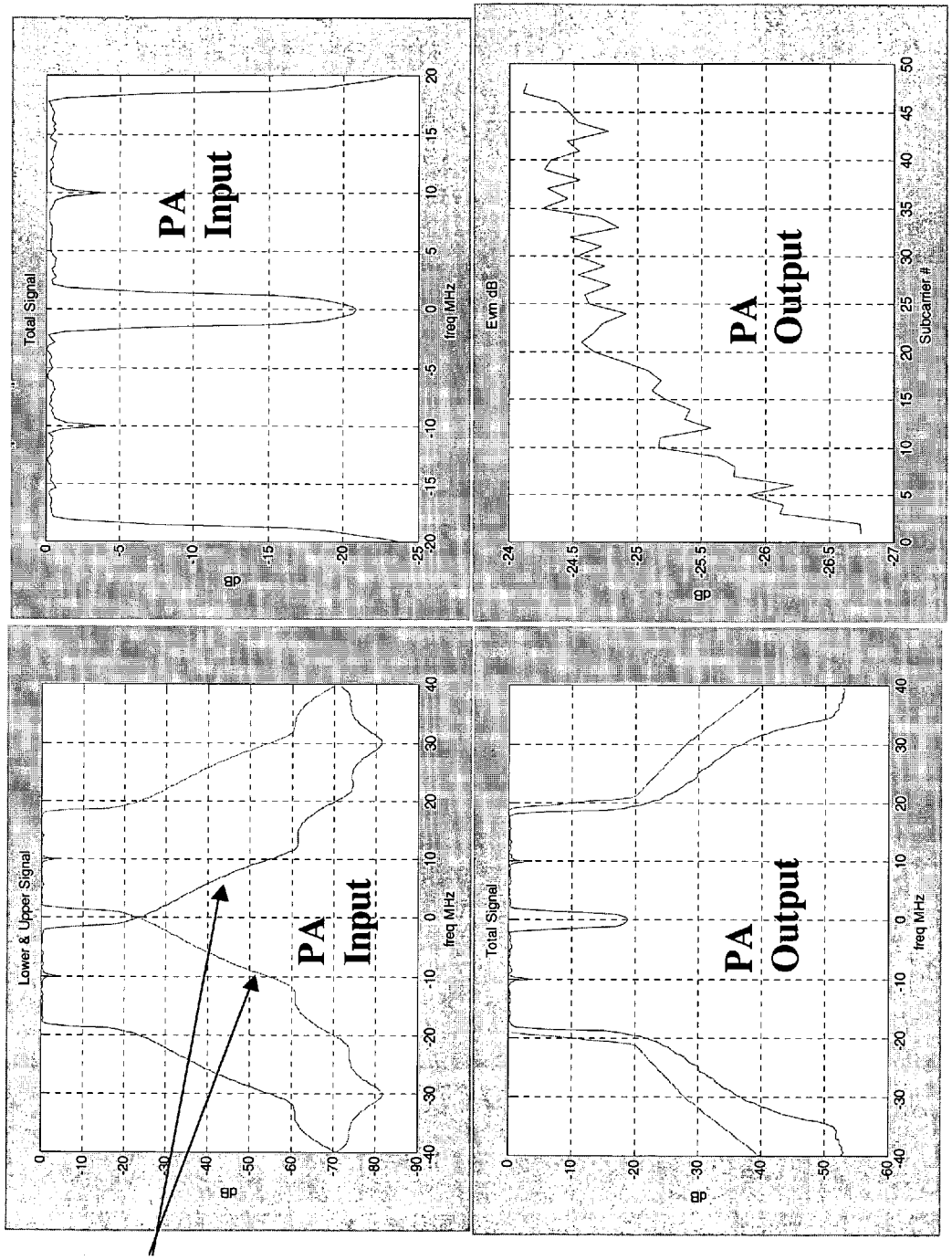
FIG. 28 is a series of graphs representing power amplifier input and output associated with both sides of the post-power amplifier summation dual-chain wideband radio implementation of FIG. 27.
Figure 29:
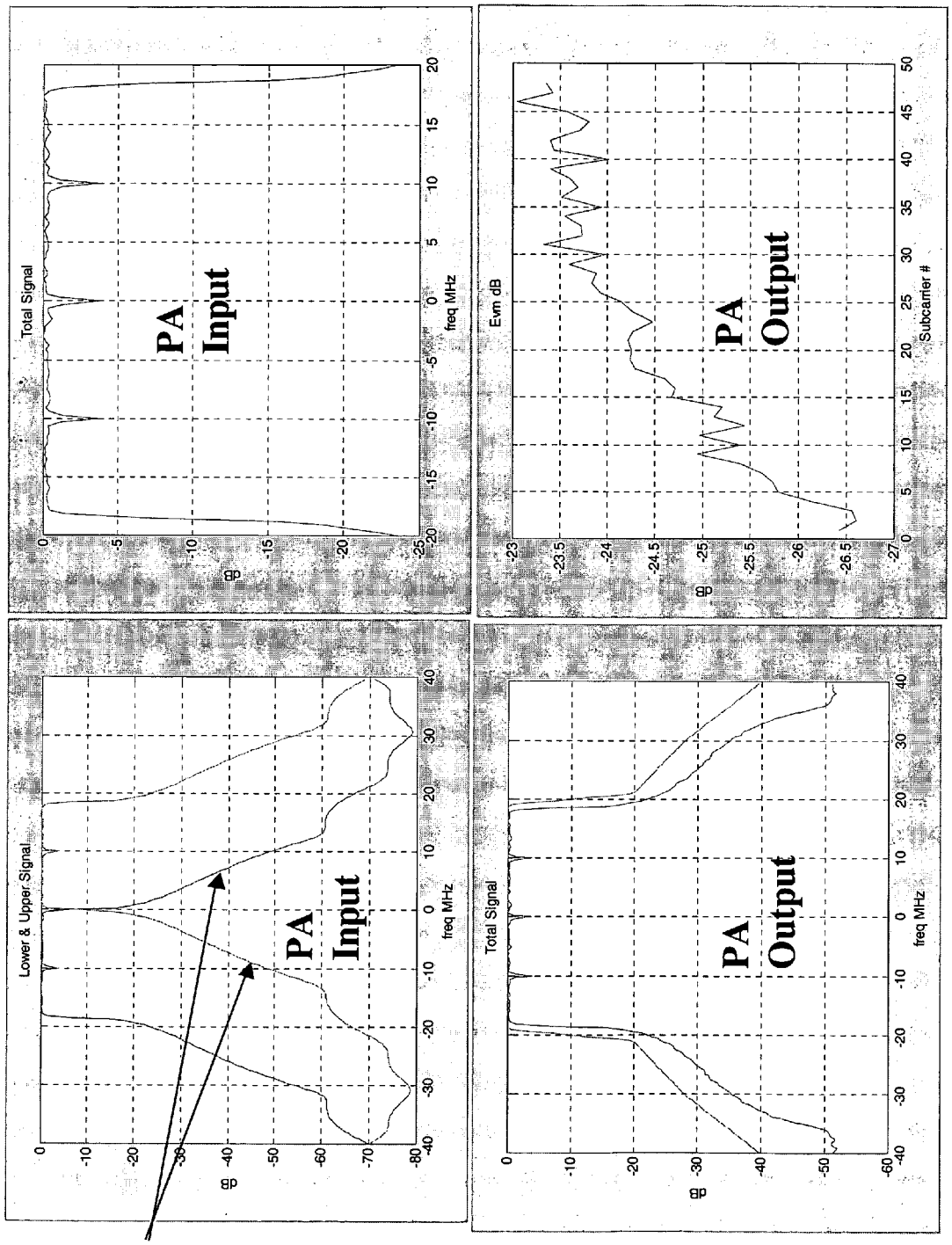
FIG. 29 is a series of graphs representing power amplifier input and output associated with both sides of the post-power amplifier summation dual-chain wideband radio implementation of FIG. 27 characterized with filled-gap OFDM.
Figure 30:
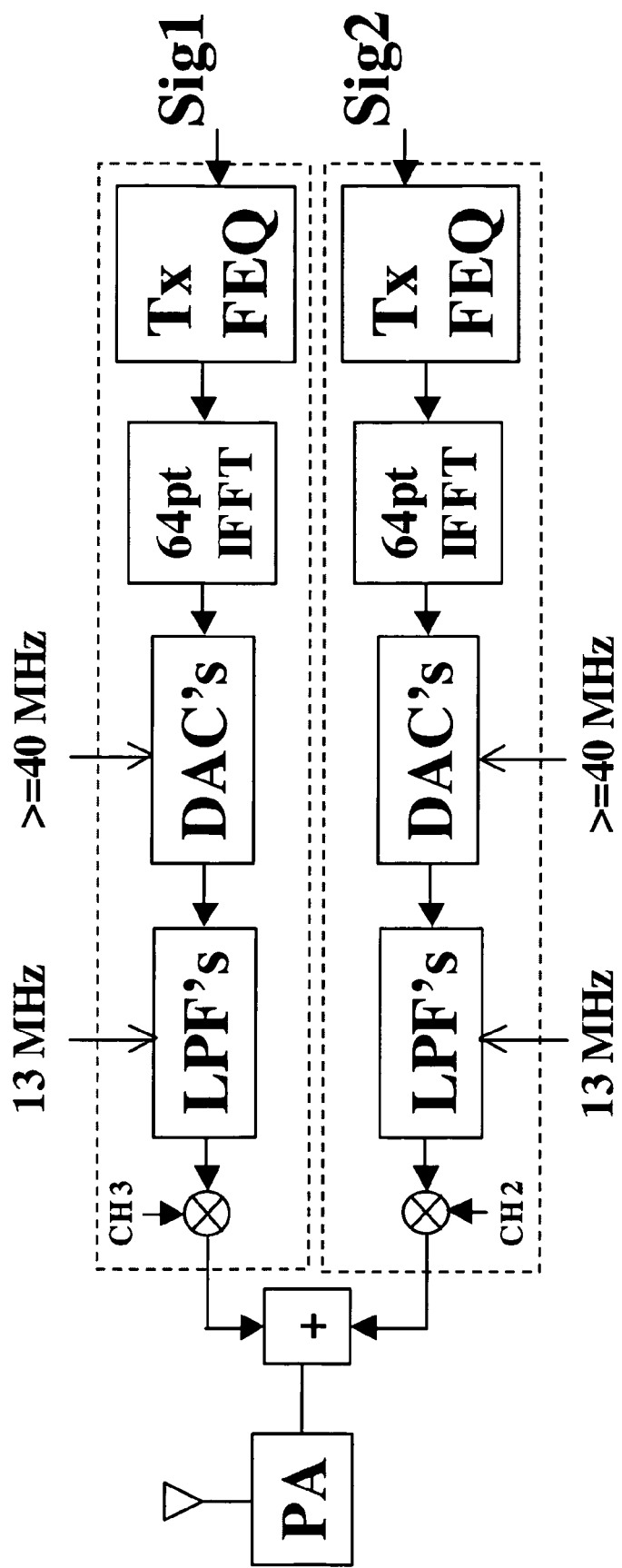
FIG. 30 is a pre-power amplifier summation dual-chain wideband radio implementation.
Figure 31:
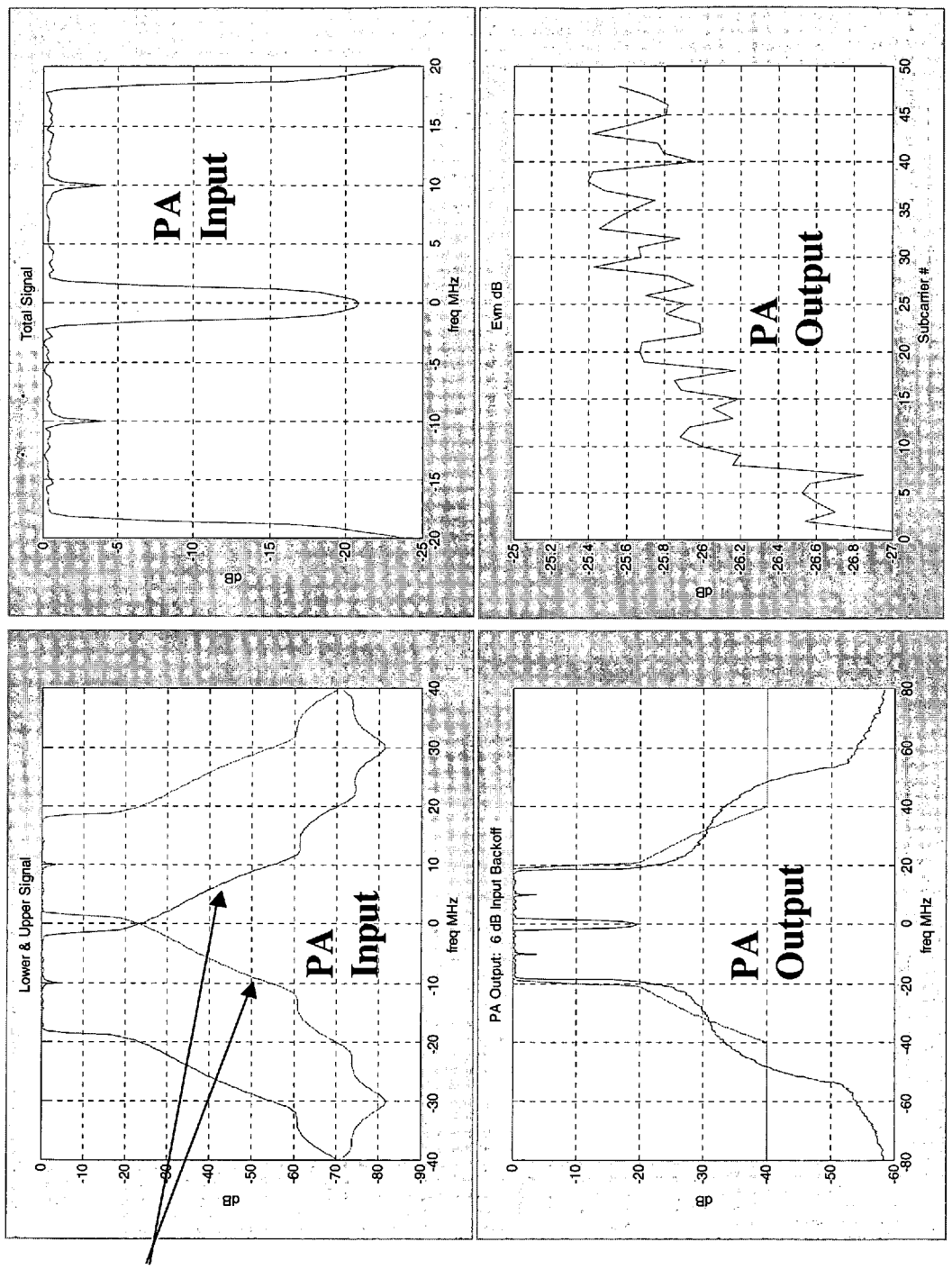
FIG. 31 is a series of graphs representing power amplifier input and output associated with sides of the pre-power amplifier summation dual-chain wideband radio implementation of FIG. 27.
Figure 32:
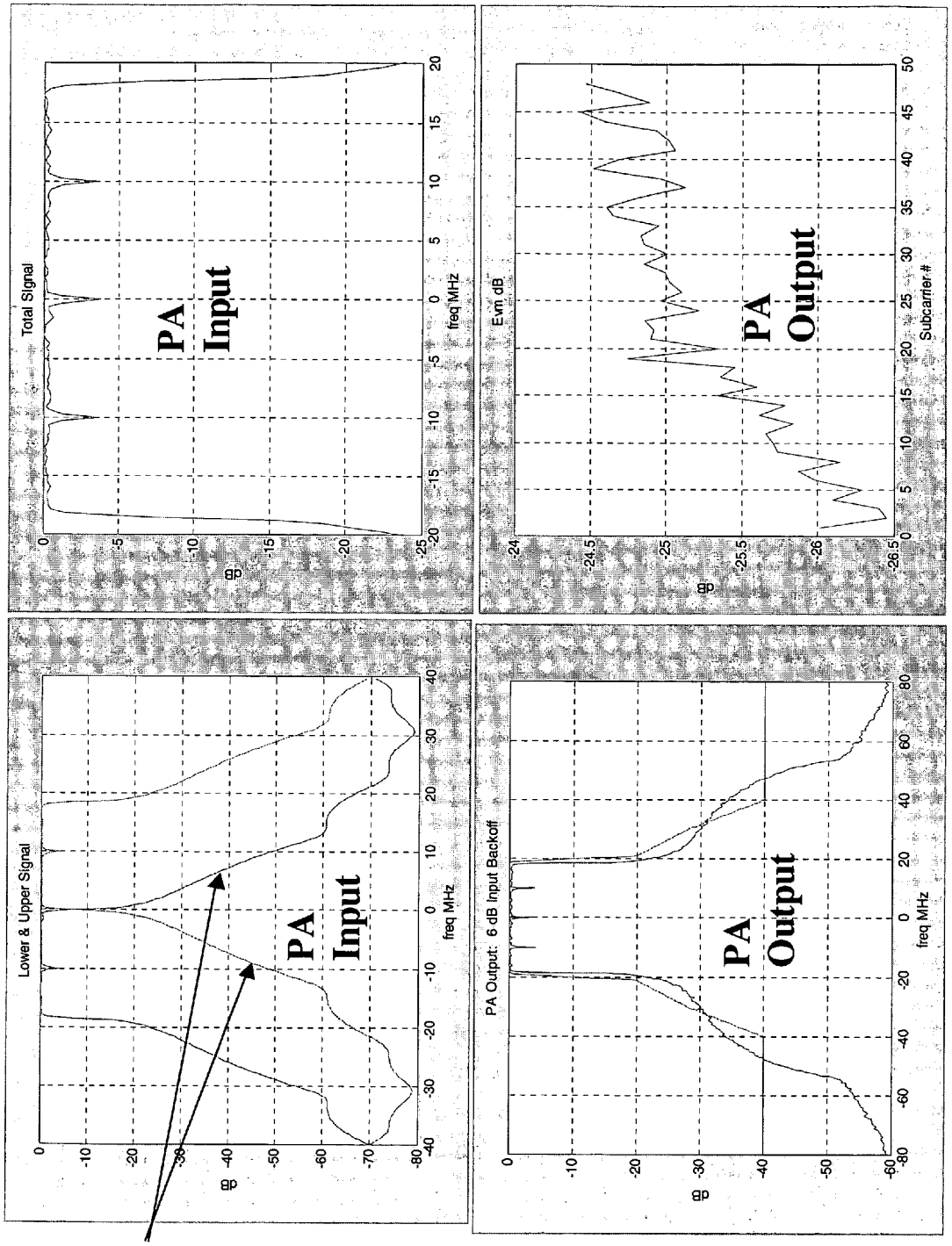
FIG. 32 is a series of graphs representing power amplifier input and output associated with both sides of the pre-power amplifier summation dual-chain wideband radio implementation of FIG. 27 characterized with filled-gap OFDM.

FIGS. 17 through 32 are illustrative of various particular implementations of dual-chain configurations and there attendant design considerations and do not require detailed discussion herein. FIG. 17 is a schematic diagram illustrating alternative pre-power amplifier summation and post-power amplifier summation in a dual-chain wideband transmitter. FIG. 18 is a schematic diagram illustrating a post-antenna summation in a dual-chain wideband transmitter. FIG. 19 is a graphical representation of signal components and processing involving two 802.11a signals with a two-channel transmitter. FIG. 20 is a graphical representation of the signal components and processing of FIG. 19 with filled-gap OFDM technique. FIG. 21 is a graphical representation of signal components and alternative processing with filled-gap OFDM with extra subcarriers. FIG. 22 is a graphical representation of 802.11a subcarrier function associated with FIG. 19. FIG. 23 is a graphical illustration, respectively, of shaped subcarrier spectrum response and OFDM spectrum response in 802.11a example of FIG. 22. FIG. 24 illustrates power amplifier PSD distortion associated with operation of 802.11a single channel transmitters. FIG. 25 is a series of graphs representing power amplifier input and output associated with one side of a wideband radio implementation. FIG. 26 is a chart illustrating the error vector magnitude (EVM) associated with an exemplary 16 QAM 802.11a/g signal. FIG. 27 illustrates both a post-power amplifier summation dual-chain wideband radio implementation and a post-antenna summation dual-chain wideband radio implementation. FIG. 28 is a series of graphs representing power amplifier input and output associated with both sides of the post-power amplifier summation dual-chain wideband radio implementation of FIG. 27. FIG. 29 is a series of graphs representing power amplifier input and output associated with both sides of the post-power amplifier summation dual-chain wideband radio implementation of FIG. 27 characterized with filled-gap OFDM. FIG. 30 is a pre-power amplifier summation dual-chain wideband radio implementation. FIG. 31 is a series of graphs representing power amplifier input and output associated with sides of the pre-power amplifier summation dual-chain wideband radio implementation of FIG. 27. FIG. 32 is a series of graphs representing power amplifier input and output associated with both sides of the pre-power amplifier summation dual-chain wideband radio implementation of FIG. 27 characterized with filled-gap OFDM;

The following discussion concerns the aspect of the invention concerning adaptive anti-aliasing techniques and implementations. One novel technique eliminates aliasing due to adjacent channel waveform. Legacy signals (e.g., one-channel) and wide signals (e.g., multiple-channels) may be arbitrarily interleaved in time (dynamic bandwidth switching) during packet transmission. For an exemplary technique of an embodiment of the present invention, no synthesizer frequency-popping exists when bandwidth switching between packets. Synthesizers may stay tuned to legacy channel centers for most or at all times. Further, synthesizer switches that can take 100 microseconds (μs) to settle may be avoided. Also, adaptive techniques are provided to mitigate the undesired impact of analog-to-digital converter (ADC) sample-rate aliasing. ADC sample-rate aliasing may occur when a wide signal is received by multiple, parallel receive chains designed to receive a single narrow signal. As described hereinbelow, for example, operations at 5 GHz are considered (e.g., 20 MHz legacy channel centers). In another example, operations at 2.4 GHz are considered (e.g., 25 MHz legacy channel centers).

This aspect of the invention concerns filter leakage associated with a radio processing one half of a signal while receiving both halves of the signal. The invention allows for the interfering half of the signal to be applied to subtract, or otherwise cross-compare, with the non-interfering half of the signal to remove the distortion associated with filter leakage. The magnitude of the interference is a function of the front end filter. For example, the subcarrier from the upper half of the signal may come through (leak) when processing the lower half of the signal by the FFT. This is a receiver side design issue associated with wideband radio using the dual-chain implementation, i.e., when two radios are used in parallel to separately process half of the wideband signal (lower and upper halves). This is especially an issue when using the filled-gap technique. If not using the filled-gap mode, then the aliasing is greatly reduced. The anti-aliasing techniques apply equally to the alternative mode operation.

Figure 33:
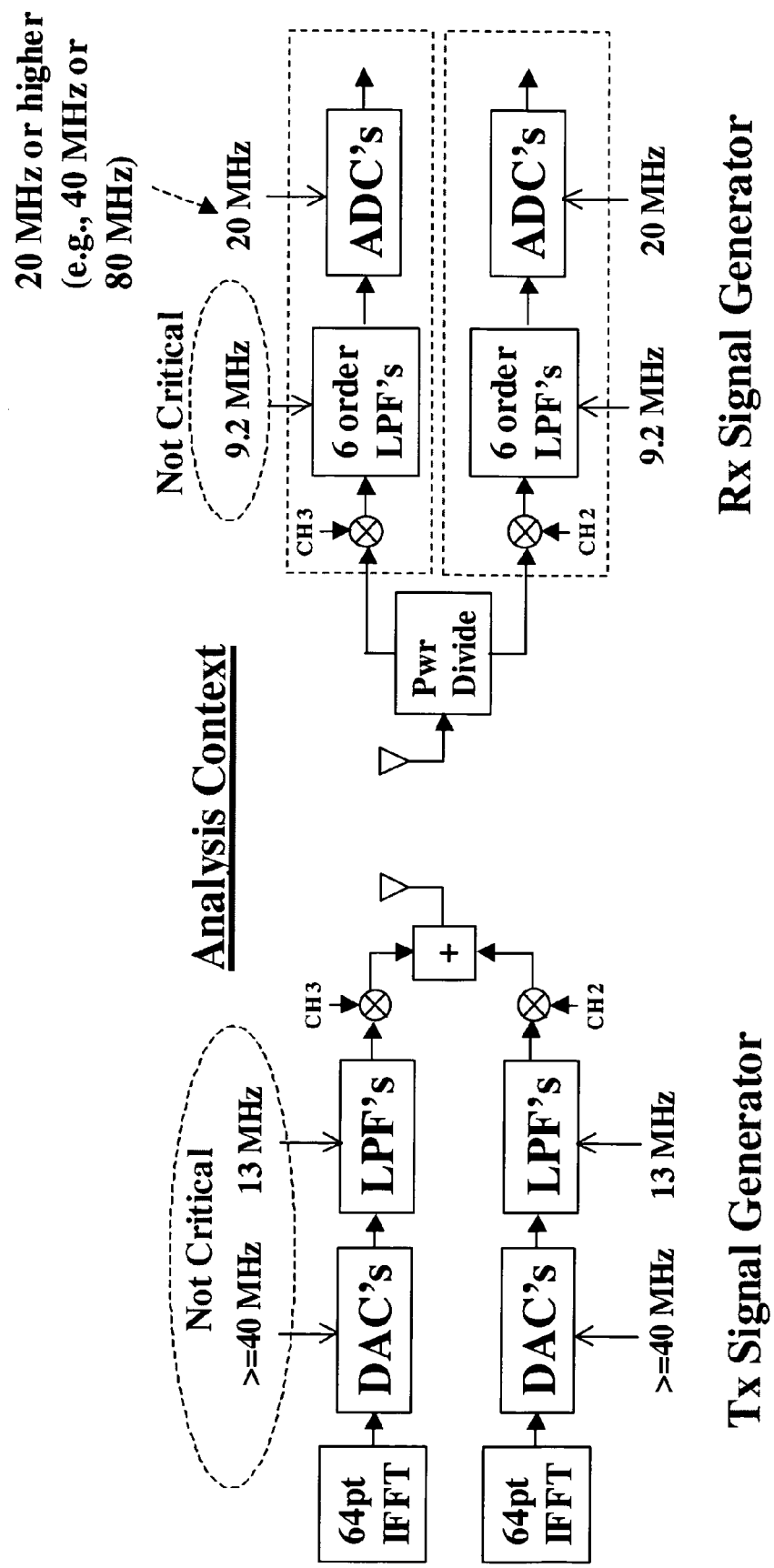
FIG. 33 is a schematic diagram of a dual-chain wideband transmitter and a dual-chain wideband receiver with signal separator.
Figure 34:
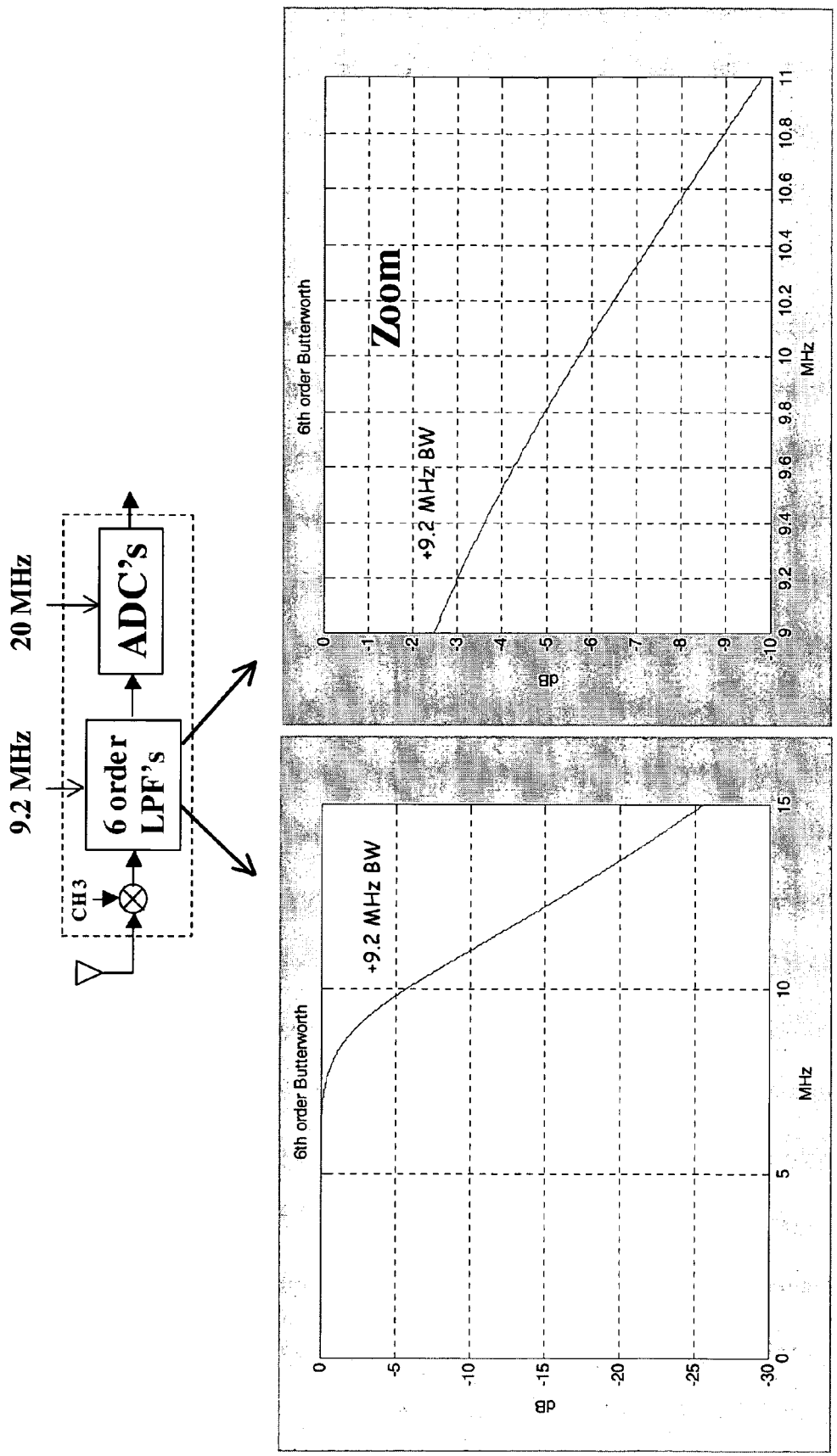
FIG. 34 illustrates operation and response of a $6^{th}$ order Butterworth low pass filter on half of the wideband receiver.
Figure 35:
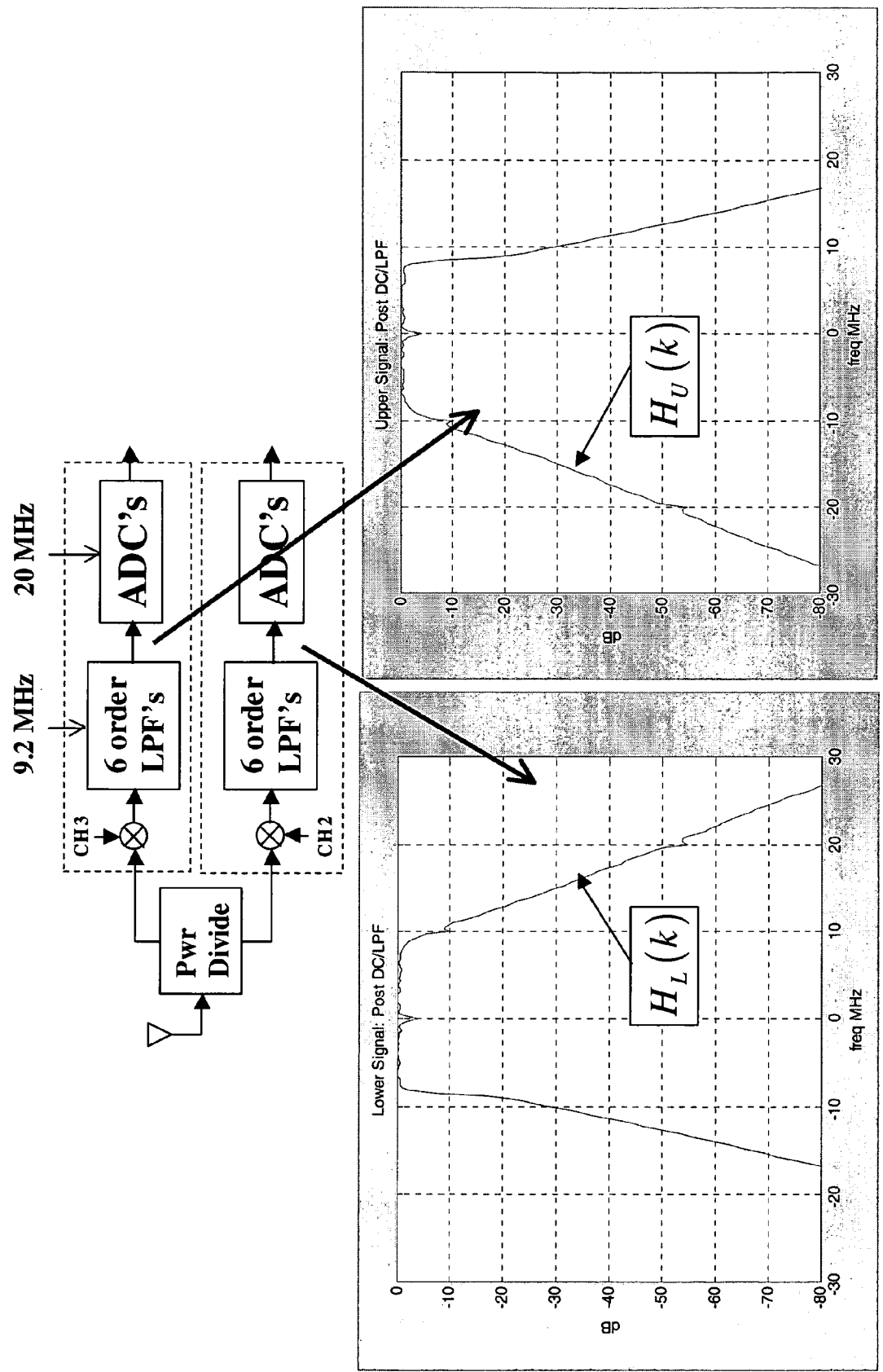
FIG. 35 illustrates operation and response of a $6^{th}$ order Butterworth low pass filter on both the upper and lower halves of the wideband receiver.
Figure 36:
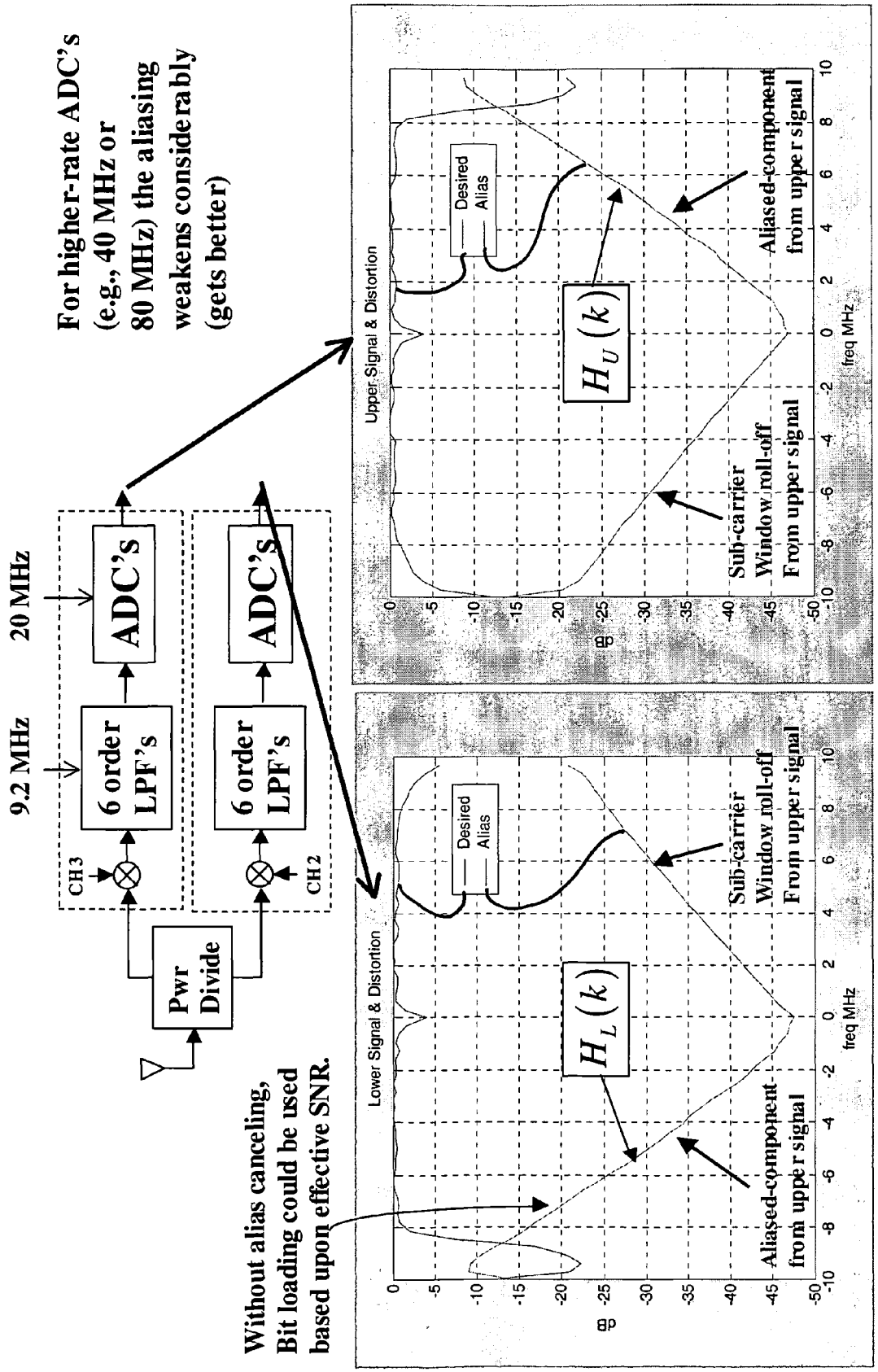
FIG. 36 illustrates upper and lower signal outputs of the dual-chain wideband receiver of FIG. 35 without alias canceling.
Figure 37:
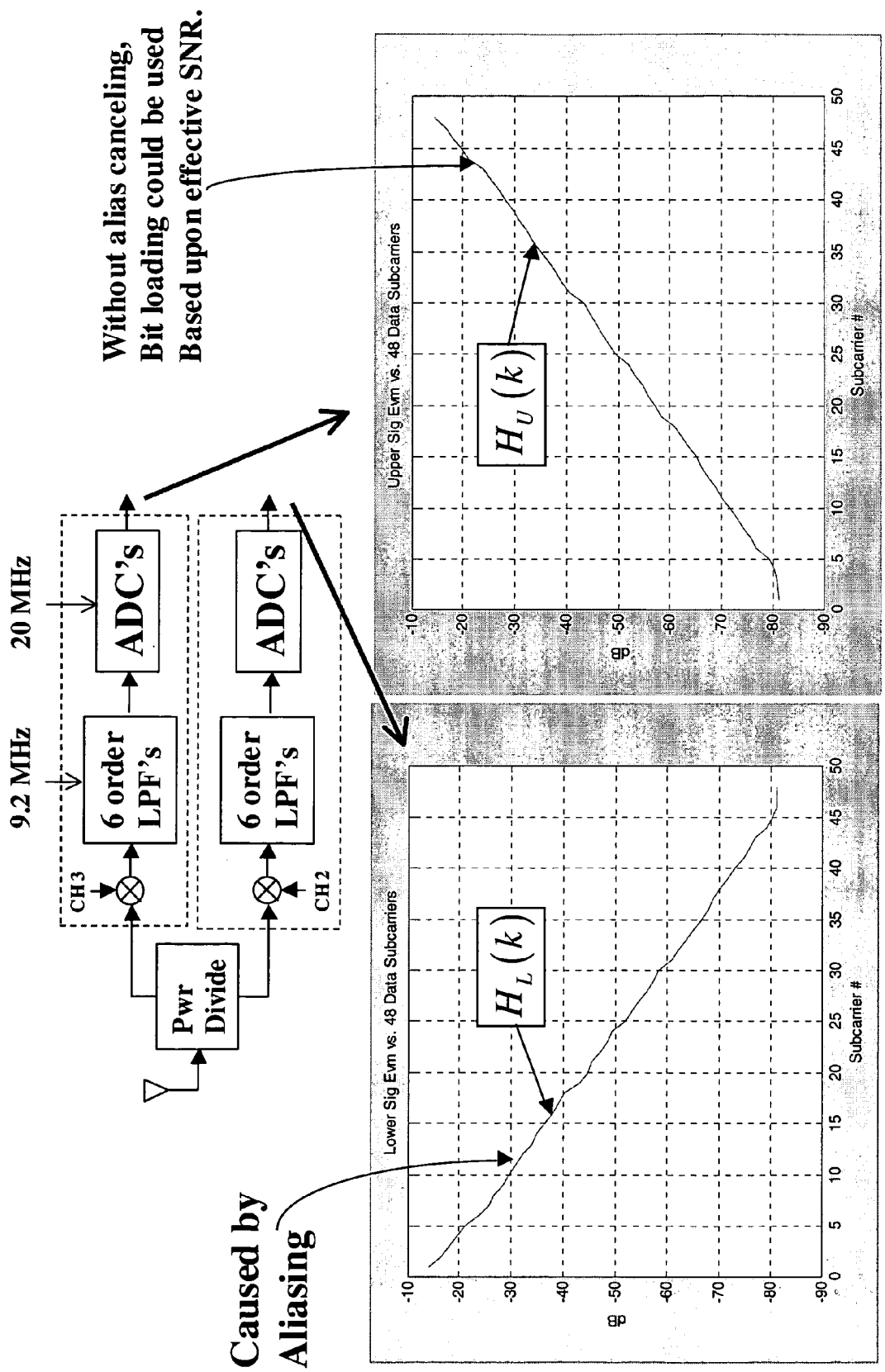
FIG. 37 illustrates the EVM and effects of aliasing associated with the upper and lower signals of the wideband receiver of FIG. 35.
Figure 38:
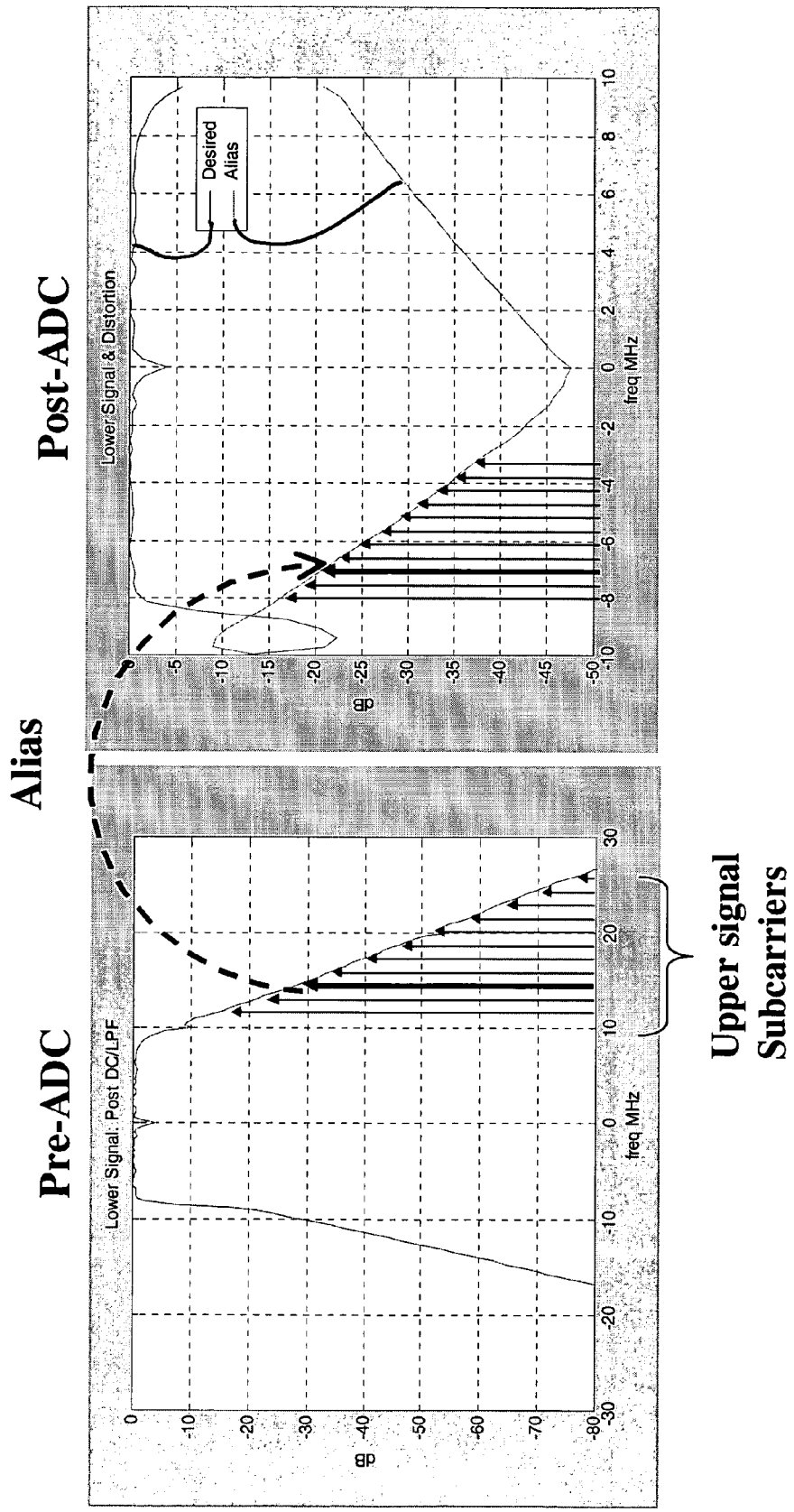
FIG. 38 illustrates the effects of subcarriers in upper signal aliasing into the lower signal in a wideband receiver.

FIG. 33 is a schematic diagram of a dual-chain wideband transmitter and a dual-chain wideband receiver with signal separator. FIG. 34 illustrates operation and response of a 6$^{th}$ order Butterworth low pass filter on half of the wideband receiver. FIG. 35 illustrates operation and response of a 6$^{th}$ order Butterworth low pass filter on both the upper and lower halves of the wideband receiver in filled-gap operation, where lower signal is represented as $H_L(k)$ and the upper signal is represented by $H_U(k)$ at the filter output. FIG. 36 illustrates upper and lower signal outputs at the ADCs of the dual-chain wideband receiver of FIG. 35. FIG. 37 illustrates the EVM and effects of aliasing associated with the upper and lower signals at the outputs of the ADCs of the wideband receiver of FIG. 35. FIG. 38 illustrates the effects of subcarriers in upper signal aliasing into the lower signal in a wideband receiver.

Figure 39:
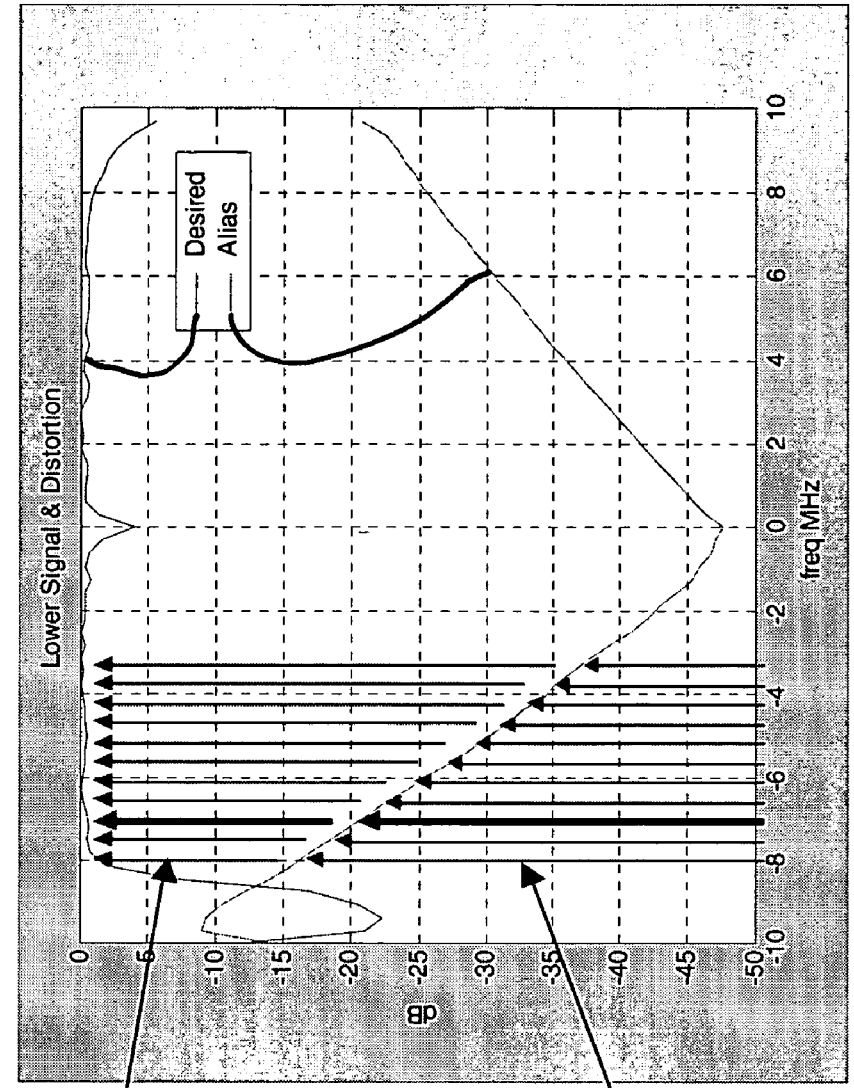
FIG. 39 illustrates the desired and undesired subcarrier components in a post-ADC lower signal and distortion in a wideband receiver resulting from aliasing with no frequency offset.
Figure 40:
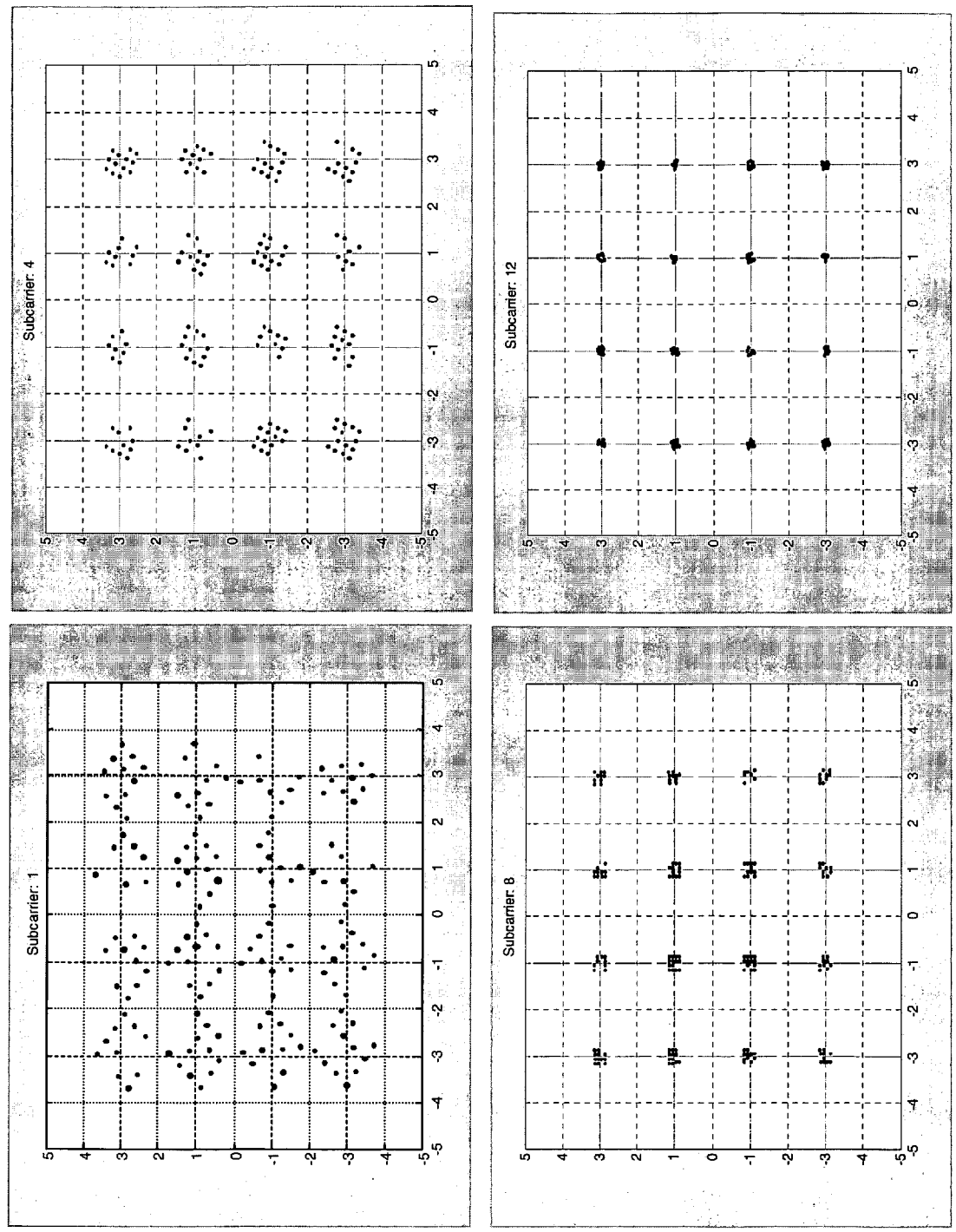
FIG. 40 is a series of graphs representing relationship between upper signal aliases to lower signal on 16 QAM subcarrier.

FIG. 39 illustrates the desired and undesired subcarrier components in a post-ADC lower signal and distortion in a wideband receiver resulting from aliasing with no frequency offset. FIG. 40 is a series of graphs representing the relationship between upper signal aliases to lower signal on 16 QAM subcarrier. With no offset the problem is elegant, use upper signal FFT to cancel aliasing on the lower signal.

Figure 41:
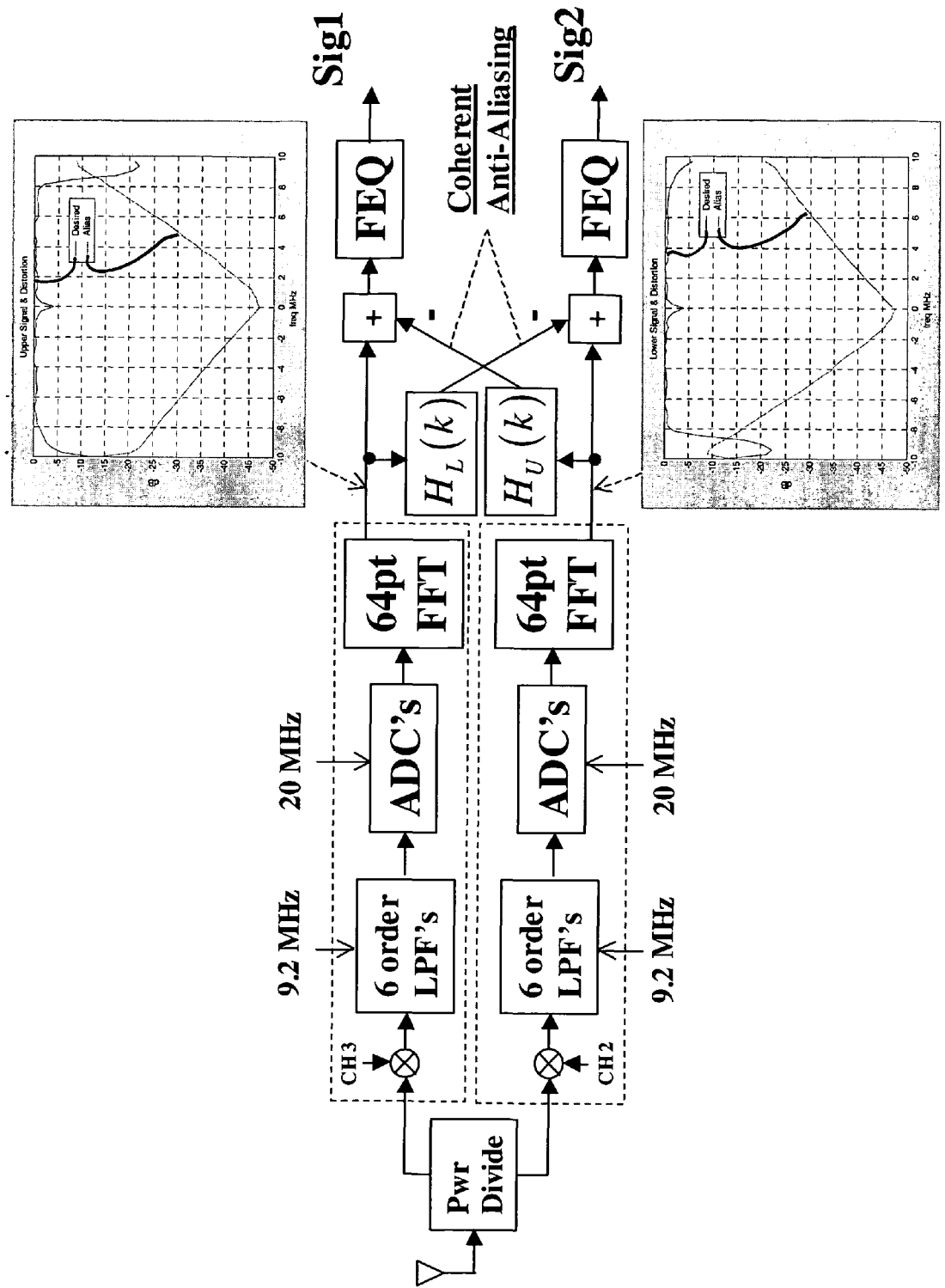
FIG. 41 illustrates coherent anti-aliasing technique applied to the upper and lower signal components of a dual-chain wideband receiver.

FIG. 41 illustrates coherent anti-aliasing technique applied to the upper and lower signal components of a dual-chain wideband receiver and the responses associated therewith.

In one exemplary radio embodiment, the frequency offsets are eliminated at the ADCs to pre-correct frequency offsets prior to Rx ADC'S. There are a number of acceptable methods having advantages and disadvantages, for example, Frac-N (or other type of frequency synthesizer capable of high resolution frequency steps) may be used on transmit or receive (100 microseconds settling time (can't be switched often)). In another example, Tx digital pre-correction may be implemented in RTL (e.g., a language used to describe digital circuits). In another example, STA (or AP (e.g., access point in a WLAN cell)) may be implemented to do all the work on downlink from AP to STA (D/L) & uplink from STA to AP (U/L). For transmit pre-correction, PPM offset may be communicated for time tracking to a receiver. Frequency offset elimination management may be simplified if wide packets are sent using D/L. For example, if normal channel packets for ACK are used, then no U/L pre-correction is needed.

Figure 42:
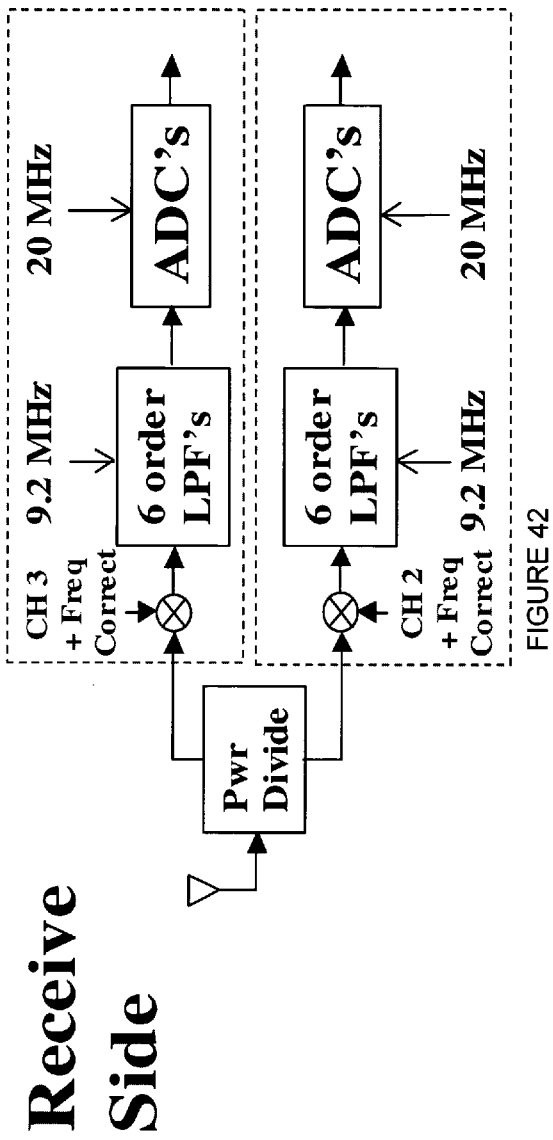
FIG. 42 is a schematic diagram of a dual-chain wideband receiver with frequency correction.
Figure 43:
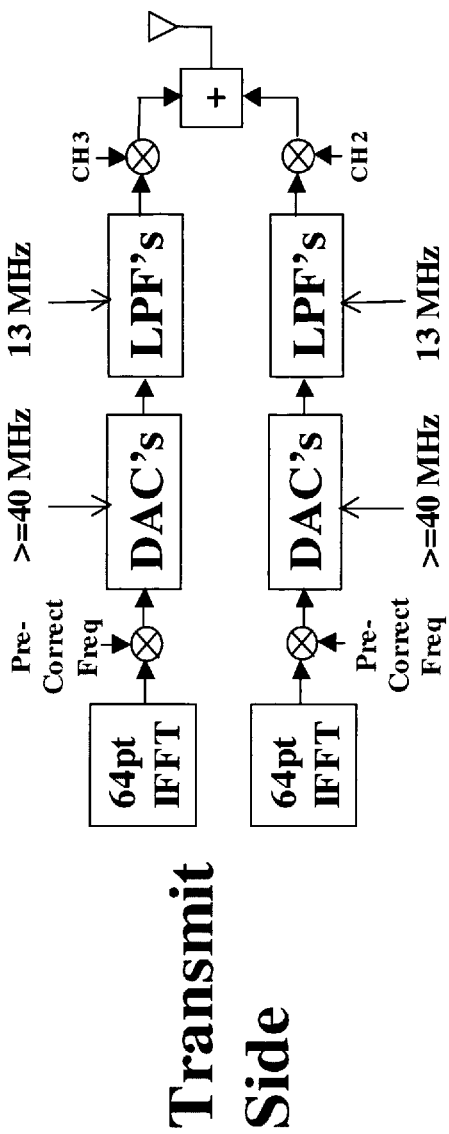
FIG. 43 is a schematic diagram of a dual-chain wideband transmitter with frequency pre-correction.

FIG. 42 is a schematic diagram of a dual-chain wideband receiver with frequency correction and FIG. 43 is a schematic diagram of a dual-chain wideband transmitter with frequency pre-correction.

Figure 44:
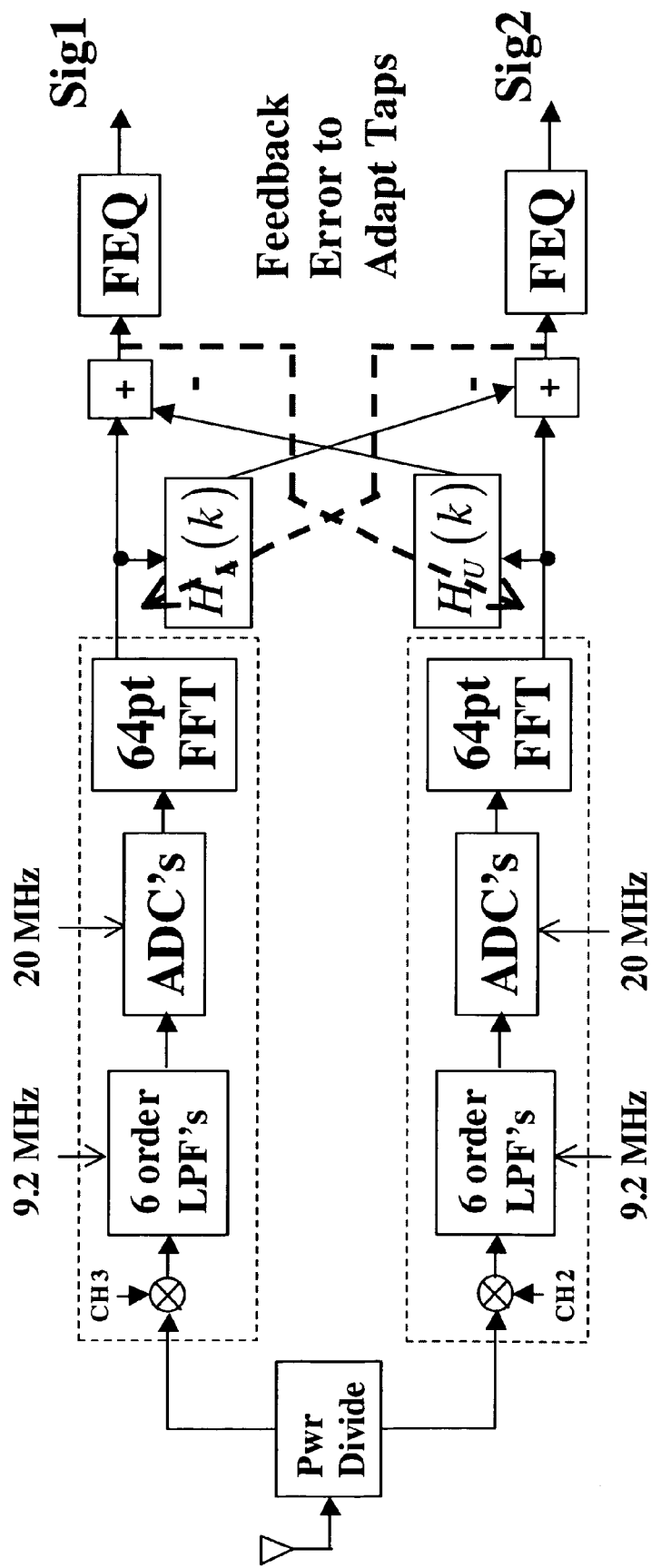
FIG. 44 is a illustrates a feedback error, anti-aliasing technique applied to the upper and lower signal components of a dual-chain wideband receiver.

FIG. 44 is a illustrates a feedback error, anti-aliasing technique applied to the upper and lower signal components of a dual-chain wideband receiver. Various adaptation techniques may be implemented. For example, the least-mean-squared (LMS) technique may be used.

Figure 45:
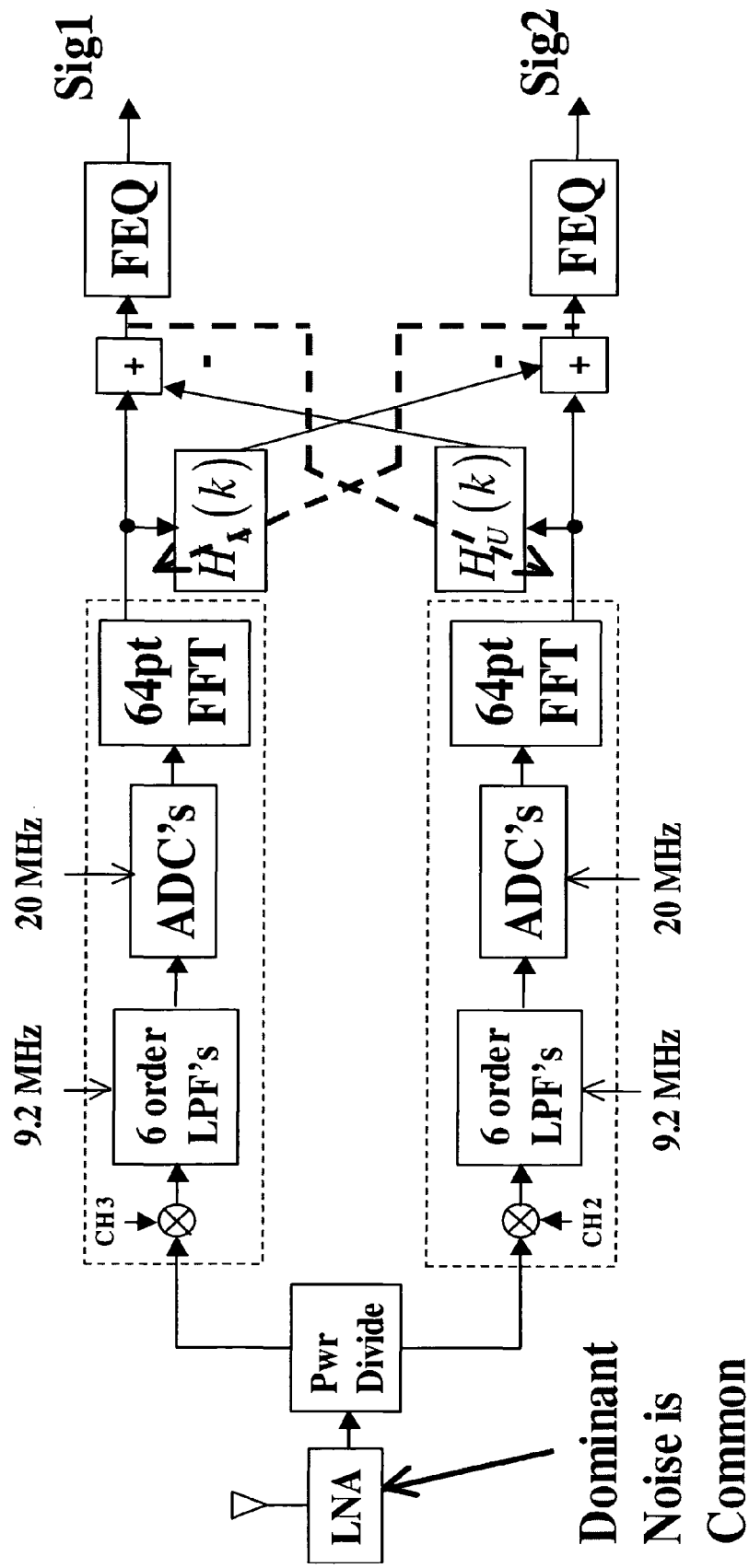
FIG. 45 is a illustrates a feedback technique for anti-aliasing in a dual-chain wideband receiver.

FIG. 45 is a illustrates a feedback technique for anti-aliasing in a dual-chain wideband receiver. Any signal common to both Rx chains may be used to train/track anti-alias—desired packets, noise. If dominate noise is common to both chains, the noise can be used to adapt the taps. An embodiment of the present invention may involve defining a special signal that may be used to train (e.g., bootstrap) the anti-alias canceling circuit. This waveform could be used in various formats, including: in a preamble; a broadcast beacon from AP; embedded periodically in signal. A suggested waveform may involve using an interleaved subcarrier pattern relative to upper/lower signals. This may be extensible to more than two channels. The pattern is flexible. A key concept: do not transmit concurrently both the upper and lower subcarriers with the same index number. Special training process involving interleaved subcarriers may be as follows. Step 1: Lower signal transmits using odd numbered subcarriers; Upper signal transmits using even numbered subcarriers. Step 2: Lower signal transmits using even numbered subcarriers; Upper signal transmits using odd numbered subcarriers. Receiver may measure the alias this way. FIG. 46 illustrates a special training technique utilizing interleaved subcarriers and acquisition with long sync.

In design, there are issues with sending or receiving upper/lower signals with separate antennae and 20 MHz ADCs. Exemplary situation: the transmitter has one antenna. Signal components multipath fade in unison where upper and lower signals tend to have same (or similar) power level. More complex exemplary situation, the transmitter has two antennas and/or, the receiver has two antennas. Signal components multipath fade independent where upper and lower channels may differ in power level. Impact of harder exemplary situation: dynamic range requirements increase for receiver's anti-aliasing circuit and preamble training pattern is more essential.

Figure 47:
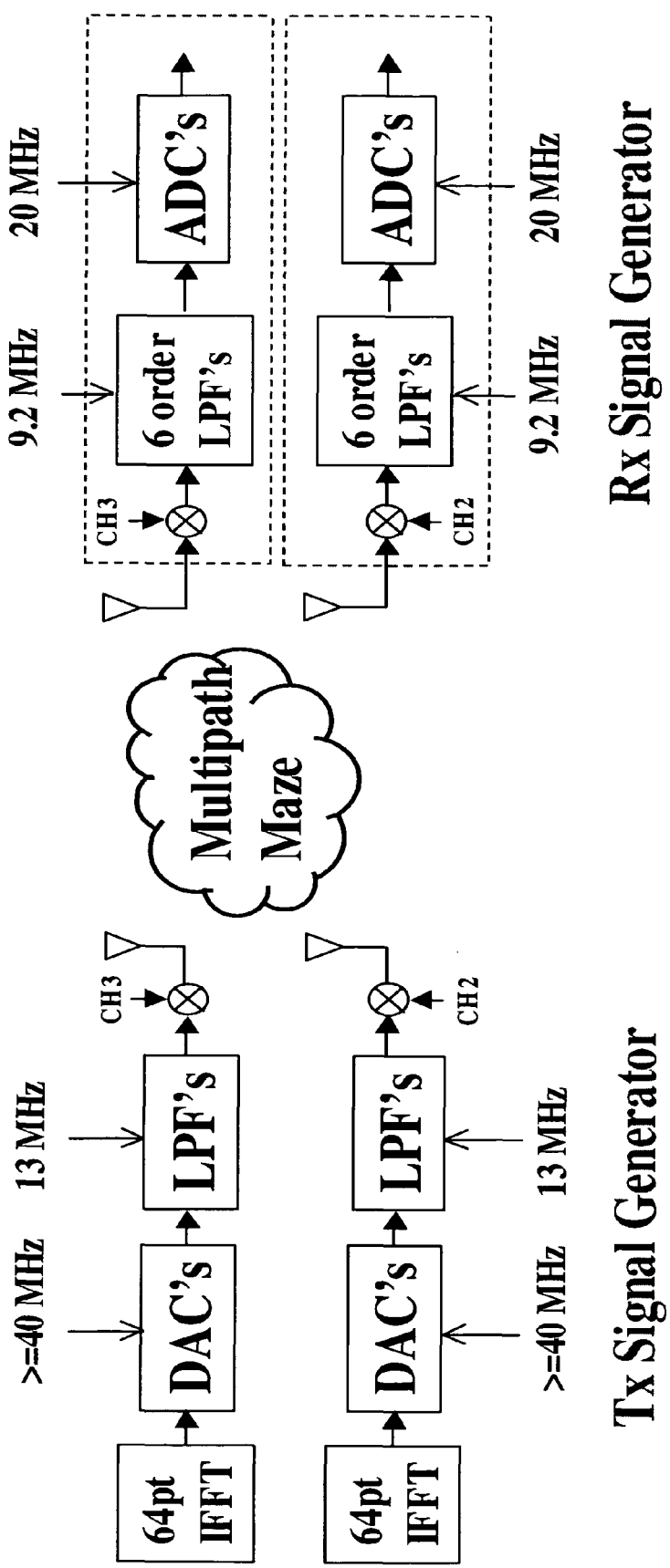
FIG. 47 illustrates fading issues associated with multiple antennae in receivers and transmitters in multi-channel communications.

FIG. 47 illustrates fading issues associated with multiple antennae in receivers and transmitters in multi-channel communications. In one exemplary radio set-up either Tx has separate antennas or Rx has separate antennas or both. Problem is that fading is "independent" between Tx-Rx pairs, power difference between upper and lower signal (ACI), and spectrum difference between upper and lower signal. Tend to lose aliasing visibility with 20 MHz ADC's. Different for every AP-STA radio-pair. Exemplary solution is to use XBW only on D/L to STA.

Frequency offset may be avoided in this architecture. With no frequency offset, each upper signal subcarrier aliases exactly on a corresponding lower signal subcarrier. An interference subcarrier may leak onto exactly one desired subcarrier. Exploits the orthogonal nature of OFDM. With frequency offset, alias subcarriers fall "in-between" desired subcarriers. One interference subcarriers may leak onto many desired subcarriers. There are many interference subcarriers. All the previous comments/architectures apply to the alternative mode. More subcarriers may be used to increase the data rate. All the Tx and Rx techniques carry over directly. Also, works for 25 MHz channel spacing at 2.4 GHz and other specifics.

Figure 48:
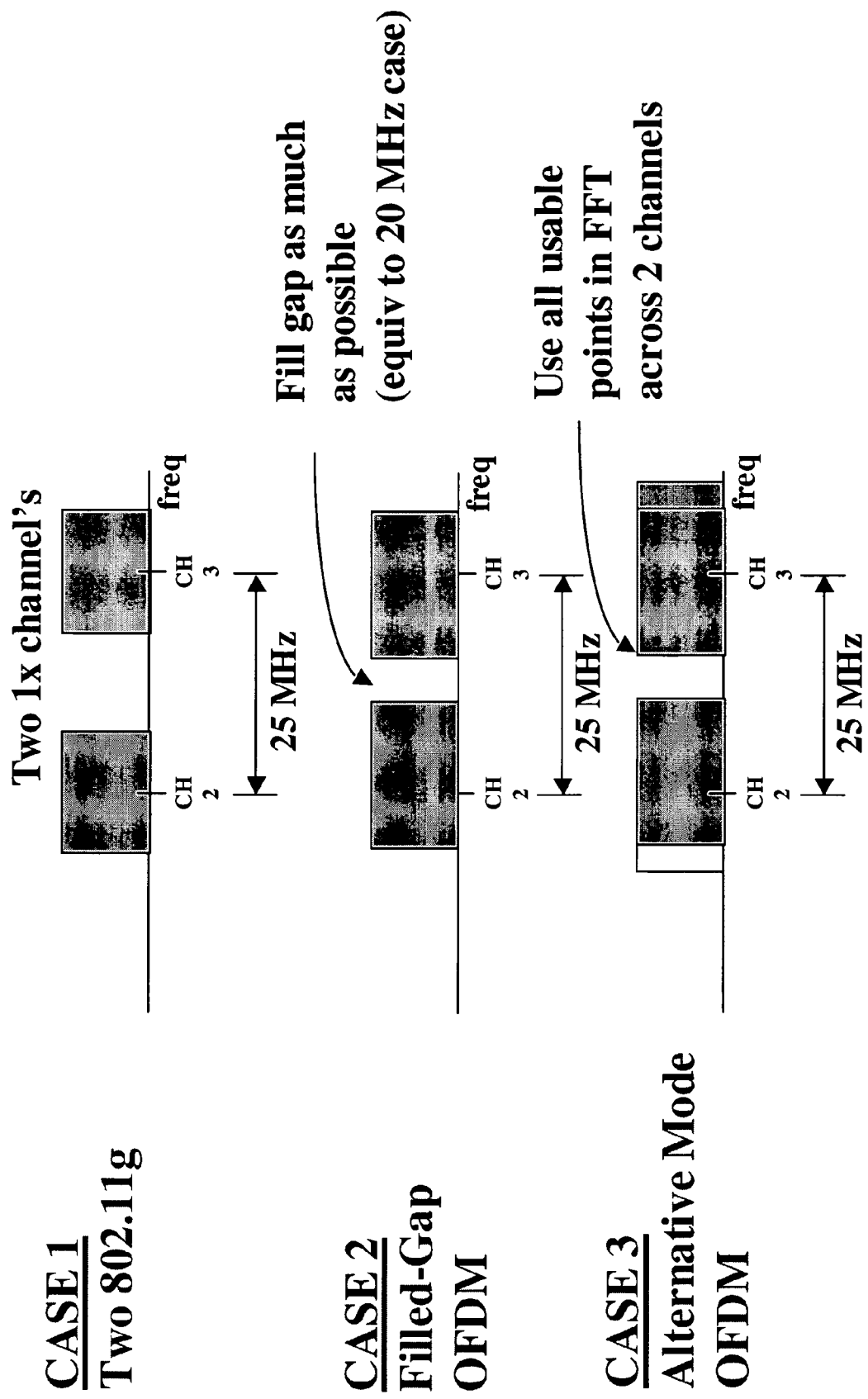
FIG. 48 is a graphical representation of three cases of a dual channel communication.
Figure 49:
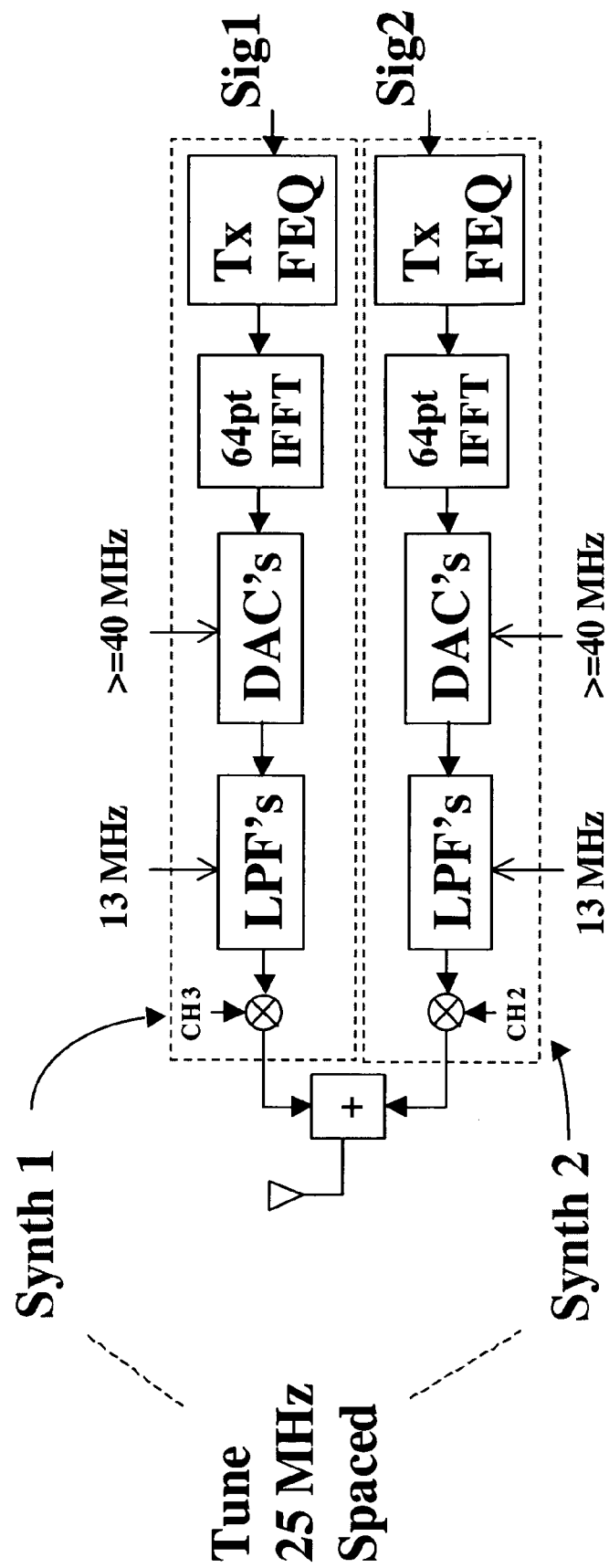
FIG. 49 is a schematic diagram of an embodiment of a dual-chain wideband transmitter.

Now considering OFDM with 25 MHz channel centers (situation with 802.11g, 2.4 GHz). FIG. 48 is a graphical representation of three cases of a dual channel communication. Considering transmitters with 25 MHz channels, FIG. 49 is a schematic diagram of an embodiment of a dual-chain wideband transmitter. A difference is the synthesizer tunes to 25 MHz spacings. The synthesizer may tune to other spacings as well. No synthesizer pop when switching between normal and wide packets.

Figure 50:
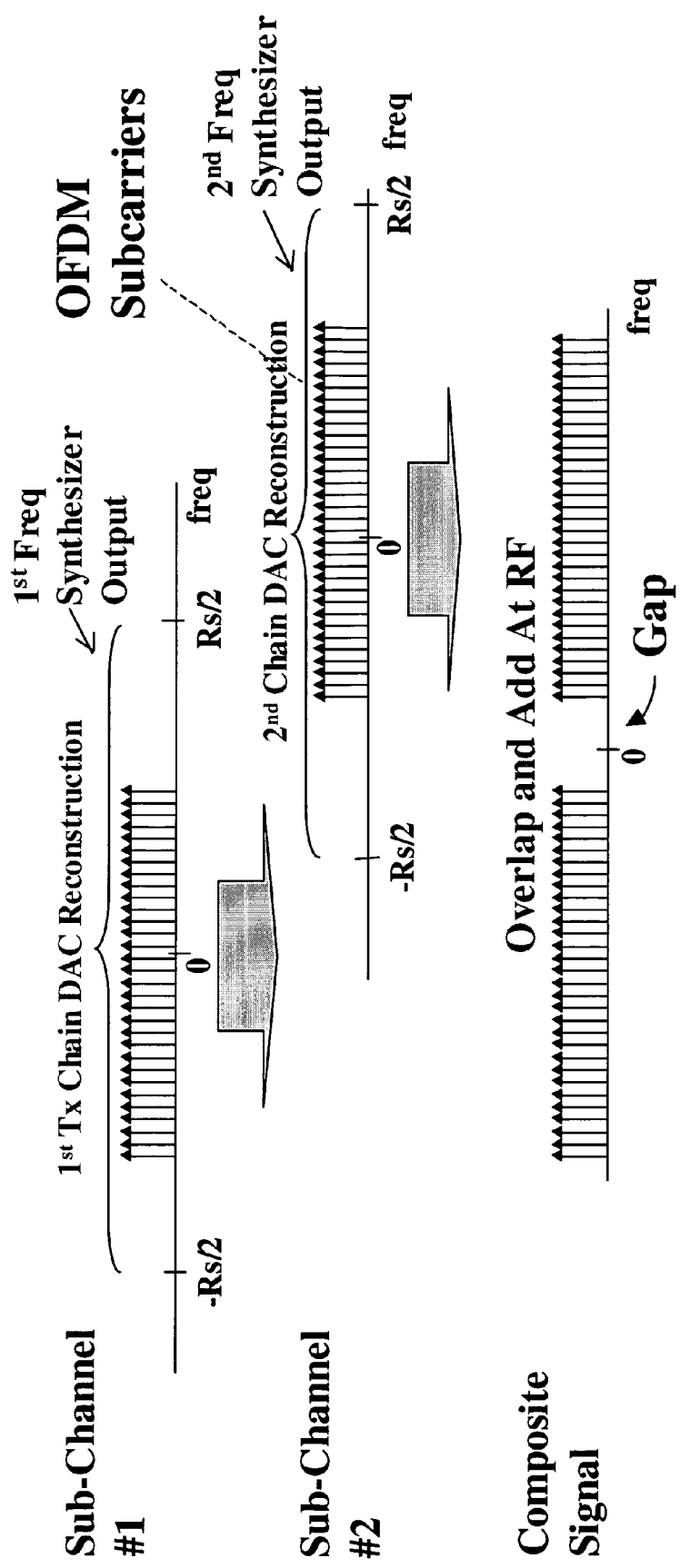
FIG. 50 is a graphical representation of signal components and processing involving two 802.11a signals with a two-channel transmitter given 25 MHz spacings.
Figure 51:
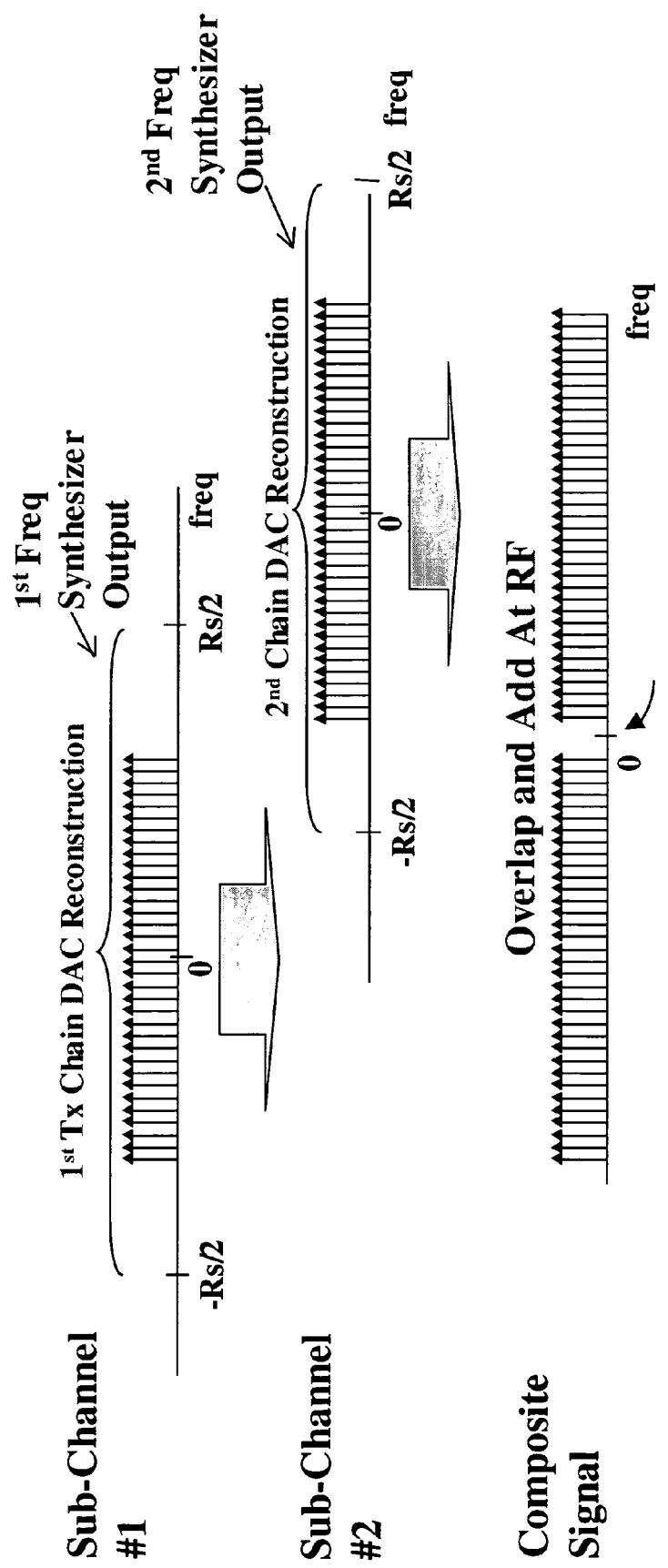
FIG. 51 is a graphical representation of the signal components and processing of FIG. 50 with filled-gap OFDM technique characterized by 25 MHz spacing.
Figure 52:
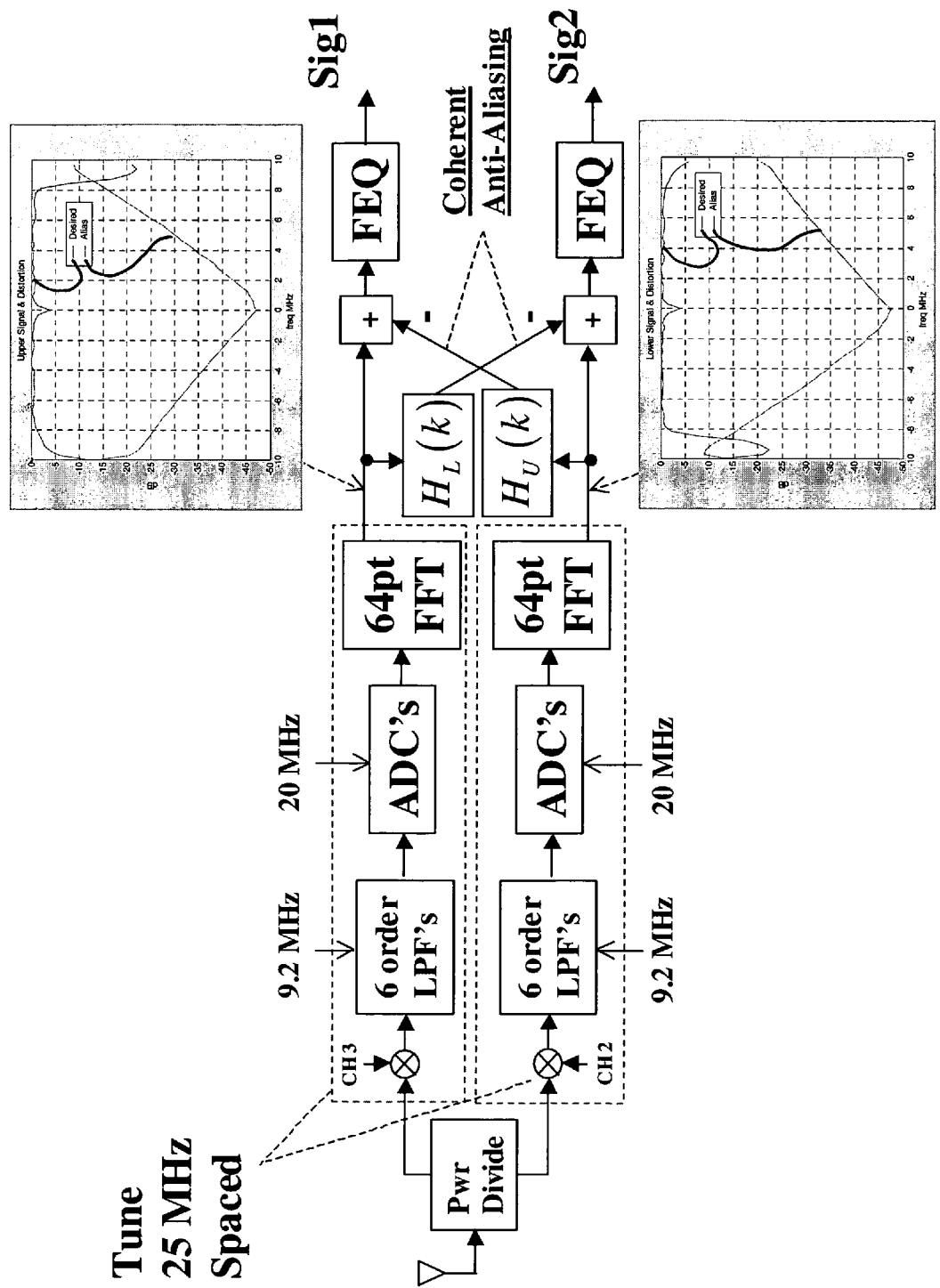
FIG. 52 illustrates coherent anti-aliasing technique applied to the upper and lower signal components of a dual-chain wideband receiver characterized by 25 MHz spacing.

FIG. 50 is a graphical representation of signal components and processing involving two 802.11a signals with a two-channel transmitter given 25 MHz spacings. FIG. 51 is a graphical representation of the signal components and processing of FIG. 50 with filled-gap OFDM technique characterized by 25 MHz spacing;

Now considering filled-gap OFDM, 25 MHz channel spacing no frequency offset into receive ADCs output. Relatively little change, anti-aliasing circuits work on aliasing about 25 MHz centers, circuit applies and hardware is essentially the same for the 20 MHz case. FIG. 52 illustrates coherent anti-aliasing technique applied to the upper and lower signal components of a dual-chain wideband receiver characterized by 25 MHz spacing.

Other channel center frequencies and ADC rates are possible for this Frequency Domain Anti-Alias Technique to Work. For instance, the earlier sections have shown how to cancel aliasing distortion in the frequency domain (at FFT outputs) caused by using multiple narrow receivers on a wide OFDM signal. No frequency offset was assumed at ADC input, 20 MHz channel centers for 5.8 GHz was mentioned with 20 MHz ADC and 25 MHz channel centers for 2.4 GHz was mentioned with 20 MHz ADC. In these cases, the out-of-subband alias OFDM subcarriers fall directly on top of in-subband desired OFDM subcarriers. Other channel centers and ADC rates are possible with this technique, any channel-center/ADC pair works if: the out-of-subband alias OFDM subcarriers fall directly on top of in-subband desired OFDM subcarriers. For example, the 802.11 OFDM subcarriers are spaced by 20 MHz/64=312.5 KHz. Hence, any ADC rate which is an integer multiple of 312.5 KHz has this property. Any channel center that is an integer multiple of 312.5 KHz is possible. Note, 20 MHz and 25 MHz channel centers satisfy this requirement (as discussed in earlier sections).

Figure 53:
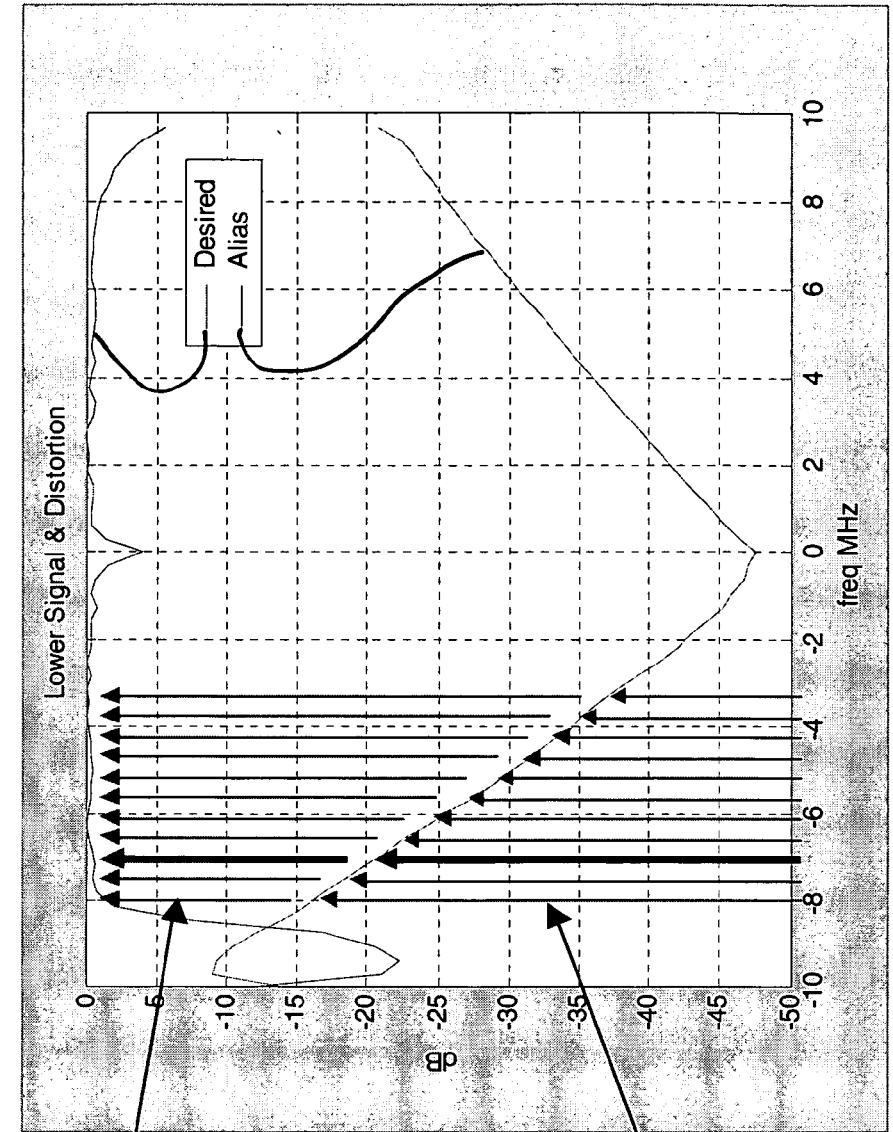
FIG. 53 is a graphical representation of the relationship between desired and undesired subcarrier components associated with anti-aliasing.

FIG. 53 is a graphical representation of the relationship between desired and undesired subcarrier components associated with anti-aliasing.

Figure 54:
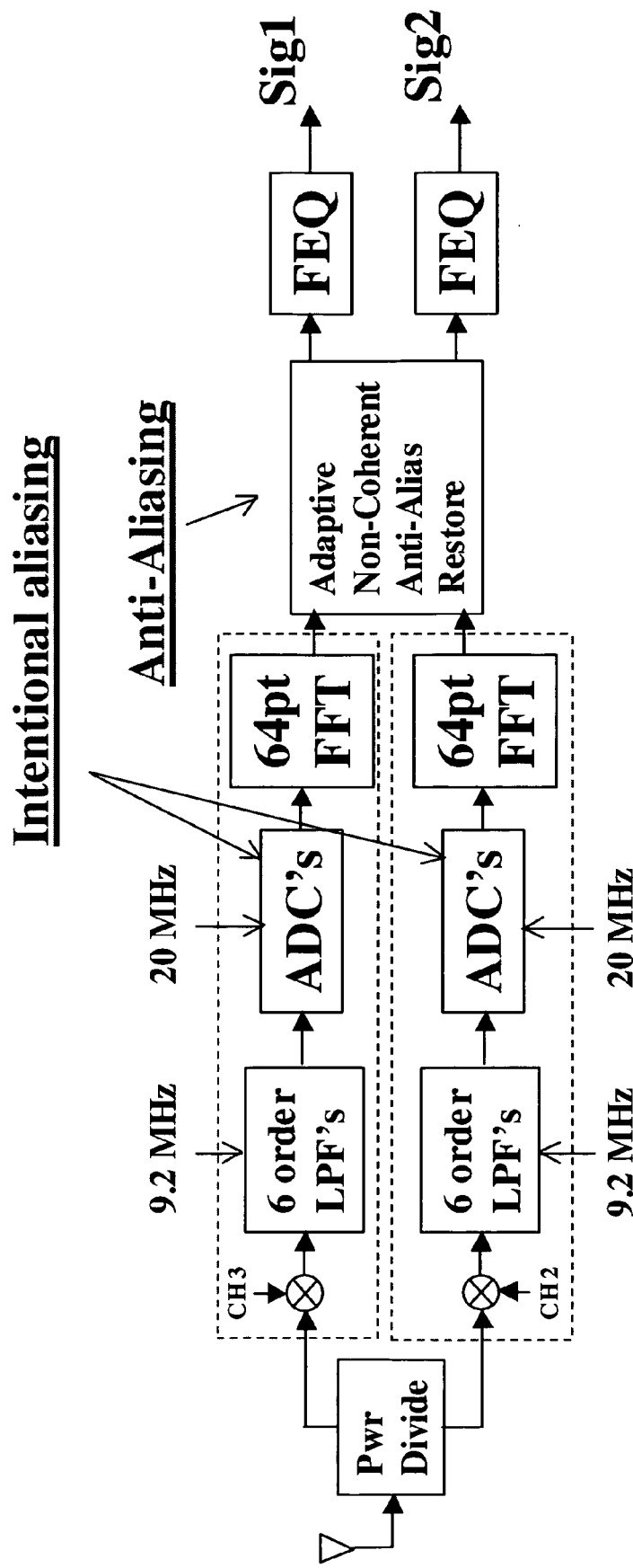
FIG. 54 is a schematic diagram illustrating an implementation using frequency domain adaptive non-coherent anti-alias restore technique.
Figure 55:
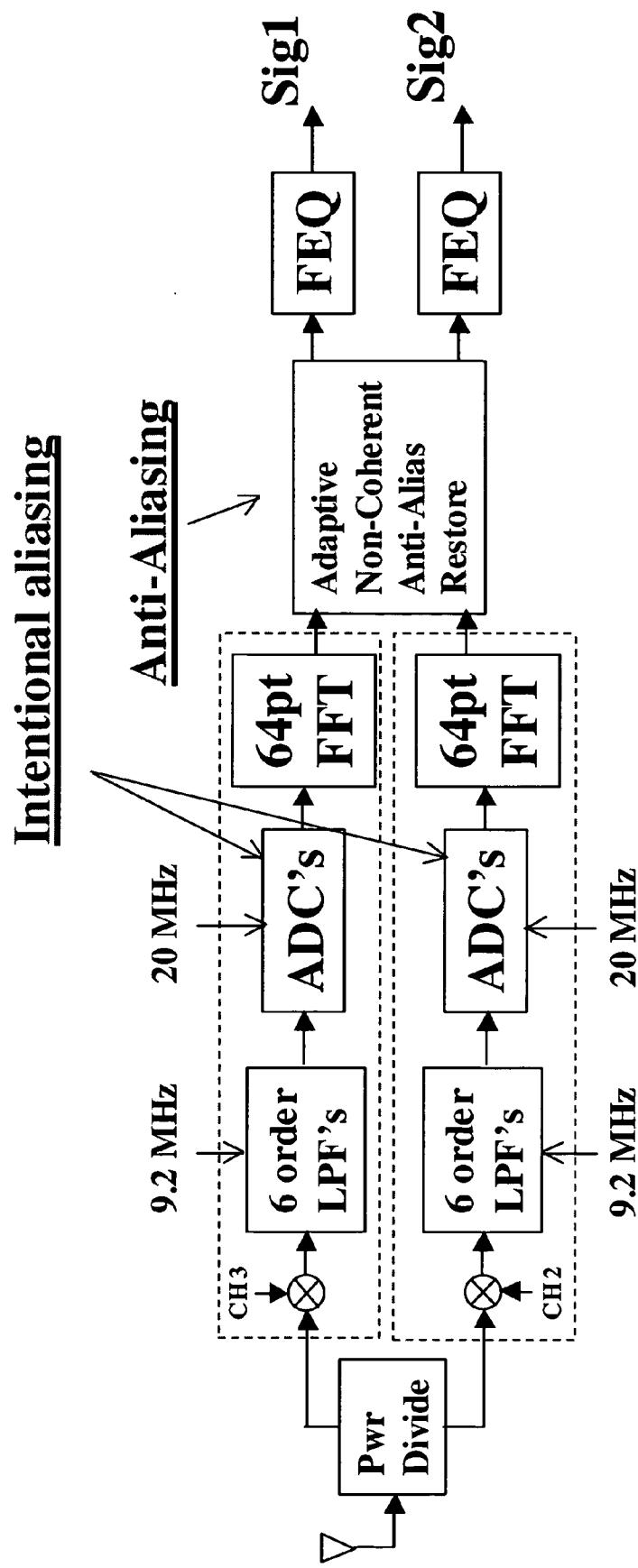
FIG. 55 is a schematic diagram illustrating an implementation using time domain adaptive anti-alias restore technique.
Figure 56:
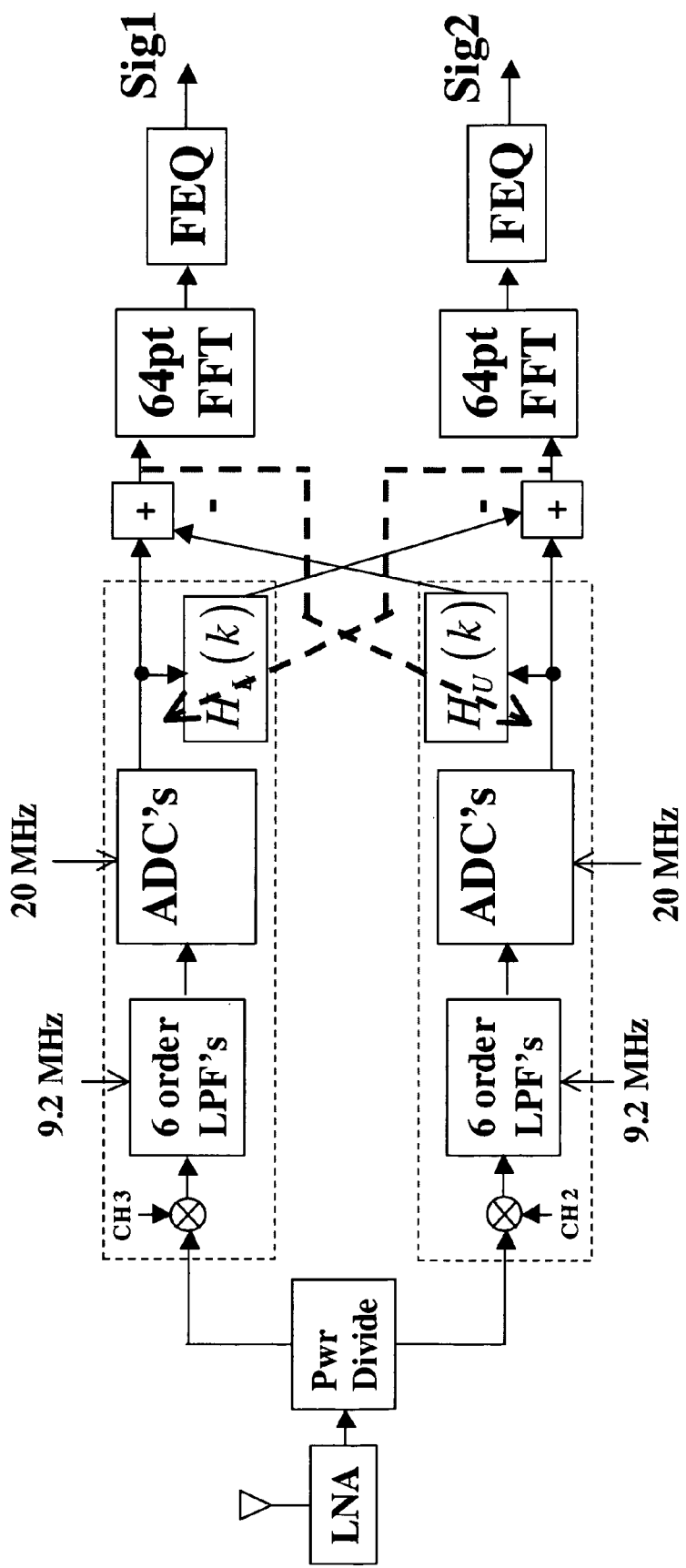
FIG. 56 is a schematic diagram illustrating an implementation using feedback for time domain anti-alias technique.
Figure 57:
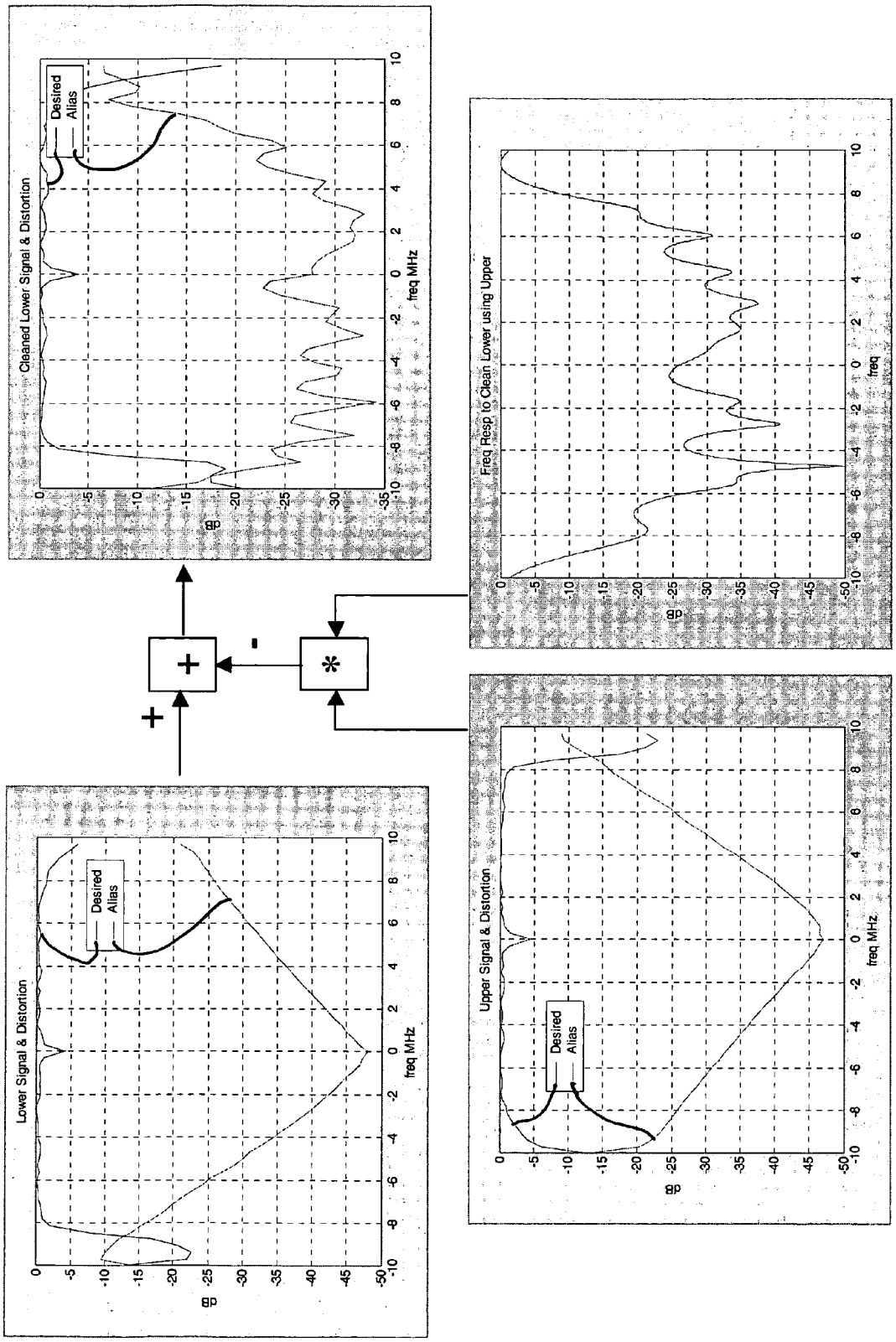
FIG. 57 is a graphical representation of upper and lower signal and distortion and a process for providing a clean lower signal in a 13 tap adaptive filter.
Figure 58:
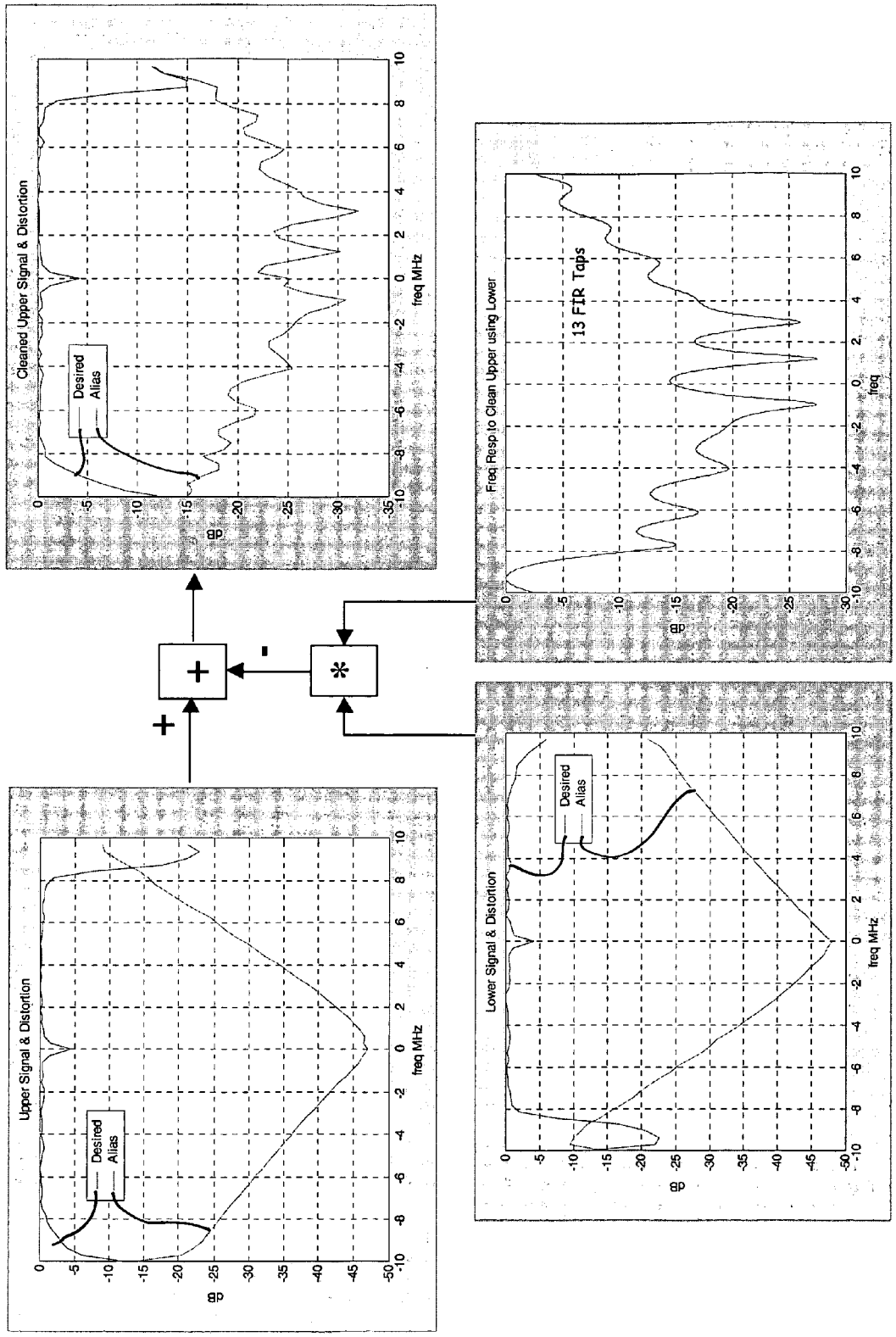
FIG. 58 is a graphical representation of upper and lower signal and distortion and a process for providing a clean upper signal in a 13 tap adaptive filter.

Now with reference to non-coherent adaptive techniques. This explores other techniques for canceling aliasing. In particular, alias canceling is considered in the time domain (Pre-FFT, above post-FFT was considered) and with frequency offset present or not. FIG. 54 is a schematic diagram illustrating an implementation using frequency domain adaptive non-coherent anti-alias restore technique. FIG. 55 is a schematic diagram illustrating an implementation using time domain adaptive anti-alias restore technique. Ostensibly no analog receive changes compared to what is currently used and Rx FEQ combine overlap. Signal separator needed for alias components. FIG. 56 is a schematic diagram illustrating an implementation using feedback for time domain anti-alias technique. Any signal common to both Rx chains can be used to train/track anti-alias—desired packets, noise. FIG. 57 is a graphical representation of upper and lower signal and distortion and a process for providing a clean lower signal in a 13 tap adaptive filter. FIG. 58 is a graphical representation of upper and lower signal and distortion and a process for providing a clean upper signal in a 13 tap adaptive filter.

Although a system and method according to the present invention has been described in connection with various embodiments, it is not intended to be limited to the specific form set forth herein, but on the contrary, it is intended to cover such alternatives, modifications, and equivalents, as can be reasonably included within the spirit and scope of the invention.

The invention claimed is:

1. A method for increasing data rates and data throughput in a network, the method comprising:
   selecting at least a first channel and a second channel, wherein the first channel and the second channel are adjacent without any other channels therebetween, wherein the first channel and the second channel each have a plurality of data subcarriers, wherein the data subcarriers of the first channel and the data subcarriers of the second channel are separated by a frequency gap corresponding to one or more guard bands between the first and second channels;
   partially filling the frequency gap between the first channel and the second channel by adding one or more data subcarriers into the frequency gap such that the one or more guard bands are at least partially filled with at least some of the one or more data subcarriers using full spectral synthesis capability of a fast fourier transform or an inverse fast fourier transform;
   combining the first channel and the second channel using channel bonding with orthogonal frequency division multiplexing (OFDM); and
   transmitting data subcarriers occupying the first channel, the second channel, and the frequency gap in parallel to a receiver.

2. The method of claim 1, wherein combining the first channel and the second channel further comprises: interleaving one of a legacy signal and a wide signal during packet transmission.

3. The method of claim 2, wherein the legacy signal comprises one channel and the wide signal comprises multiple channels.

4. The method of claim 1, wherein transmitting the first channel and the second channel comprises transmitting to multiple radios.

5. The method of claim 1, wherein transmitting the first channel and the second channel comprises transmitting to a single radio.

6. The method of claim 1, wherein the method is extensible to additional channels.

7. The method of claim 1, further comprising eliminating synthesizer frequency popping during bandwidth switching between packets.

8. The method of claim 1 further comprising:
   tuning a first synthesizer to the first channel, wherein the first synthesizer remains tuned to the first channel during mode switching; and
   tuning a second synthesizer to the second channel, wherein the second synthesizer remains tuned to the second channel during mode switching.

9. The method of claim 1, wherein channel bonding comprises use of common synthesizers.

10. The method of claim 1, wherein the plurality of data subcarriers are OFDM subcarriers.

11. The method of claim 10, further comprising:
    identifying additional points in a Fast Fourier Transform (FFT) across the first and second channels; and
    adding subcarriers to the additional points.

12. The method of claim 11, wherein the additional points exist on an outer edge of the first channel or the second channel.

13. The method of claim 12, wherein a guard band on each edge is filled with data.

14. The method of claim 1, further comprising utilizing an anti-aliasing technique at a receiver.

15. The method of claim 14, wherein the anti-aliasing technique comprises passing upper signals and lower signals through a first filter and a second filter.

16. A system for increasing data rates and data throughput in a network, the system comprising:
    means for selecting at least a first channel and a second channel, wherein the first channel is adjacent to the second channel without any other channels therebetween, wherein the first channel comprises a first plurality of subcarriers, and the second channel comprises a second plurality of subcarriers, wherein a frequency gap corresponding to at least one guard band between the first channel and the second channel separates the first plurality of subcarriers from the second plurality of subcarriers;
    means for partially filling the frequency gap with at least one additional subcarrier such that the one or more guard bands are at least partially filled with at least some of the one or more data subcarriers using full spectral synthesis capability of a fast fourier transform or an inverse fast fourier transform;
    means for combining the first channel and the second channel using channel bonding with orthogonal frequency division multiplexing (OFDM); and
    means for transmitting the first plurality of subcarriers, the second plurality of subcarriers, and the at least one additional subcarrier in parallel to a receiver.

17. The system of claim 16, wherein the frequency gap is filled with a portion of the first plurality of subcarriers and a portion of the second plurality of subcarriers.

18. A non-transitory computer-readable medium having instructions stored thereon, the instructions comprising:
    instructions to select at least a first channel and a second channel, wherein the first channel and the second channel are adjacent without any other channels therebetween, wherein the first channel and the second channel each have a plurality of data subcarriers, wherein the data subcarriers of the first channel and the data subcarriers of the second channel are separated by a frequency gap corresponding to one or more guard bands between the first and second channels;
    instructions to partially fill the frequency gap between the first channel and the second channel by adding one or more data subcarriers into the frequency gap such that the one or more guard bands are at least partially filled with at least some of the one or more data subcarriers using full spectral synthesis capability of a fast fourier transform or an inverse fast fourier transform;
instructions to combine the first channel and the second channel using channel bonding with orthogonal frequency division multiplexing (OFDM); and instructions to transmit data subcarriers occupying the first channel, the second channel, and the frequency gap in parallel to a receiver.

\* \* \* \* \*

UNITED STATES PATENT AND TRADEMARK OFFICE
CERTIFICATE OF CORRECTION

| | | |
|---|---|---|
| PATENT NO. | : 8,027,326 B2 | Page 1 of 1 |
| APPLICATION NO. | : 11/033524 | |
| DATED | : September 27, 2011 | |
| INVENTOR(S) | : Shearer, III et al. | |

It is certified that error appears in the above-identified patent and that said Letters Patent is hereby corrected as shown below:

Column 18, line 51, in Claim 17, delete "tilled" and insert -- filled --.

Signed and Sealed this
Fifteenth Day of May, 2012

David J. Kappos
*Director of the United States Patent and Trademark Office*